(12) United States Patent
Han et al.

(10) Patent No.: US 10,850,680 B2
(45) Date of Patent: Dec. 1, 2020

(54) VEHICLE DISPLAY APPARATUS AND VEHICLE HAVING THE SAME

(71) Applicant: LG ELECTRONICS INC., Seoul (KR)

(72) Inventors: Kihoon Han, Seoul (KR); Sangyol Yoon, Seoul (KR); Junghee Park, Seoul (KR)

(73) Assignee: LG Electronics Inc., Seoul (KR)

( * ) Notice: Subject to any disclaimer, the term of this patent is extended or adjusted under 35 U.S.C. 154(b) by 180 days.

(21) Appl. No.: 15/704,881

(22) Filed: Sep. 14, 2017

(65) Prior Publication Data

US 2018/0093619 A1 Apr. 5, 2018

(30) Foreign Application Priority Data

Oct. 5, 2016 (KR) .................. 10-2016-0128280

(51) Int. Cl.
*B60R 11/04* (2006.01)
*B60W 30/06* (2006.01)
(Continued)

(52) U.S. Cl.
CPC .............. *B60R 11/04* (2013.01); *B60Q 9/002* (2013.01); *B60R 1/00* (2013.01); *B60T 7/22* (2013.01);
(Continued)

(58) Field of Classification Search
CPC ... B62D 15/0285; B60Q 9/002; B60W 30/06; G08G 1/168; H04N 7/181; G02B 27/01;
(Continued)

(56) References Cited

U.S. PATENT DOCUMENTS 6,912,001 B2    6/2005  Okamoto et al.
7,277,123 B1 *  10/2007 Okamoto .................. B60R 1/00
                                                      348/148
(Continued)

FOREIGN PATENT DOCUMENTS

CN      1325802     12/2001
CN      1735205     2/2006
(Continued)

OTHER PUBLICATIONS

Extended European Search Report in European Application No. 17194746.8, dated Feb. 8, 2018, 9 pages.
(Continued)

*Primary Examiner* — David E Harvey
(74) *Attorney, Agent, or Firm* — Fish & Richardson P.C.

(57) ABSTRACT

A vehicle display apparatus that includes: a sensor unit that is configured to obtain a vehicle surrounding image and sense an appearance change of a vehicle; a display unit that is configured to display the vehicle surrounding image that includes a vehicle image showing at least a portion of a vehicle appearance; and a processor that is configured to: obtain, from the sensor unit, information on the appearance change of the vehicle, based on the information on the appearance change of the vehicle, generate the vehicle surrounding image to show the appearance change of the vehicle, and control the display unit to display the vehicle surrounding image is disclosed.

20 Claims, 55 Drawing Sheets

(51) Int. Cl.
| | | |
|---|---|---|
| *B60Q 9/00* | (2006.01) | |
| *H04N 7/18* | (2006.01) | |
| *G08G 1/16* | (2006.01) | |
| *B60R 1/00* | (2006.01) | |
| *B60T 7/22* | (2006.01) | |
| *G02B 27/01* | (2006.01) | |
| *B62D 15/02* | (2006.01) | |
| *G06K 9/00* | (2006.01) | |

(52) U.S. Cl.
CPC ......... *B60W 30/06* (2013.01); *B62D 15/0285* (2013.01); *G02B 27/01* (2013.01); *G06K 9/00791* (2013.01); *G06K 9/00798* (2013.01); *G08G 1/168* (2013.01); *H04N 7/181* (2013.01); *B60K 2370/21* (2019.05); *B60R 2300/607* (2013.01); *B60R 2300/806* (2013.01); *B60R 2300/8086* (2013.01); *B60T 2201/10* (2013.01); *B60T 2210/36* (2013.01); *B60Y 2400/92* (2013.01); *G02B 2027/014* (2013.01); *G02B 2027/0123* (2013.01); *G02B 2027/0138* (2013.01); *G06K 9/00805* (2013.01)

(58) Field of Classification Search
CPC ............... B60K 11/04; G06K 9/00791; G06K 9/00798; G06K 9/00805; B60T 7/22; B60R 1/00
See application file for complete search history.

(56) References Cited

U.S. PATENT DOCUMENTS

| | | | | |
|---|---|---|---|---|
| 7,379,089 | B2 * | 5/2008 | Takagi | H04N 7/181 |
| | | | | 348/148 |
| 7,457,456 | B2 | 11/2008 | Miyoshu et al. | |
| 8,294,563 | B2 | 10/2012 | Shimoda et al. | |
| 8,868,329 | B2 * | 10/2014 | Ikeda | G01C 21/00 |
| | | | | 701/33.4 |
| 9,321,400 | B2 * | 4/2016 | Wakabayashi | B60R 1/00 |
| 9,499,200 | B2 | 11/2016 | Hochrein et al. | |
| 9,508,016 | B2 | 11/2016 | Chi et al. | |
| 9,522,675 | B1 * | 12/2016 | You | B60W 30/06 |
| 9,712,791 | B2 | 7/2017 | Kim et al. | |
| 9,738,277 | B2 * | 8/2017 | Ha | B60W 30/06 |
| 9,944,319 | B2 | 4/2018 | Franganillo et al. | |
| 2002/0039136 | A1 * | 4/2002 | Okamoto | B60R 1/00 |
| | | | | 348/148 |
| 2003/0052969 | A1 * | 3/2003 | Satoh | B60R 1/00 |
| | | | | 348/148 |
| 2006/0029271 | A1 * | 2/2006 | Miyoshi | G06T 3/00 |
| | | | | 382/154 |
| 2006/0187304 | A1 * | 8/2006 | Sakata | H04N 7/181 |
| | | | | 348/148 |
| 2007/0103282 | A1 * | 5/2007 | Caird | B60Q 9/00 |
| | | | | 340/435 |
| 2007/0146164 | A1 * | 6/2007 | Schmid | G08G 1/161 |
| | | | | 340/932.2 |
| 2008/0129539 | A1 * | 6/2008 | Kumon | B60R 1/00 |
| | | | | 340/901 |
| 2008/0136673 | A1 | 6/2008 | Jung | |
| 2008/0189000 | A1 * | 8/2008 | Duong | B60T 7/22 |
| | | | | 701/20 |
| 2011/0025848 | A1 * | 2/2011 | Yumiba | B62D 15/029 |
| | | | | 348/148 |
| 2011/0115615 | A1 * | 5/2011 | Luo | B60R 1/00 |
| | | | | 340/436 |
| 2011/0156913 | A1 * | 6/2011 | Dai | G08B 21/22 |
| | | | | 340/573.1 |
| 2011/0234801 | A1 * | 9/2011 | Yamada | B60R 1/00 |
| | | | | 348/148 |
| 2012/0229645 | A1 * | 9/2012 | Yamada | B60Q 1/2665 |
| | | | | 348/148 |
| 2013/0110346 | A1 * | 5/2013 | Huber | B60T 7/22 |
| | | | | 701/33.9 |
| 2013/0124042 | A1 * | 5/2013 | Raisch | B62D 15/027 |
| | | | | 701/41 |
| 2014/0085466 | A1 * | 3/2014 | Moriyama | G08G 1/165 |
| | | | | 348/148 |
| 2014/0085472 | A1 * | 3/2014 | Lu | B60R 1/002 |
| | | | | 348/148 |
| 2014/0092249 | A1 | 4/2014 | Freiburger | |
| 2015/0066349 | A1 * | 3/2015 | Chan | G01C 21/26 |
| | | | | 701/400 |
| 2015/0183371 | A1 * | 7/2015 | Okada | B60R 1/00 |
| | | | | 348/148 |
| 2015/0197282 | A1 | 7/2015 | Hochrein et al. | |
| 2015/0353080 | A1 * | 12/2015 | Mukaiyama | E05B 77/54 |
| | | | | 701/23 |
| 2016/0182823 | A1 * | 6/2016 | Murasumi | B60R 1/00 |
| | | | | 348/38 |
| 2016/0212384 | A1 * | 7/2016 | Sawada | H04N 7/181 |
| 2017/0132482 | A1 | 5/2017 | Kim et al. | |
| 2017/0286763 | A1 * | 10/2017 | Fukuda | G06T 7/254 |
| 2018/0039283 | A1 * | 2/2018 | Srivastava | G01S 17/89 |
| 2018/0089907 | A1 * | 3/2018 | Maruoka | H04N 7/18 |
| 2018/0107207 | A1 * | 4/2018 | Kim | B60W 30/06 |
| 2018/0162446 | A1 * | 6/2018 | Mikuriya | B60R 21/00 |
| 2019/0084495 | A1 * | 3/2019 | Yamada | H04N 7/18 |

FOREIGN PATENT DOCUMENTS

| | | | | |
|---|---|---|---|---|
| CN | 102815297 | | 12/2012 | |
| CN | 103707833 | | 4/2014 | |
| CN | 103786726 | | 5/2014 | |
| CN | 103991448 | | 8/2014 | |
| CN | 104955714 | | 9/2015 | |
| CN | 105270261 | | 1/2016 | |
| DE | 102009019024 | A1 * | 1/2010 | ............ G08G 1/168 |
| DE | 2015003992 | | 10/2015 | |
| DE | 102015011358 | | 3/2016 | |
| EP | 1157890 | | 11/2001 | |
| EP | 2581268 | | 4/2013 | |
| EP | 3165425 | | 5/2017 | |
| JP | 4640238 | | 10/2007 | |
| JP | 2007-288282 | | 11/2007 | |
| JP | 2009-023471 | | 2/2009 | |
| JP | 2011-016484 | | 1/2011 | |
| JP | 5522492 | | 8/2013 | |
| JP | 2016-094169 | | 5/2016 | |
| KR | 20130054032 | | 5/2013 | |
| WO | WO2015/056530 | | 4/2015 | |
| WO | WO2016/071191 | | 5/2016 | |

OTHER PUBLICATIONS

European Office Action in European Application No. 17194746.8, dated Mar. 14, 2019, 5 pages.

* cited by examiner

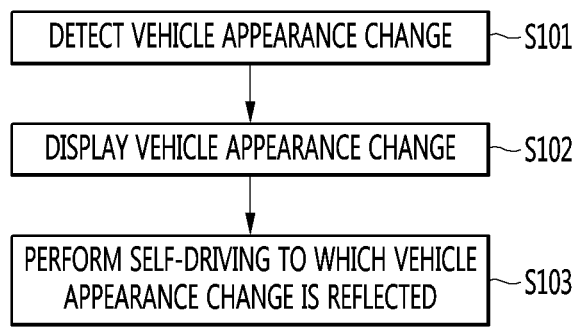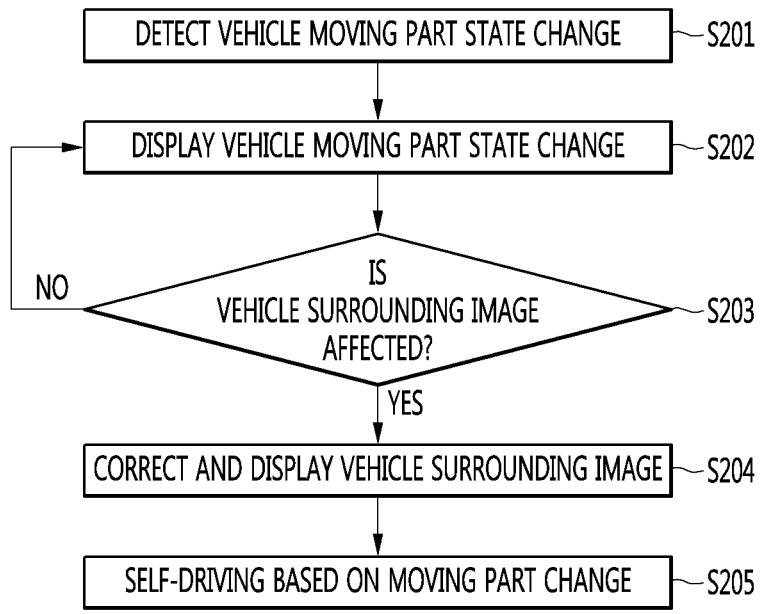

VEHICLE DISPLAY APPARATUS AND VEHICLE HAVING THE SAME

CROSS-REFERENCE TO RELATED APPLICATION

The present application claims priority to Korean Patent Application No. 10-2016-0128280, filed on Oct. 5, 2016 in the Korean Intellectual Property Office, the content of which is incorporated by reference herein in its entirety.

TECHNICAL FIELD

The present disclosure relates to a vehicle display apparatus and a vehicle including the vehicle display apparatus.

BACKGROUND

A vehicle is an apparatus that transports a user ridding therein in a desired direction. A representative example of a vehicle may be an automobile.

A vehicle includes an internal combustion engine vehicle, an external combustion engine vehicle, a gas turbine vehicle, an electric vehicle, etc. according to type of motor used.

The electric vehicle refers to a vehicle for driving an electric motor using electric energy and includes a pure electric vehicle, a hybrid electric vehicle (HEV), a plug-in hybrid electric vehicle (PHEV), a fuel cell electric vehicle (FCEV), etc.

Recently, intelligent vehicles have been actively developed for safety or convenience of a driver or pedestrian. The intelligent vehicle is an advanced vehicle using information technology (IT) and is also referred to as a smart vehicle. The intelligent vehicle provides optimal traffic efficiency by introduction of an advanced vehicle system and via association with an intelligent traffic system (ITS).

In addition, research into a sensor mounted in such an intelligent vehicle has been actively conducted. More specifically, a camera, an infrared sensor, a radar, a global positioning system (GPS), a Lidar, a gyroscope, etc. are used for the intelligent vehicle. Among others, the camera is an important sensor playing the role of human eyes.

Particularly, in order to assist the vehicle driving of the driver or accurately inform a vehicle driving state during the self-driving, technologies for photographing the surroundings of the vehicle, performing image processing on the photographed image, and providing vehicle surrounding images of various viewpoints are being actively developed.

Representative examples of the vehicle surrounding images may include an around view monitoring image (AVM) that shows an image at a top viewpoint, i.e., when viewed from above the vehicle, or a 3D around view image displayed when viewed at various external positions of the vehicle.

These around view images may be generated by matching virtual vehicle images stored after performing image processing on images obtained by photographing the surroundings of the vehicle. However, the virtual vehicle images may be default images stored in a memory, i.e., images having fixed shapes regardless of a change in outer appearance of the vehicle.

Also, vehicle surrounding information may be acquired from these images. Thus, the image-based vehicle surrounding information may be used as information for self-driving or automatically parking the vehicle.

SUMMARY

In general, one innovative aspect of the subject matter described in this specification can be implemented in a vehicle display apparatus including: a sensor unit that is configured to obtain a vehicle surrounding image and sense an appearance change of a vehicle; a display unit that is configured to display the vehicle surrounding image that includes a vehicle image showing at least a portion of a vehicle appearance; and a processor that is configured to: obtain, from the sensor unit, information on the appearance change of the vehicle, based on the information on the appearance change of the vehicle, generate the vehicle surrounding image to show the appearance change of the vehicle, and control the display unit to display the vehicle surrounding image.

The foregoing and other implementations can each optionally include one or more of the following features, alone or in combination. In particular, one implementation includes all the following features in combination. The vehicle surrounding image includes: an around view image, and a virtual vehicle graphic image representing the vehicle. The processor is configured to: based on the appearance change of the vehicle, change the virtual vehicle graphic image, and control the display unit to display the around view image comprising the changed virtual vehicle graphic image. The vehicle surrounding image includes: a 3D around view image that displays the vehicle from a view point to show the appearance change of the vehicle. The sensor unit includes: a camera that is configured to obtain one or more images in one or more directions to obtain the vehicle surrounding image, the one or more directions including at least one of a front direction, a rear direction, a left direction, or a right direction of the vehicle. The processor is configured to: detect, from the one or more images, a first area that is blocked by the appearance change of the vehicle, change the vehicle surrounding image to represent the first area as a blocked area, and control the display unit to display the changed vehicle surrounding image. The sensor unit includes: an auxiliary camera that is configured to obtain an auxiliary image corresponding to at least a portion of the first area, and wherein the processor is configured to: generate the vehicle surrounding image to include the auxiliary image obtained by the auxiliary camera, and control the display unit to display the generated vehicle surrounding image. The processor is configured to: based on the information on the appearance change of the vehicle, execute a self-driving task that includes an automatic parking task. The processor is configured to: based on the information on the appearance change of the vehicle, change a boundary range of the vehicle, and based on the changed boundary range of the vehicle, execute the self-driving task. The processor is configured to: in a state in which the appearance change of the vehicle occurs, execute the automatic parking task by changing at least one of a parking manner, a parking path, or a parking necessary time for automatic parking. The vehicle display apparatus further includes: an interface that is configured to receive information on a state change of a moving part of the vehicle, wherein the appearance change of the vehicle includes a state change of the moving part of the vehicle. The state change of the moving part includes: at least one of a state change of a side view mirror of the vehicle between a folded state and an unfolded state, a state change of a door of the vehicle between an open state and a closed state, a state change of a sunroof of the vehicle between an open state and a closed state, or a state change of a trunk of the vehicle between an open state and a closed state. The state change of the moving part includes: a state change of the moving part between a locked state and an unlocked state. The processor is configured to: in a state in which the state change of the moving part occurs, perform an automatic parking task for the vehicle, based on the state change of the moving part, expand a boundary range of the vehicle, and in a state in which risk of collision between the expanded boundary range and an object is detected, stop the vehicle. The appearance change of the vehicle includes: an object being mounted on an exterior of the vehicle. The vehicle display apparatus further includes: at least one of (i) an interface that is configured to receive the information on the appearance change of the vehicle, the information representing information on the object mounted on the exterior of the vehicle or information on a structure to mount the object on the exterior of the vehicle or (ii) a memory that is configured to store the information about the object, wherein the information on the object mounted on the exterior of the vehicle includes: at least one of (i) information on a position, a size, a type, or an existence of a hinge coupling or (ii) information on a surrounding image of the object. The processor is configured to: in a state in which the object is mounted on the vehicle, perform an automatic parking task for the vehicle, expand a boundary range of the vehicle to the object, and in a state in which risk of collision between the expanded boundary range and an object is detected, stop the vehicle. The appearance change of the vehicle represents an object moving from an inside of the vehicle to an outside of the vehicle. The vehicle display apparatus further includes: a monitoring unit that is configured to obtain an image of the inside of the vehicle, wherein the processor is configured to: based on the vehicle surrounding image obtained by the sensor unit and the image of the inside of the vehicle obtained by the monitoring unit, obtain information on the object moving from the inside of the vehicle to the outside of the vehicle, wherein the information on the object moving from the inside of the vehicle to the outside of the vehicle includes: information on a position, a size, and a type of the object, and wherein the processor is configured to: generate the vehicle surrounding image to show the information on the appearance change of the vehicle, and control the display unit to display the vehicle surrounding image.

In general, another innovative aspect of the subject matter described in this specification can be implemented in a vehicle including a vehicle display apparatus that includes: a sensor unit that is configured to obtain a vehicle surrounding image and sense an appearance change of a vehicle; a display unit that is configured to display the vehicle surrounding image that includes a vehicle image showing at least a portion of a vehicle appearance; and a processor that is configured to: obtain, from the sensor unit, information on the appearance change of the vehicle, based on the information on the appearance change of the vehicle, generate the vehicle surrounding image to show the appearance change of the vehicle, and control the display unit to display the vehicle surrounding image.

The subject matter described in this specification can be implemented in particular examples so as to realize one or more of the following advantages. A vehicle display apparatus provides a vehicle surrounding image even when an appearance change of a vehicle occurs so that a vehicle can be safely driven. In particular, the vehicle display apparatus provides the vehicle surrounding image while a vehicle is automatically driven such that auto driving of the vehicle can be safely performed.

The details of one or more examples of the subject matter described in this specification are set forth in the accompanying drawings and the description below. Other potential features, aspects, and advantages of the subject matter will become apparent from the description, the drawings, and the claim.

BRIEF DESCRIPTION OF THE DRAWINGS

FIG. 8 is a flowchart illustrating an example method for providing a self-driving function for a vehicle.

FIG. 9 is a flowchart illustrating an example method for providing a vehicle surrounding image display function based on changes in vehicle moving part.

Like reference numbers and designations in the various drawings indicate like elements.

DETAILED DESCRIPTION

A vehicle as described in this specification may include a car and a motorcycle. Hereinafter, a car will be as an example of a vehicle.

A vehicle as described in this specification may include all of an internal combustion engine vehicle including an engine as a power source, a hybrid vehicle including both an engine and an electric motor as a power source, and an electric vehicle including an electric motor as a power source.

In some implementations, the left of a vehicle means the left of the vehicle in the direction of travel and the right of the vehicle means the right of the vehicle in the direction of travel.

in some implementations, a left hand drive (LHD) vehicle will be assumed unless otherwise stated.

In the following description, the vehicle display apparatus is provided in a vehicle to exchange information necessary for data communication with the vehicle and to perform a driving assistance function. A set of some units of the vehicle may be defined as a vehicle display apparatus.

Figure 1:
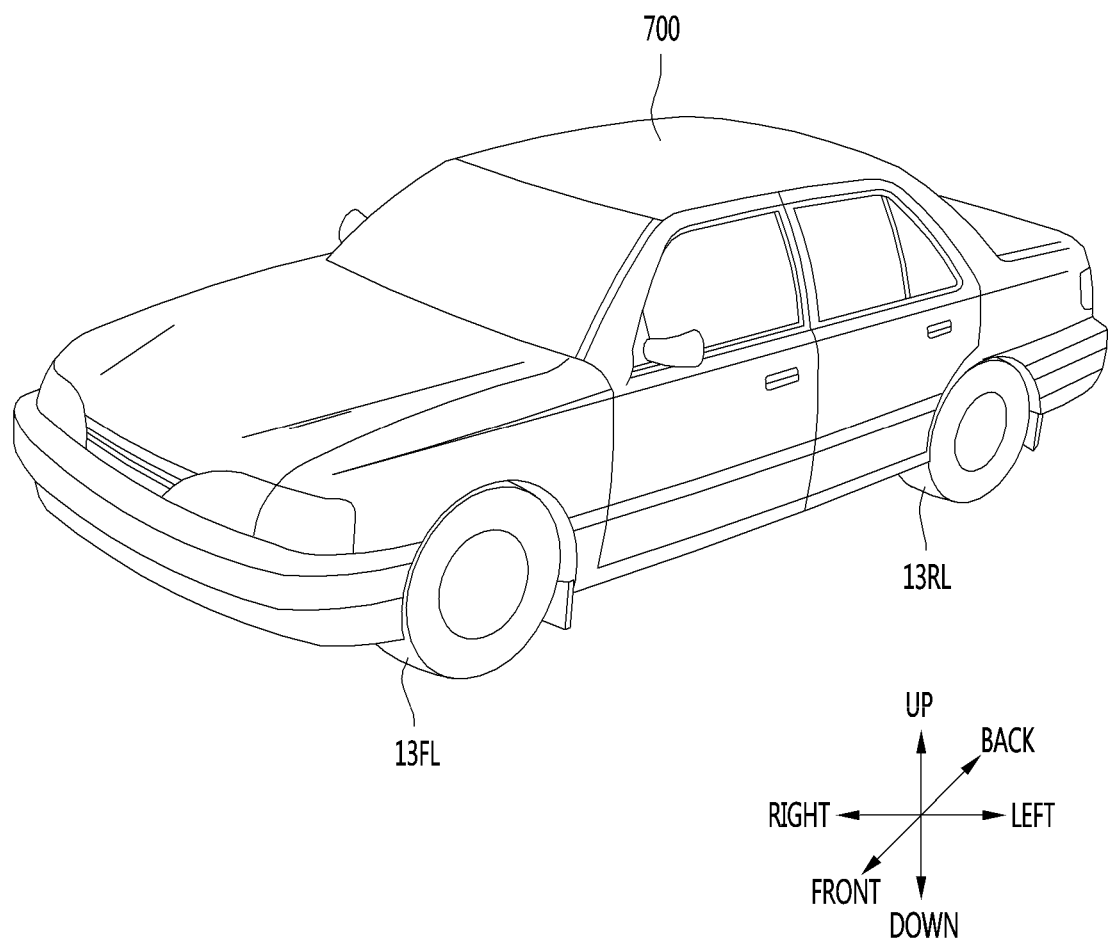
FIG. 1 is a diagram illustrating an example exterior of a vehicle including an example vehicle display apparatus.
Figure 2:
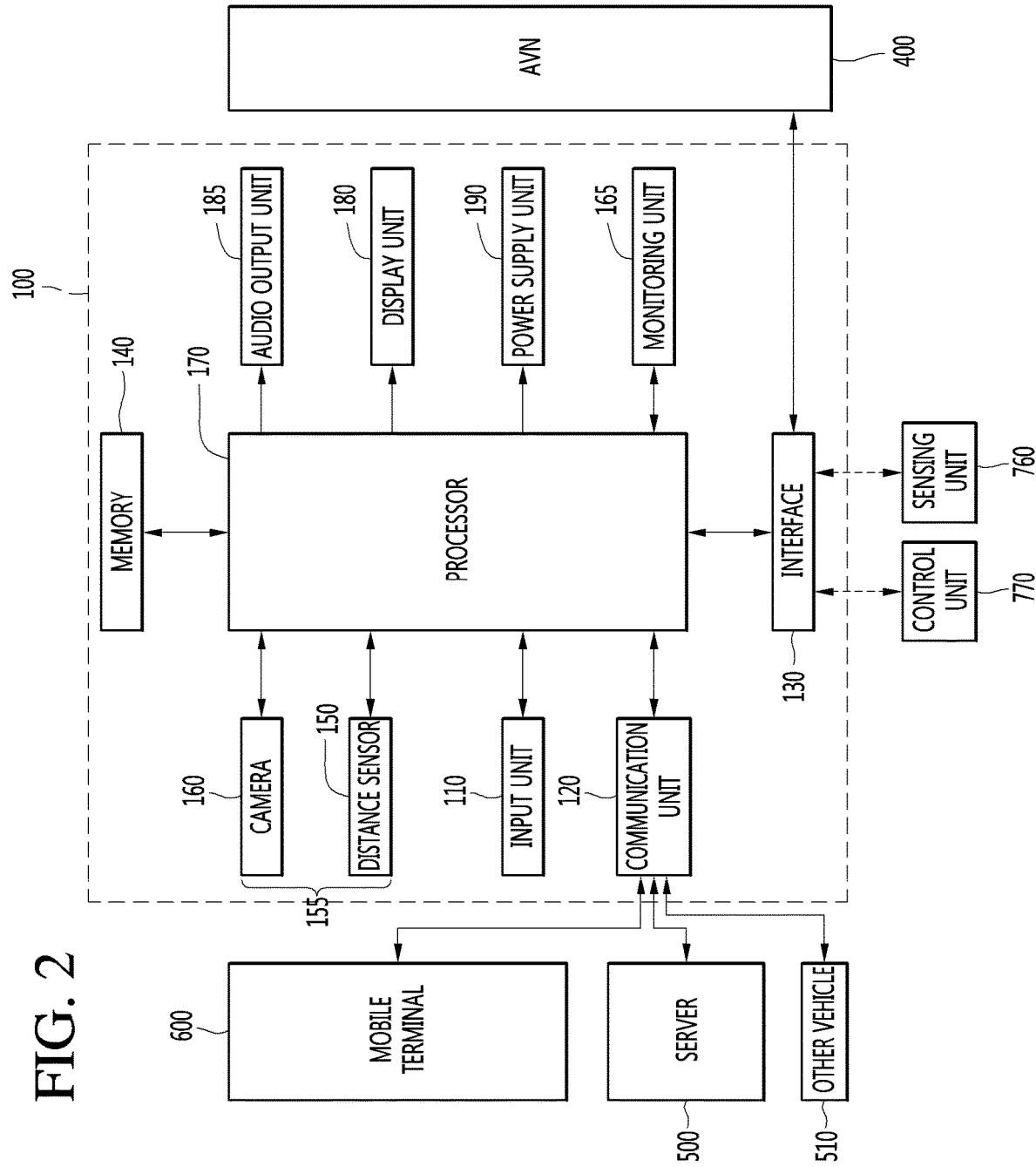
FIG. 2 is a diagram illustrating an example vehicle.

FIG. 1 illustrates an example exterior of a vehicle including an example vehicle display apparatus. FIG. 2 illustrates an example vehicle.

When the vehicle display apparatus is separately provided, at least some units (see FIG. 2) of the vehicle display apparatus are not included in the vehicle display apparatus but may be units of the vehicle or units of another apparatus mounted in the vehicle. Such external units transmit and receive data via an interface of the vehicle display apparatus and thus may be understood as being included in the vehicle display apparatus.

Hereinafter, for convenience of description, assume that the vehicle display apparatus includes the units shown in FIG. 2.

Referring to FIG. 1, a vehicle 700 may include wheels 13FL and 12RL rotating by a power source and a vehicle display apparatus 100 displaying a vehicle surrounding image to a user and providing a vehicle driving function on the basis of vehicle surrounding information.

In detail, the vehicle display apparatus 100 may detect a situation in an outer appearance of the vehicle is changed, display the detected change in outer appearance of the vehicle on a vehicle surrounding image, and provide information about an accurate vehicle state and a vehicle surrounding situation to a user.

Here, the change in outer appearance of the vehicle may include a change in outer appearance due to changes in state of moving parts such as a side view mirror, a trunk, a door, and the like, a case in which an object is mounted on the outside of the vehicle to change the outer appearance of the vehicle, and a case in which an object protrudes through a vehicle window to change the outer appearance of the vehicle.

Also, the above-described vehicle surrounding image may be a vehicle image in which at least a portion of the vehicle is shown and an image including an image obtained by photographing at least one direction of front, rear, left, and right directions of the vehicle. For example, the vehicle surrounding image may include an around view image (AVM) when viewed at a top view of the vehicle, a 3D around view image (3D AVM) when the vehicle is viewed at various viewpoints outside the vehicle, a vehicle front image, and a vehicle rear image. In an implementation, although the vehicle surrounding image displayed by the vehicle display apparatus 100 includes the around view image and the 3D around view image as representative images, the implementation is not limited thereto.

In summary, the vehicle display apparatus 100 may acquire information about the change in outer appearance of the vehicle and change and display the vehicle image or the vehicle surrounding image to show the outer appearance of the vehicle, thereby assisting the user so that the user accurately recognizes the vehicle surrounding state.

Also, the vehicle display apparatus 100 may display an image sensing state when a non-sensing region occurs by interruption in photographing of the vehicle surroundings due to the change in outer appearance of the vehicle.

Also, the vehicle display apparatus may perform an advanced driver assistance system (ADAS) function or a self-driving function, particularly, an automatic parking function of the self-driving function. Here, the vehicle display apparatus 100 may perform the self-driving function in consideration of the change in outer appearance of the vehicle and the distortion of the vehicle surrounding images due to the change in outer appearance of the vehicle, and thus, the vehicle may be more safely self-driven.

Hereinafter, each of components of the vehicle display apparatus 100 will be described in detail.

Referring to FIG. 2, the vehicle display apparatus 100 may include an input unit 110, a communication unit 120, an interface 130, a sensor unit 155, a monitoring unit 165, a processor 170, a display unit 180, an audio output unit 185, and a power supply unit 190. However, the units of the vehicle display apparatus 100 of FIG. 2 are unnecessary to realize the vehicle display apparatus 100. Thus, the vehicle display apparatus 100 described in this specification may include additional components in addition to the above-described components, or a portion of the above-described components may be omitted.

Each component will now be described in detail. The vehicle display apparatus 100 may include the input unit 110 for receiving user input.

For example, a user may input setting/execution of the vehicle surrounding image display function and the self-driving function, which are provided by the vehicle display apparatus 100, or may input execution of power on/off of the vehicle display apparatus 100 through the input unit 110.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the vehicle display apparatus 100 may include the communication unit 120 for communicating with another vehicle 510, a terminal 600 and a server 500.

The communication unit 120 may receive changed information in outer appearance of the vehicle or vehicle surrounding information from an object mounted on the outside of the vehicle or a structure for mounting the object. Also, the vehicle display apparatus 100 may display the vehicle surrounding image on the basis of the changed information in outer appearance of the vehicle and the vehicle surrounding information and provide the self-driving function.

In detail, the communication unit 120 may receive at least one of position information, weather information and road traffic condition information (e.g., transport protocol experts group (TPEG), etc.) from the mobile terminal 600 and/or the server 500.

The communication unit 120 may receive traffic information from the server 500 having an intelligent traffic system (ITS). Here, the traffic information may include traffic signal information, lane information, vehicle surrounding information or position information.

In addition, the communication unit 120 may receive navigation information from the server 500 and/or the mobile terminal 600. Here, the navigation information may include at least one of map information related to vehicle driving, lane information, vehicle position information, set destination information and route information according to the destination.

For example, the communication unit 120 may receive the real-time position of the vehicle as the navigation information. In detail, the communication unit 120 may include a global positioning system (GPS) module and/or a Wi-Fi (Wireless Fidelity) module and acquire the position of the vehicle.

In addition, the communication unit 120 may receive driving information of the other vehicle 510 from the other vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the vehicle display apparatus 100 may pair with each other automatically or by executing a user application.

The communication unit 120 may exchange data with the other vehicle 510, the mobile terminal 600 or the server 500 in a wireless manner.

In detail, the communication unit 120 can perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

In addition, the vehicle display apparatus 100 may pair with the mobile terminal located inside the vehicle using a short-range communication method and wirelessly exchange data with the other vehicle 510 or the server 500 using a long-distance wireless communication module of the mobile terminal.

Next, the vehicle display apparatus 100 may include the interface 130 for receiving data of the vehicle and transmitting a signal processed or generated by the processor 170.

The interface 130 may receive information (the changed information in outer appearance of the vehicle) about changes in state of the vehicle moving parts from the vehicle moving parts and also receive the changed information in outer appearance of the vehicle or the vehicle surrounding information from an object mounted on the vehicle. The vehicle display apparatus 100 may display the vehicle surrounding image on the basis of the changed information in outer appearance of the vehicle and the vehicle surrounding information and provide the self-driving function.

In detail, the vehicle display apparatus 100 may receive at least one of driving information of another vehicle, navigation information and sensor information via the interface 130.

In addition, the vehicle display apparatus 100 may transmit a control signal for executing a driving assistance function or information generated by the vehicle display apparatus 100 to the controller 770 of the vehicle via the interface 130.

To this end, the interface 130 may perform data communication with at least one of the controller 770 of the vehicle, an audio-video-navigation (AVN) apparatus 400 and the sensing unit 760 using a wired or wireless communication method.

In detail, the interface 130 may receive navigation information by data communication with the controller 770, the AVN apparatus 400 and/or a separate navigation apparatus.

In addition, the interface 130 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, a door sensor, etc. The position module may include a GPS module for receiving GPS information.

The interface 130 may receive user input via the user input unit 110 of the vehicle. The interface 130 may receive user input from the input unit of the vehicle or via the controller 770. That is, when the input unit is provided in the vehicle, user input may be received via the interface 130.

In addition, the interface 130 may receive traffic information acquired from the server. The server 500 may be located at a traffic control surveillance center for controlling traffic. For example, when traffic information is received from the server 500 via the communication unit 120 of the vehicle, the interface 130 may receive traffic information from the controller 770.

Next, the memory 140 may store a variety of data for overall operation of the vehicle display apparatus 100, such as a program for processing or control of the controller 170.

In addition, the memory 140 may store data and commands for operation of the vehicle display apparatus 100 and a plurality of application programs or applications executed in the vehicle display apparatus 100. At least some of such application programs may be downloaded from an external server through wireless communication. At least one of such application programs may be installed in the vehicle display apparatus 100 upon release, in order to provide the basic function (e.g., the driver assistance information guide function) of the vehicle display apparatus 100.

Such application programs may be stored in the memory 140 and may be executed to perform operation (or function) of the vehicle display apparatus 100 by the processor 170.

The memory 140 may store data for checking an object included in an image. For example, the memory 140 may store data for checking a predetermined object using a predetermined algorithm when the predetermined object is detected from an image of the vicinity of the vehicle acquired through the camera 160.

For example, the memory 140 may store data for checking the object using the predetermined algorithm when the predetermined algorithm such as a lane, a traffic sign, a two-wheeled vehicle and a pedestrian is included in an image acquired through the camera 160.

The memory 140 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the vehicle display apparatus 100 may operate in association with a network storage for performing a storage function of the memory 140 over the Internet.

Next, the monitoring unit 165 may acquire information on the internal state of the vehicle.

In some implementations, the monitoring unit 165 may be a driver status monitoring camera (DSM) and photograph the inside of the vehicle to acquire a vehicle interior image. The vehicle display apparatus 100 may detect a vehicle passing object through the vehicle interior image.

Next, the vehicle display apparatus 100 may further include the sensor unit 155 for sensing objects located in the vicinity of the vehicle. The vehicle display apparatus 100 may include the sensor unit 155 for sensing peripheral objects and may receive the sensor information obtained by the sensor unit 155 of the vehicle via the interface 130. The acquired sensor information may be included in the information on the vehicle surrounding information.

Also, the sensor information acquired as described above may be included in the changed information in outer appearance of the vehicle or the vehicle surrounding information.

The sensor unit 155 may include at least one of a distance sensor 150 for sensing the position of an object located in the vicinity of the vehicle and a camera 160 for capturing the image of the vicinity of the vehicle.

First, the distance sensor 150 may accurately sense the position of the object located in the vicinity of the vehicle, a distance between the object and the vehicle, a movement direction of the object, etc. The distance sensor 150 may continuously measure the position of the sensed object to accurately sense change in positional relationship with the vehicle.

The distance sensor 150 may sense the object located in at least one of the front, rear, left and right areas of the vehicle. The distance sensor 150 may be provided at various positions of the vehicle.

Figure 3:
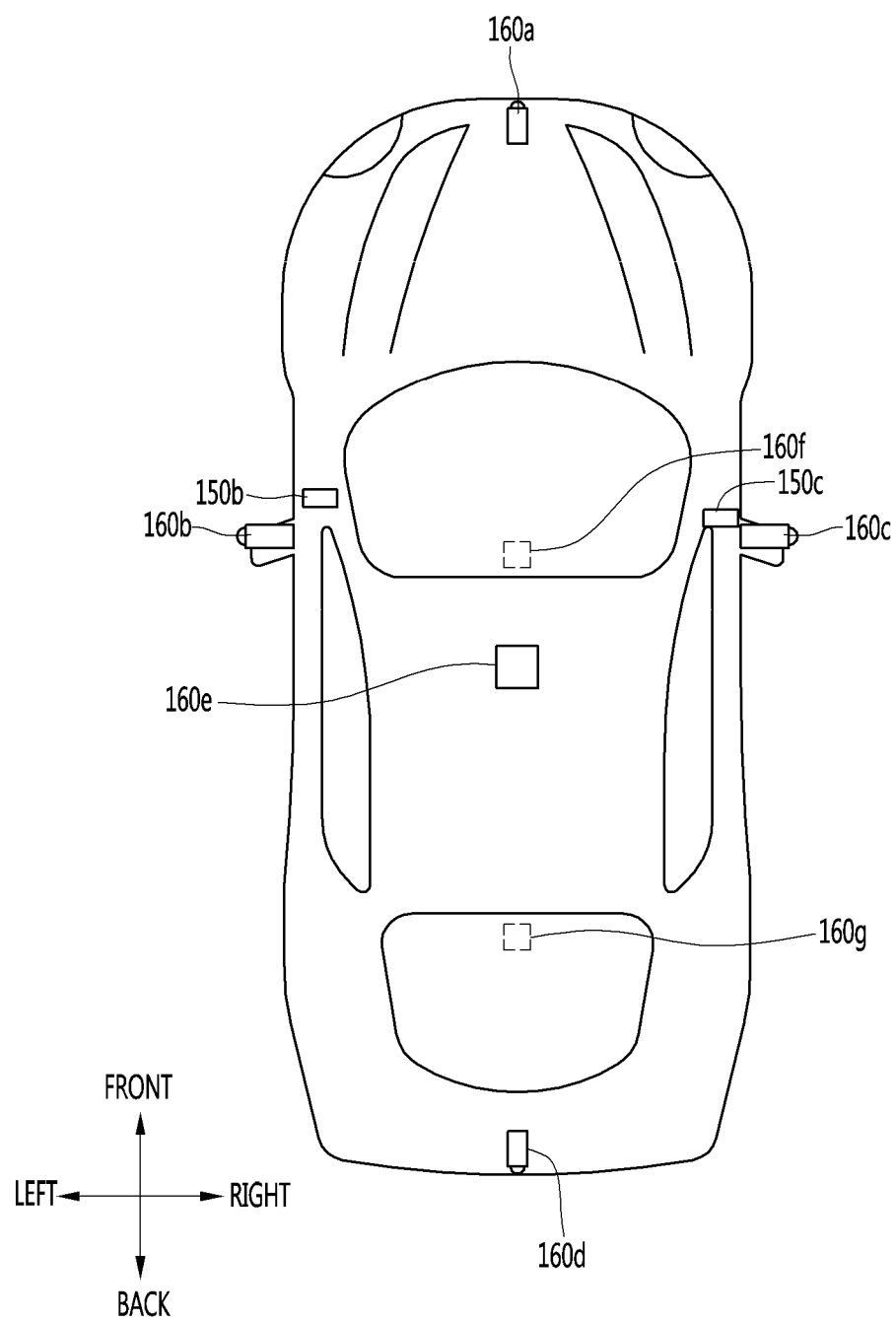
FIG. 3 is a diagram illustrating an example exterior of a vehicle including an example vehicle display apparatus.

FIG. 3 illustrates an example exterior of a vehicle including an example vehicle display apparatus. Referring to FIG. 3, the distance sensor 150 may be provided at at least one of the front, rear, left and right sides and ceiling of the vehicle.

The distance sensor 150 may include at least one of various distance measurement sensors such as a Lidar sensor, a laser sensor, an ultrasonic wave sensor and a stereo camera.

For example, the distance sensor 150 is a laser sensor and may accurately measure a positional relationship between the vehicle and the object using a time-of-flight (TOF) and/or a phase-shift method according to a laser signal modulation method.

Information on the object may be acquired by analyzing the image captured by the camera 160 at the processor 170.

In detail, the vehicle display apparatus 100 may capture the image of the vicinity of the vehicle using the camera 160, analyze the image of the vicinity of the vehicle using the processor 170, detect the object located in the vicinity of the vehicle, determine the attributes of the object and generate sensor information.

The image information is at least one of the type of the object, traffic signal information indicated by the object, the distance between the object and the vehicle and the position of the object and may be included in the sensor information.

In detail, the processor 170 may detect the object from the captured image via image processing, track the object, measure the distance from the object, and check the object to analyze the object, thereby generating image information.

The camera 160 may be provided at various positions.

In detail, the camera 160 may include an internal camera 160*f* for capturing an image of the front side of the vehicle within the vehicle and acquiring a front image.

Referring to FIG. 3, a plurality of cameras 160 may be provided at least one of the front, rear, right and left and ceiling of the vehicle.

In detail, the left camera 160*b* may be provided inside a case surrounding a left side view mirror. Alternatively, the left camera 160*b* may be provided outside the case surrounding the left side view mirror. Alternatively, the left camera 160*b* may be provided in one of a left front door, a left rear door or an outer area of a left fender.

The right camera 160*c* may be provided inside a case surrounding a right side view mirror. Alternatively, the right camera 160*c* may be provided outside the case surrounding the right side view mirror. Alternatively, the right camera 160*c* may be provided in one of a right front door, a right rear door or an outer area of a right fender.

In addition, the rear camera 160*d* may be provided in the vicinity of a rear license plate or a trunk switch. The front camera 160*a* may be provided in the vicinity of an emblem or a radiator grill.

The processor 170 may synthesize images captured in all directions and provide an around view image viewed from the top of the vehicle. Upon generating the around view image, boundary portions between the image regions occur. Such boundary portions may be subjected to image blending for natural display.

In addition, the ceiling camera 160*e* may be provided on the ceiling of the vehicle to capture the image of the vehicle in all directions.

The camera 160 may directly include an image sensor and an image processing module. The camera 160 may process a still image or a moving image obtained by the image sensor (e.g., CMOS or CCD). In addition, the image processing module processes the still image or the moving image acquired through the image sensor, extracts necessary image information, and delivers the extracted image information to the processor 170.

In order to enable the processor 170 to more easily perform object analysis, for example, the camera 160 may be a stereo camera for capturing an image and, at the same time, measuring a distance from an object.

The sensor unit 155 may be a stereo camera including the distance sensor 150 and the camera 160. That is, the stereo camera may acquire an image and, at the same time, sense a positional relationship with the object.

Figure 4:
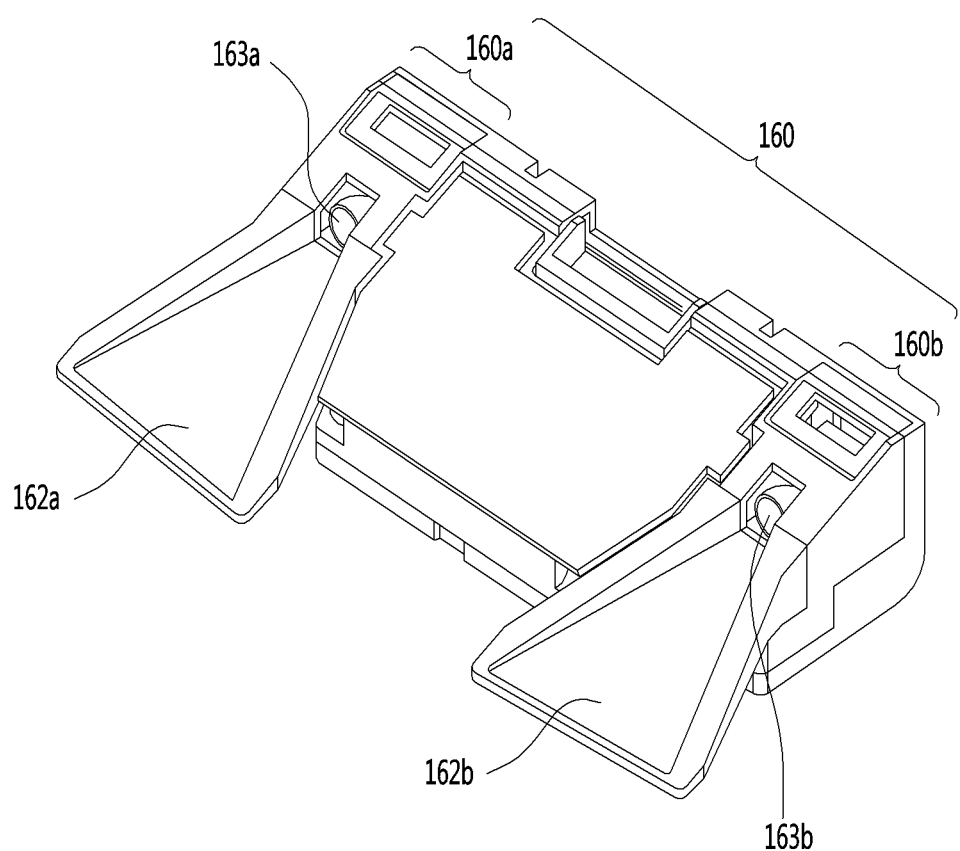
FIG. 4 is a diagram illustrating an example camera for a vehicle.
Figure 5:
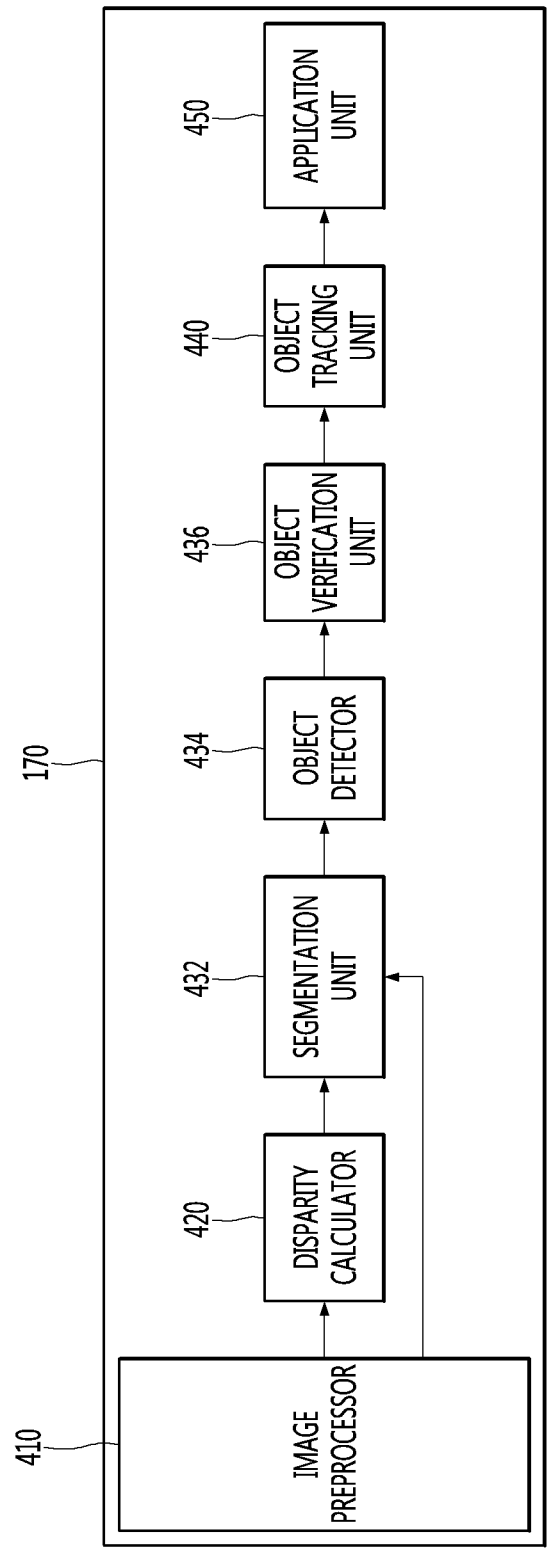
FIGS. 5 and 6 are diagrams illustrating an example method for generating image information based on an image acquired by a camera.
Figure 6:
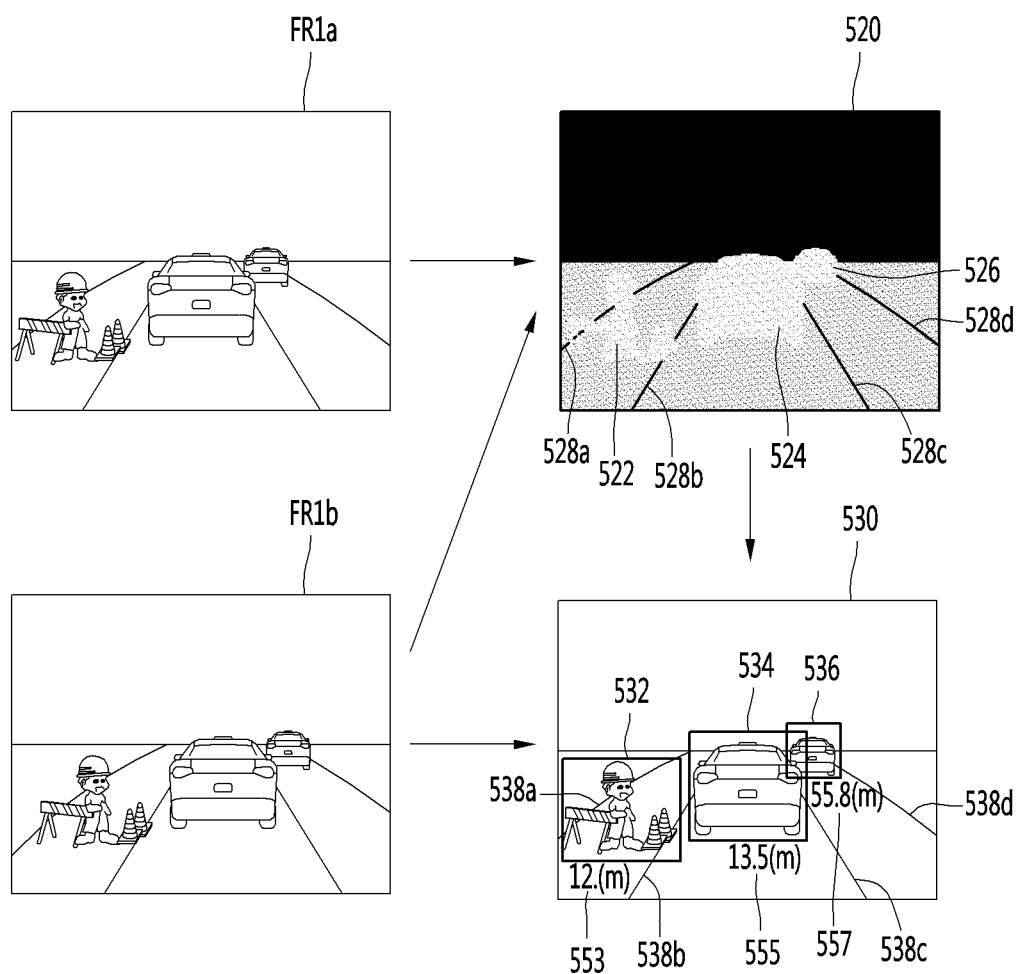

FIG. 4 illustrates an example camera for a vehicle. FIGS. 5 and 6 illustrate an example method for generating image information based on an image acquired by a camera.

Hereinafter, referring to FIGS. 4 to 6, the stereo camera and a method of detecting image information by the processor 170 using the stereo camera will be described in greater detail.

First, referring to FIG. 4, the stereo camera 160 may include a first camera 160*a* including a first lens 163*a* and a second camera 160*b* including a second lens 163*b*.

The vehicle display apparatus 100 may further include first and second light shield units 162*a* and 162*b* for shielding light incident upon the first and second lenses 163*a* and 163*b*.

The vehicle display apparatus 100 may acquire stereo images of the vicinity of the vehicle from the first and second cameras 160*a* and 160*b*, detect disparity based on the stereo images, detect an object from at least one stereo image, and continuously track movement of the object after object detection.

Referring to FIG. 5, as one example of the block diagram of the internal configuration of the processor 170, the processor 170 of the vehicle display apparatus 100 may include an image preprocessor 410, a disparity calculator 420, an object detector 434, an object tracking unit 440 and an application unit 450. Although an image is processed in order of the image preprocessor 410, the disparity calculator 420, the object detector 434, the object tracking unit 440 and the application unit 450 in FIG. 5 and the following description, the present disclosure is not limited thereto.

The image preprocessor 410 may receive an image from the camera 160 and perform preprocessing.

In detail, the image preprocessor 410 may perform noise reduction, rectification, calibration, color enhancement, color space conversion (CSC), interpolation, camera gain control, etc. of the image. An image having definition higher than that of the stereo image captured by the camera 160 may be acquired.

The disparity calculator 420 may receive the images processed by the image preprocessor 410, perform stereo matching of the received images, and acquire a disparity map according to stereo matching. That is, disparity information of the stereo image of the front side of the vehicle may be acquired.

At this time, stereo matching may be performed in units of pixels of the stereo images or predetermined block units. The disparity map may refer to a map indicating the numerical value of binocular parallax information of the stereo images, that is, the left and right images.

The segmentation unit 432 may perform segmentation and clustering with respect to at least one image based on the disparity information from the disparity calculator 420.

In detail, the segmentation unit 432 may segment at least one stereo image into a background and a foreground based on the disparity information.

For example, an area in which the disparity information is less than or equal to a predetermined value within the disparity map may be calculated as the background and excluded. Therefore, the foreground may be segmented. As another example, an area in which the disparity information is greater than or equal to a predetermined value within the disparity map may be calculated as the foreground and extracted. Therefore, the foreground may be segmented.

The background and the foreground may be segmented based on the disparity information extracted based on the stereo images to reduce signal processing speed, the amount of processed signals, etc. upon object detection.

Next, the object detector 434 may detect the object based on the image segment from the segmentation unit 432.

That is, the object detector 434 may detect the object from at least one image based on the disparity information.

In detail, the object detector 434 may detect the object from at least one image. For example, the object may be detected from the foreground segmented by image segmentation.

Next, the object verification unit 436 may classify and verify the segmented object.

To this end, the object verification unit 436 may use an identification method using a neural network, a support vector machine (SVM) method, an identification method by AdaBoost using Haar-like features or a histograms of oriented gradients (HOG) method. The object verification unit 436 may compare the objects stored in the memory 140 and the detected object and verify the object.

For example, the object verification unit 436 may verify a peripheral vehicle, a lane, a road surface, a traffic sign, a danger zone, a tunnel, etc. located in the vicinity of the vehicle.

The object tracking unit 440 may track the verified object. For example, the objects in the sequentially acquired stereo images may be verified, motion or motion vectors of the verified objects may be calculated and motion of the objects may be tracked based on the calculated motion or motion vectors. A peripheral vehicle, a lane, a road surface, a traffic sign, a danger zone, a tunnel, etc. located in the vicinity of the vehicle may be tracked.

Next, the application unit 450 may calculate a degree of risk, etc. based on various objects located in the vicinity of the vehicle, for example, another vehicle, a lane, a road surface, a traffic sign, etc. In addition, possibility of collision with a preceding vehicle, whether a vehicle slips, etc. may be calculated.

The application unit 450 may output a message indicating such information to the user as driver assistance information based on the calculated degree of risk, possibility of collision or slip. Alternatively, a control signal for vehicle attitude control or driving control may be generated as vehicle control information.

The image preprocessor 410, the disparity calculator 420, the segmentation unit 432, the object detector 434, the object verification unit 436, the object tracking unit 440 and the application unit 450 may be included in the image processor (see FIG. 5) of the processor 170.

In some implementations, the processor 170 may include only some of the image preprocessor 410, the disparity calculator 420, the segmentation unit 432, the object detector 434, the object verification unit 436, the object tracking unit 440 and the application unit 450. If the camera 160 includes a mono camera 160 or an around view camera 160, the disparity calculator 420 may be excluded. In some implementations, the segmentation unit 432 may be excluded.

Referring to FIG. 6, during a first frame period, the camera 160 may acquire stereo images.

The disparity calculator 420 of the processor 170 receives stereo images FR1a and FR1b processed by the image preprocessor 410, performs stereo matching with respect to the stereo images FR1a and FR1b and acquires a disparity map 520.

The disparity map 520 indicates the levels of binocular parallax between the stereo images FR1a and FR1b. As a disparity level increases, a distance from a vehicle may decrease and, as the disparity level decreases, the distance from the vehicle may increase.

When such a disparity map is displayed, luminance may increase as the disparity level increases and decrease as the disparity level decreases.

In the figure, disparity levels respectively corresponding to first to fourth lanes 528a, 528b, 528c and 528d and disparity levels respectively corresponding to a construction area 522, a first preceding vehicle 524 and a second preceding vehicle 526 are included in the disparity map 520.

The segmentation unit 432, the object detector 434 and the object verification unit 436 may perform segmentation, object detection and object verification with respect to at least one of the stereo images FR1a and FR1b based on the disparity map 520.

In the figure, object detection and verification are performed with respect to the second stereo image FR1b using the disparity map 520.

That is, object detection and verification are performed with respect to the first to fourth lanes 538a, 538b, 538c and 538d, the construction area 532, the first preceding vehicle 534 and the second preceding vehicle 536 of the image 530.

With image processing, the vehicle display apparatus 100 may acquire various surrounding information of the vehicle, such as peripheral objects or the positions of the peripheral objects, using the sensor unit 155, as sensor information.

Next, the vehicle display apparatus 100 may further include the display unit displaying the vehicle surrounding image.

The display unit may display the vehicle surrounding image that shows the change in outer appearance of the vehicle to accurately transmit the vehicle surrounding information to the user.

The display unit 180 may include a plurality of displays.

In detail, the display unit 180 may include a first display 180a for projecting and displaying a graphic image onto and on a vehicle windshield W. That is, the first display 180a is a head up display (HUD) and may include a projection module for projecting the graphic image onto the windshield W. The graphic image projected by the projection module may have predetermined transparency. Accordingly, a user may simultaneously view the front and rear sides of the graphic image.

The graphic image may overlap the image projected onto the windshield W to achieve augmented reality (AR).

The display unit may include a second display 180b separately provided inside the vehicle to display an image of the driving assistance function.

In detail, the second display 180b may be a display of a vehicle navigation apparatus or a cluster located at an internal front side of the vehicle.

The second display 180b may include at least one selected from among a Liquid Crystal Display (LCD), a Thin Film Transistor LCD (TFT LCD), an Organic Light Emitting Diode (OLED), a flexible display, a 3D display, and an e-ink display.

The second display 180b may be combined with a touch input unit to achieve a touch screen.

Next, the audio output unit 185 may audibly output a message for explaining the function of the vehicle display apparatus 100 and checking whether the driving assistance function is performed. That is, the vehicle display apparatus 100 may provide explanation of the function of the vehicle display apparatus 100 via visual display of the display unit 180 and audio output of the audio output unit 185.

Next, the haptic output unit may output an alarm for the driving assistance function in a haptic manner. For example, the vehicle display apparatus 100 may output vibration to the user when a warning is included in at least one of navigation information, traffic information, communication information, vehicle state information, advanced driver assistance system (ADAS) function and other driver convenience information.

The haptic output unit may provide directional vibration. For example, the haptic output unit may be provided in a steering apparatus for controlling steering to output vibration. Left or right vibration may be output according to the left and right sides of the steering apparatus to enable directional haptic output.

In addition, the power supply unit 190 may receive power and supply power necessary for operation of the components under control of the processor 170.

Lastly, the vehicle display apparatus 100 may include the processor 170 for controlling overall operation of the units of the vehicle display apparatus 100.

In addition, the processor 170 may control at least some of the components described with reference to FIG. 3 in order to execute the application program. Further, the processor 170 may operate by combining at least two of the components included in the vehicle display apparatus 100, in order to execute the application program.

The processor 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, and electric units for the implementation of other functions.

The processor 170 may be controlled by the controller or may control various functions of the vehicle through the controller.

The processor 170 may control overall operation of the vehicle display apparatus 100 in addition to operation related to the application programs stored in the memory 140. The processor 170 may process signals, data, information, etc. via the above-described components or execute the application programs stored in the memory 140 to provide appropriate information or functions to the user.

Hereinafter, a process of providing the vehicle surrounding image display function, the vehicle driving assistance function, and the self-driving function by controlling the above-described components through the processor will be described in detail.

FIG. 8 is a flowchart illustrating an example method for providing a self-driving function for a vehicle. Referring to FIG. 8, first, the processor 170 may detect a change in outer appearance of the vehicle. (S101)

In detail, the processor 170 may acquire information about a change in outer appearance of the vehicle from at least one of the sensor unit 155, the monitoring unit 165, the interface 130, and the communication unit 120.

Here, the information about the change in outer appearance of the vehicle (hereinafter, referred to as the vehicle appearance change information) may include an appearance change kind, an appearance change position, an appearance change degree, and an appearance change object.

In more detail, the processor 170 may determine whether the vehicle appearance change kind corresponds to a vehicle moving part state change, a vehicle external object is mounted, and an object passing through a vehicle window is detected from the vehicle appearance change information.

For example, the processor 170 may acquire state change information about the vehicle moving parts through the communication unit or the interface 130. That is, the processor 170 may accurately acquire vehicle appearance change information with respect to a degree of a state change of any vehicle moving part.

Also, the processor 170 may directly photograph or sense the object mounted on the outside of the vehicle by using the sensor unit 155 to acquire the vehicle appearance change information about a mounted position, size, and kind of the object. Also, the processor 170 may acquire vehicle appearance change information and vehicle surrounding information by communication with the mounted object or a structure for fixing the object through the interface 130 or the communication unit. Also, the processor 170 may read information about the mounted object, which is stored in the memory 140, to acquire the vehicle appearance change information.

Also, the processor 170 may acquire vehicle appearance change information about an object protruding to the outside of the vehicle through the monitoring unit 165 and the sensor unit 155. In detail, the processor 170 may accurately acquire vehicle appearance change information due to the vehicle passing object through a vehicle interior image of the monitoring unit 165 photographing the inside of the vehicle in addition to the sensor unit 155 sensing the outside of the vehicle.

The processor 170 acquiring the vehicle appearance change information may control the display unit 180 to display a vehicle appearance change on the basis of the vehicle appearance change information. (S102)

In detail, the processor 170 may generate a vehicle surrounding image including a vehicle image by reflecting the vehicle appearance change information to display the vehicle surrounding image through the display unit 180. For example, the processor 170 may generate an around view image or a 3D around view image.

In more detail, the processor 170 may generate a vehicle surrounding image including a vehicle image to which the appearance change kind, the appearance change position, the appearance change degree, and the appearance change object are reflected. For example, when an open of a vehicle door is detected, the processor 170 may generate a vehicle image having a door open image matching an actual open angle G.

Also, the processor 170 may generate a vehicle surrounding image including a graphic image that shows a vehicle mounted object on the basis of a position, size, kind, property, and the like of the vehicle mounted object.

Also, the processor 170 may generate a vehicle surrounding image including a graphic image that shows a vehicle passing object on the basis of a position, size, kind, property, and the like of the vehicle passing object.

Particularly, the processor 170 may correct distortion generated in the vehicle surrounding image by the vehicle appearance change to generate a vehicle surrounding image.

For example, the camera 160 may be moved in position or changed in photographing direction due to the change in state of the vehicle moving parts. In addition, the photographing itself of the camera 160 may be stopped to interrupt the photographing of the camera 160. Thus, a portion of the surroundings of the vehicle may be image-sensed.

The processor 170 may generate a vehicle surrounding image by previously determining and considering the distortion of the vehicle surrounding image through the photographed image of the camera 160 or the vehicle appearance change information.

In detail, since an image in which the distortion occurs is unreliable, the processor 170 may generate the vehicle surrounding image except for the distorted image. For example, when the distortion occurs in a vehicle left image, the processor 170 may generate the around view image except for the vehicle left image.

Furthermore, the processor 170 may correct the distortion of the image to generate the vehicle surrounding image. In detail, the processor 170 may acquire an image, in which the distortion does not occur, by using a separate auxiliary camera 160 and replace the distorted image with the acquired image to generate the around view image.

As described above, the processor 170 may accurately show the vehicle appearance change on the vehicle surrounding image including the vehicle image, but simply show the vehicle appearance change on the image showing the vehicle state to assist the user so that the user accurately recognizes the vehicle surrounding situation. Also, the processor 170 may generate the vehicle surrounding image in consideration of the occurrence of the distortion of the vehicle surrounding image due to the vehicle appearance change to accurately provide information about the vehicle surrounding state to the user.

Also, the processor 170 may reflect the vehicle appearance change information to execute the vehicle driving assistance function and the self-driving function. (S103)

Hereinafter, the automatic parking function of the self-driving function will be representatively described.

The processor 170 may reflect the vehicle appearance change to perform the automatic parking function.

The processor 170 may stop the automatic parking function when it is determined that the vehicle driving in a state in which the vehicle appearance is changed is dangerous.

Also, the processor 170 may change a vehicle boundary range according to the vehicle appearance change and control the driving of the vehicle according to the changed vehicle boundary range. For example, the processor 170 may determine whether vehicle collision occurs on the basis of the changed vehicle boundary range and stop the driving of the vehicle if a collision risk exists.

Also, the processor 170 may determine a parking manner according to the vehicle appearance change. For example, the processor 170 may design a parking path in a parking manner in which the vehicle is parked in advance when vehicle rear photographing is interrupted by the change of the vehicle appearance so that the vehicle is safely and automatically parked.

Also, the processor 170 may differently design the parking path according to the vehicle appearance change. For example, the processor 170 may design a parking path in which a vehicle turning number, a parking time, and the like increase for safe parking when the vehicle boundary range is expanded by the vehicle appearance change. That is, the parking path may be differently designed before and after the vehicle appearance change. Also, the processor 170 may require restoration of the vehicle appearance change to the user by displaying the comparison information.

Hereinafter, a process of providing the vehicle surrounding image display function and the automatic parking function by the vehicle display apparatus 100 according to changes in state of the vehicle moving parts will be described in detail.

FIG. 9 is a flowchart illustrating an example method for providing a vehicle surrounding image display function based on changes in vehicle moving part. Referring to FIG. 9, the vehicle display apparatus 100 may detect changes in state of the vehicle moving parts.

In detail, state change information of the vehicle moving parts may be received from the interface 130, the communication unit 120, the sensors of the vehicle moving parts, or the control input units of the vehicle moving parts.

For example, the processor 170 may acquire information about changes of the vehicle moving parts such as a state change in which the side view mirror is folded or unfolded, a state change in which the door is opened or closed, a state change in which a sunroof is opened or closed, and a state change in which a trunk is opened or closed.

The vehicle display apparatus 100 may display the change information of the vehicle moving parts when the information of the state changes of the vehicle moving parts are received. (S202)

In detail, the vehicle display apparatus 100 may display the vehicle surrounding image. The vehicle surrounding image may be an image including the vehicle image and the vehicle surrounding image.

Figure 19:
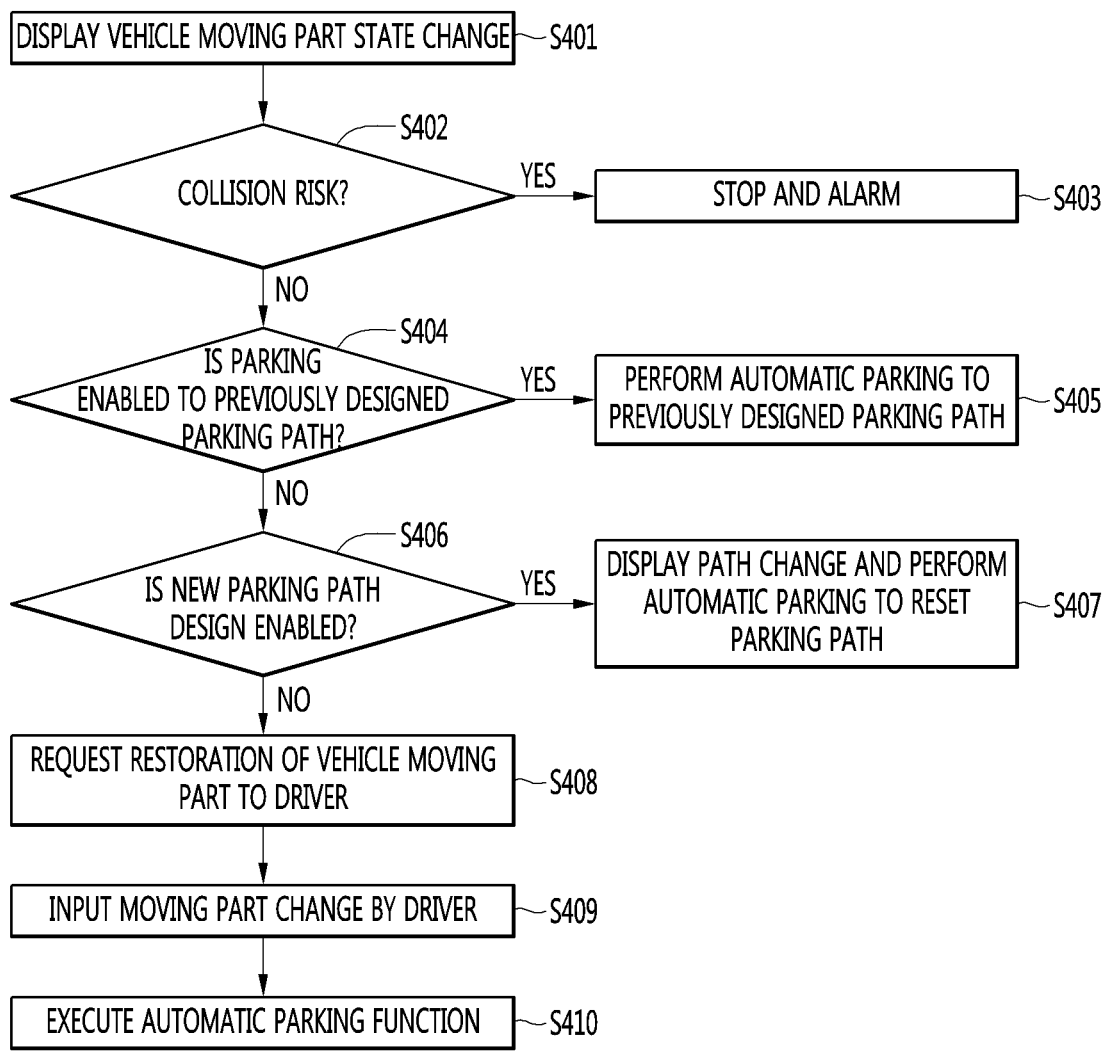
FIG. 19 is a flowchart illustrating an example method for executing an automatic parking function in a state in which vehicle moving parts are changed during the execution of the automatic parking function.

In some implementations, the vehicle surrounding image may be an around view image. Referring to FIG. 19, the vehicle surrounding image may be an around view image that is generated by matching images 160fi, 160bi, 160li, and 160ri obtained by photographing front/rear and left/right sides of the vehicles with a vehicle image 700i. Here, the vehicle image 700i may be a vehicle graphic image stored in the memory 140, but is not limited thereto.

The processor 170 may display the vehicle surrounding image so that the vehicle surrounding image shows the state changes of the vehicle moving parts.

For example, the processor 170 may generate and display a vehicle surrounding image including a virtual vehicle image 700i in which the vehicle moving parts are changed in state.

Here, the processor 170 may generate the vehicle image 700i to show a degree of each of the state changes of the vehicle moving parts.

The state changes of the vehicle moving parts may include a state change in which the vehicle moving parts are locked or unlocked in addition to the change of the vehicle appearance.

Figure 11:
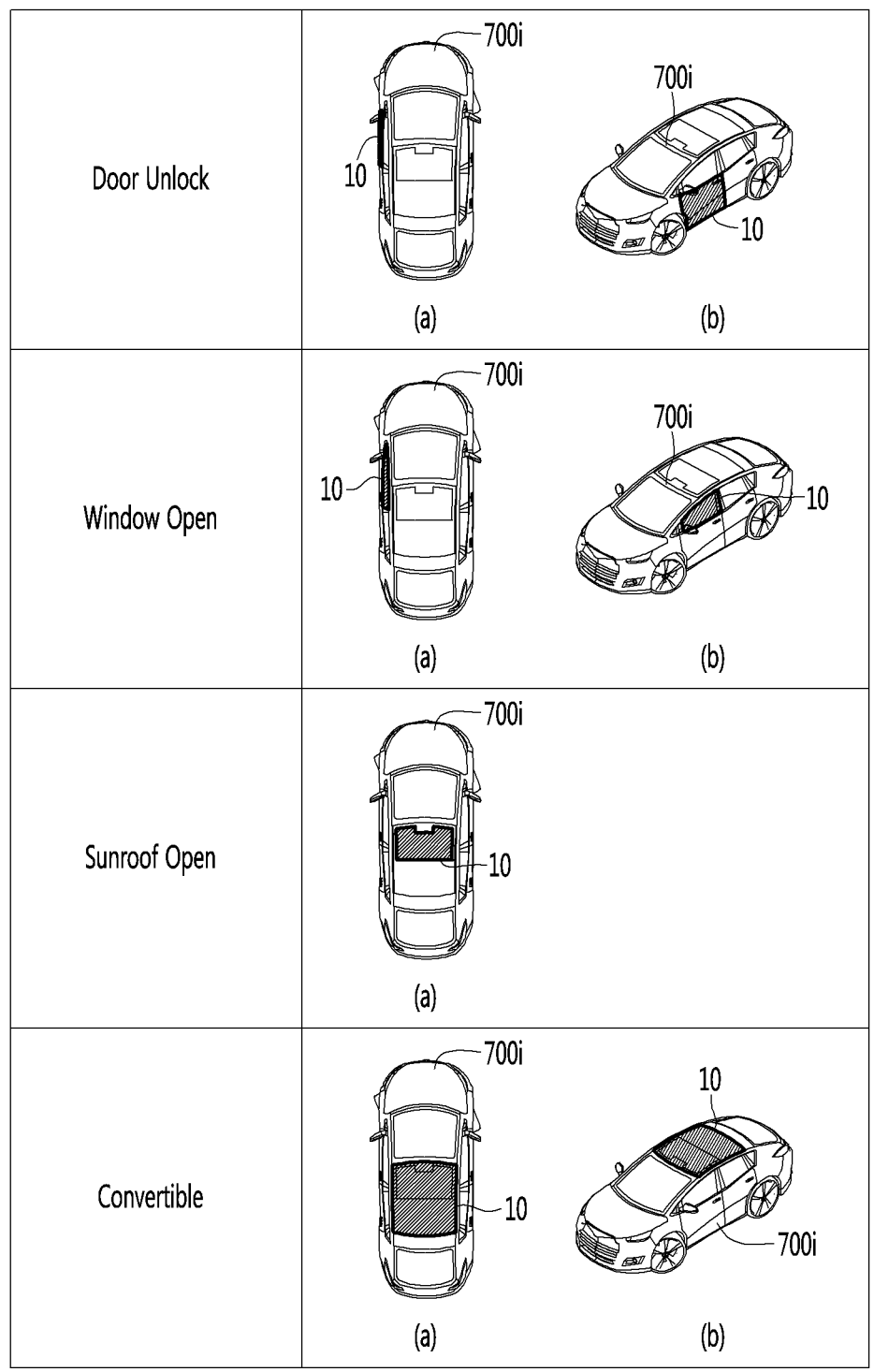
FIG. 11 is a diagram illustrating an example table representing one or more vehicle images in a state in which vehicle moving parts are changed without changing outer appearance of the vehicle.

FIG. 11 illustrates an example table representing one or more vehicle images in a state in which vehicle moving parts are changed without changing outer appearance of the vehicle.

Referring to FIG. 11, when the unlock of the door is detected, the vehicle display apparatus 100 may overlappingly display a highlight image 10 showing that the door is unlocked at a position of the unlocked door on the vehicle image 700i to display the unlock of the vehicle door.

Here, the vehicle display apparatus 100 may generate a 3D around view image at a time point of a view point at which the unlocked door is looked and overlappingly display a highlight image 10 at a position of the unlocked door to more instinctively provide the moving part state change information to the user.

Also, when the open of the window is detected, the vehicle display apparatus 100 may overlappingly display a highlight image 10 showing that the window is opened at a position of the opened window on the vehicle image 700i to generate an image so that an actually opened degree of the window of the vehicle image 700i is shown, thereby displaying that the window of the vehicle is opened.

Also, the vehicle display apparatus 100 may generate a 3D around view image at a time point of a view point at which the opened window is looked and overlappingly display a highlight image 10 at a position of the opened window to more instinctively provide the moving part state change information to the user.

Also, when the open of the sunroof is detected, the vehicle display apparatus 100 may overlappingly display a highlight image 10 showing that the sunroof is opened at a position of the sunroof on the vehicle image 700i to display the open of the vehicle sunroof.

Also, when the open of the vehicle cover is detected, the vehicle display apparatus 100 may overlappingly display a highlight image 10 showing that the vehicle cover is opened at a position of the opened vehicle cover on the vehicle image 700i to generate an image so that the cover is actually opened on the vehicle image 700i, thereby displaying that the vehicle cover is opened.

Also, the vehicle display apparatus 100 may generate a 3D around view image at a time point of a view point at which the opened vehicle cover is looked and overlappingly display a highlight image 10 at a position of the opened vehicle cover to more instinctively provide the moving part state change information to the user.

The vehicle display apparatus 100 may display the vehicle surrounding image by accurately reflecting a degree of each of the changes of the vehicle moving parts and also display a sensing state of the vehicle surrounding image due to the vehicle moving part state change.

Figure 12:
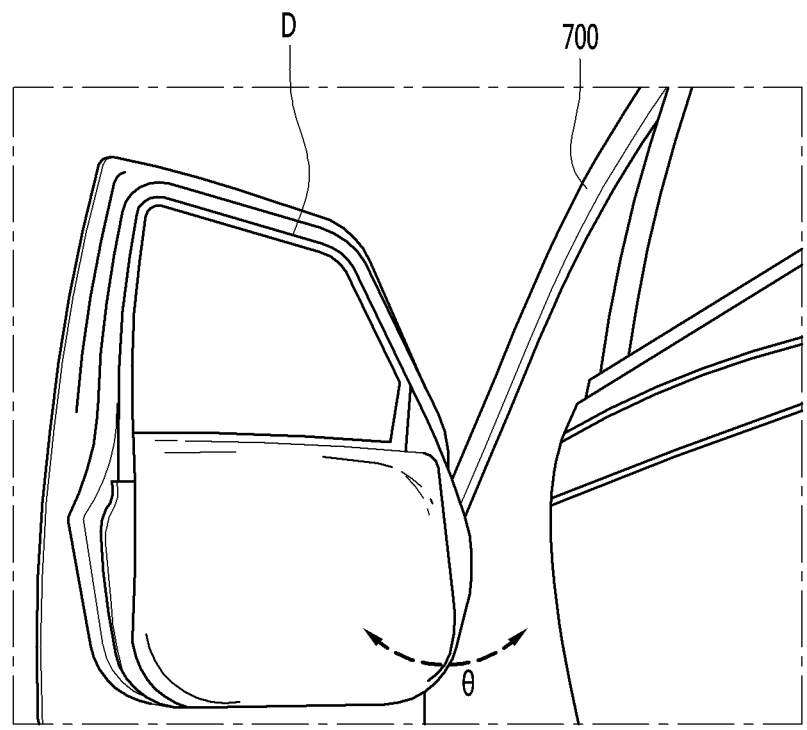
FIG. 12 is a diagram illustrating an example state in which a door that is one of the vehicle moving parts is opened.

FIG. 12 illustrates an example state in which a door that is one of the vehicle moving parts is opened. Referring to FIG. 12, when the door D is opened, the vehicle display apparatus 100 may acquire vehicle moving part state change information such as a position of the opened door D and an opened angle θ of the door D. Also, the vehicle display apparatus 100 may detect an occurrence of a black area, in which the left camera 160 photographing a left direction of the vehicle is changed in photographing direction or covered by the open of the left door of the vehicle so that the image sensing is unavailable, on a vehicle left image.

Figure 13:
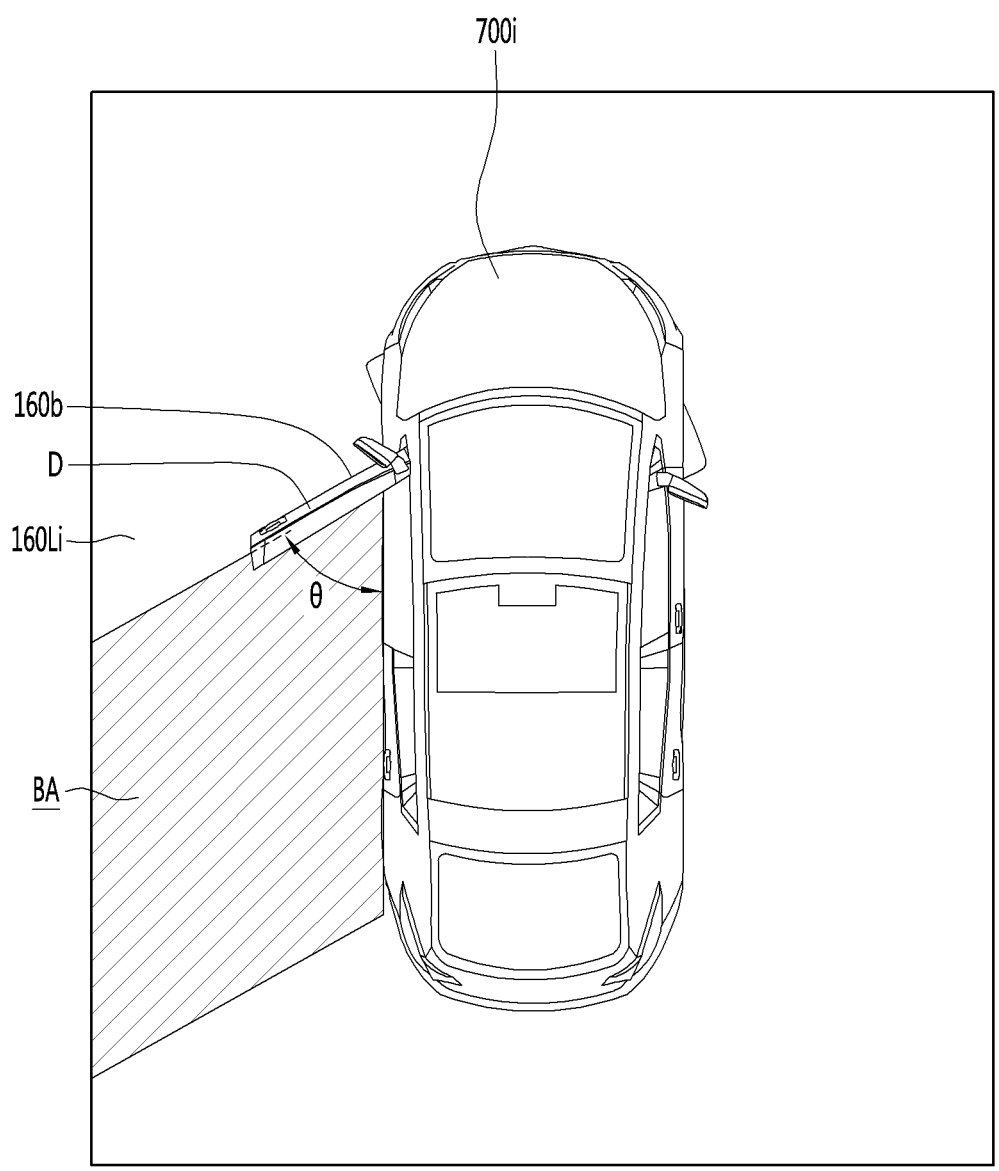
FIG. 13 is a diagram illustrating an example vehicle surrounding image in the state of FIG. 12.

FIG. 13 illustrates an example vehicle surrounding image in the state of FIG. 12. Referring to FIG. 13, the vehicle display apparatus 100 may change the door D of the vehicle image 700i to match an actual opened angle θ of the door D, thereby displaying the resultant image. Also, the vehicle display apparatus 100 may generate an image in which the black area BA that is unavailable in photographing is removed because it is difficult to photograph an area between the left door D of the vehicle and the vehicle due to the opened left door D of the vehicle, or the photographed image is covered by the door D.

That is, when the black area BA in which the sensing is unavailable occurs by the state changes of the vehicle moving parts, the vehicle display apparatus 100 may display the vehicle surrounding image to show the black area BA, thereby providing accurate information about the vehicle surrounding sensing situation to the user.

Figure 14A:
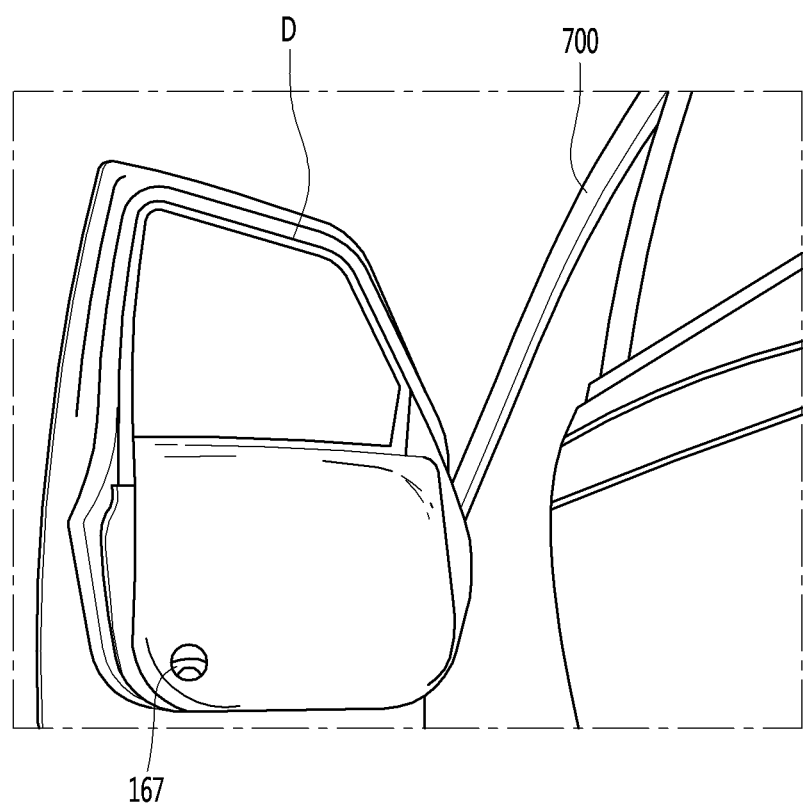
FIG. 14A is a diagram illustrating an example door auxiliary camera of a vehicle.
Figure 14B:
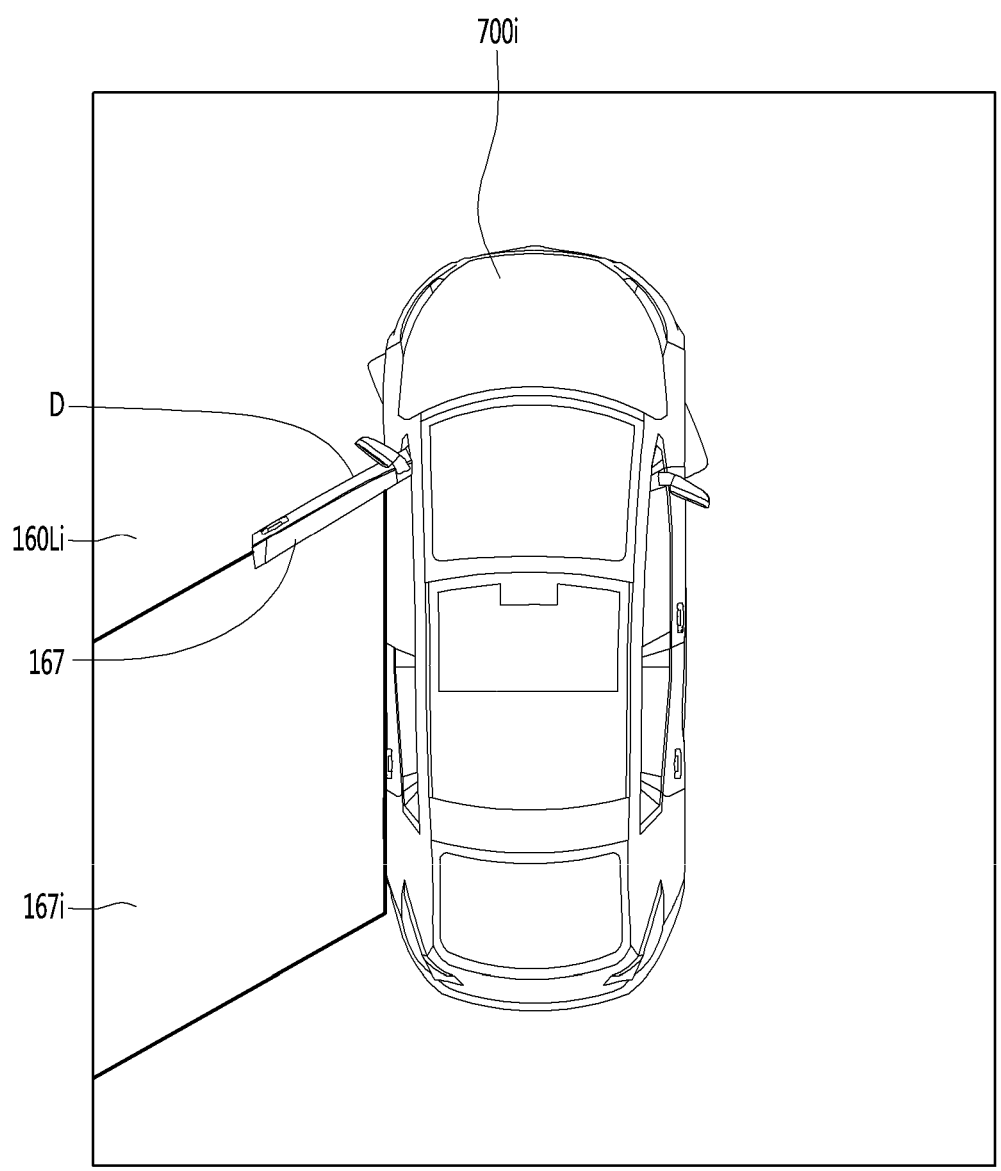
FIG. 14B is a diagram illustrating an example vehicle surrounding image including an image of the door auxiliary camera of FIG. 14A.

FIG. 14A illustrates an example door auxiliary camera of a vehicle. FIG. 14B illustrates an example vehicle surrounding image including an image of the door auxiliary camera of FIG. 14A. Referring to FIG. 14A, the vehicle display apparatus 100 may use an image of an auxiliary camera 167 installed on the door D to photograph the black area BA. That is, referring to FIG. 14B, the vehicle display apparatus 100 may photograph the black area BA by using the auxiliary camera 167 installed inside the door D to apply the photographed image 167i of the auxiliary camera 167 to the vehicle surrounding image, thereby providing the vehicle surrounding image obtained by photographing all directions of the vehicle to the user.

Figure 15:
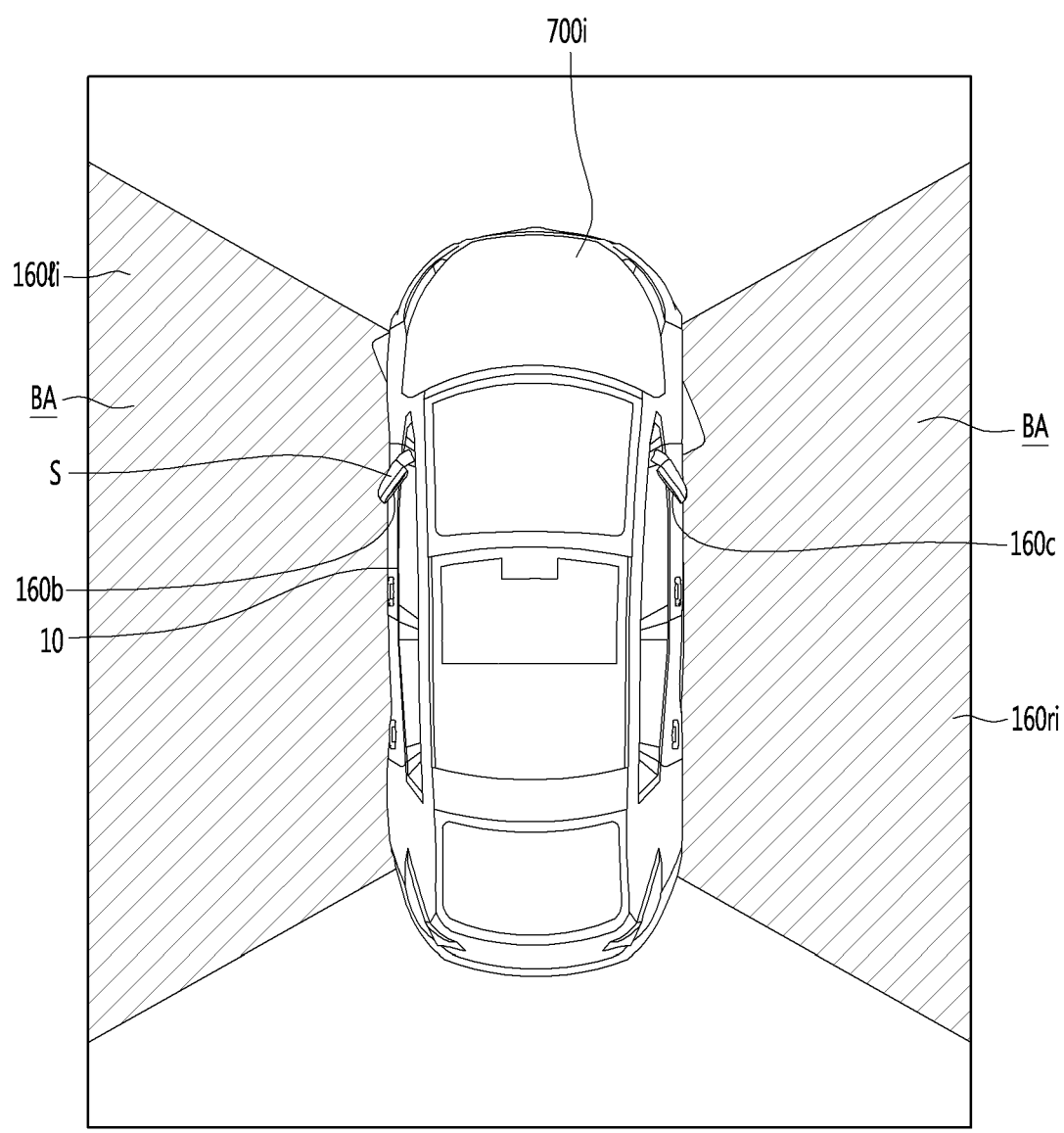
FIG. 15 is a diagram illustrating an example vehicle surrounding image in a state in which a side view mirror of a vehicle is folded.

FIG. 15 illustrates an example vehicle surrounding image in a state in which a side view mirror of a vehicle is folded. Referring to FIG. 15, when the side view mirror is folded, the vehicle display apparatus 100 may generate and display a vehicle image 700i in which the side view mirror is folded and overlappingly display a highlight image 10 in which the side view mirror portion is emphasized.

Also, when the left camera 160 and the right camera 160 are disposed on the side view mirrors, the vehicle display apparatus 100, since the left and right cameras 160 are changed in photographing direction, and thus, sensing of the left and right areas 160li and 160ri is unavailable, a vehicle surrounding image in which the left and right areas 160li and 160ri are black areas BA may be displayed.

That is, the vehicle display apparatus 100 may provide a vehicle surrounding image, which instinctively shows the state in which the side view mirror is folded and the unavailable left and right image sensing of the vehicle due to the folded side view mirror of the vehicle, to the user.

Figure 16:
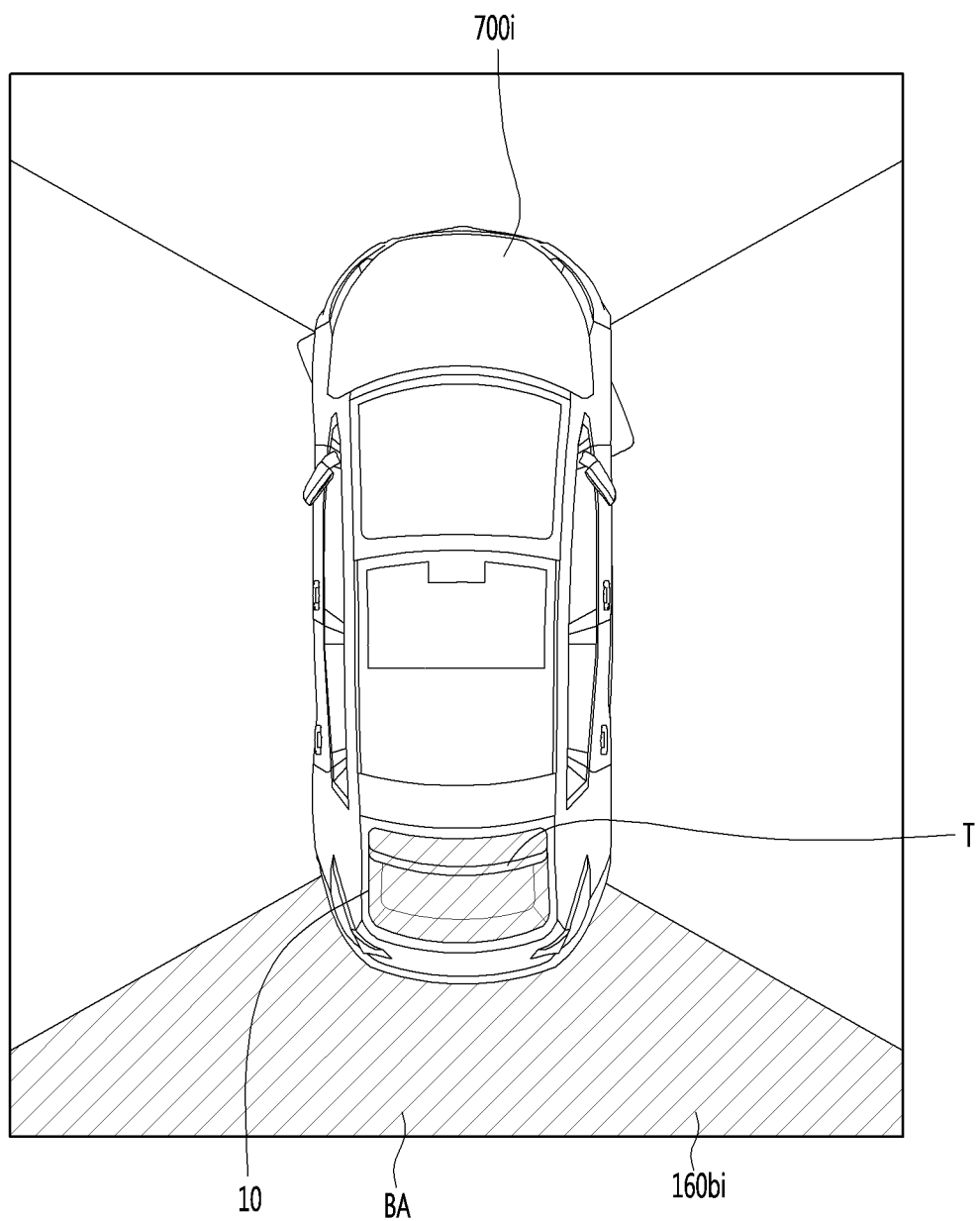
FIG. 16 is a diagram illustrating an example vehicle surrounding image in a state in which a trunk of a vehicle is opened.

FIG. 16 illustrates an example vehicle surrounding image in a state in which a trunk of a vehicle is opened. Referring to FIG. 16, when the trunk is opened, the vehicle display apparatus 100 may display a vehicle image 700i in which the trunk is opened and overlappingly display a highlight image 10 in which the trunk portion is emphasized.

Also, when the rear camera 160 is disposed on the vehicle trunk, the vehicle display apparatus 100 may display a vehicle surrounding image in which the rear area 160bi is the black area BA because the rear camera 160 is changed in photographing direction, and thus the sensing of the rear area 160bi of the vehicle is unavailable.

That is, the vehicle display apparatus 100 may provide a vehicle surrounding image, which instinctively shows the state in which the trunk is opened and the unavailable rear side sensing of the vehicle due to the opened trunk of the vehicle, to the user.

In the implementations described above, the vehicle display apparatus 100 may provide the vehicle surrounding image display function that display the vehicle moving part state change through the vehicle surrounding image. Since the vehicle surrounding image display function shows the vehicle surrounding image sensing situation due to the vehicle moving part change, the user may receive only the accurate sensing information.

Also, the vehicle display apparatus 100 may provide the automatic parking function to which the vehicle surrounding image information is reflected.

Figure 17:
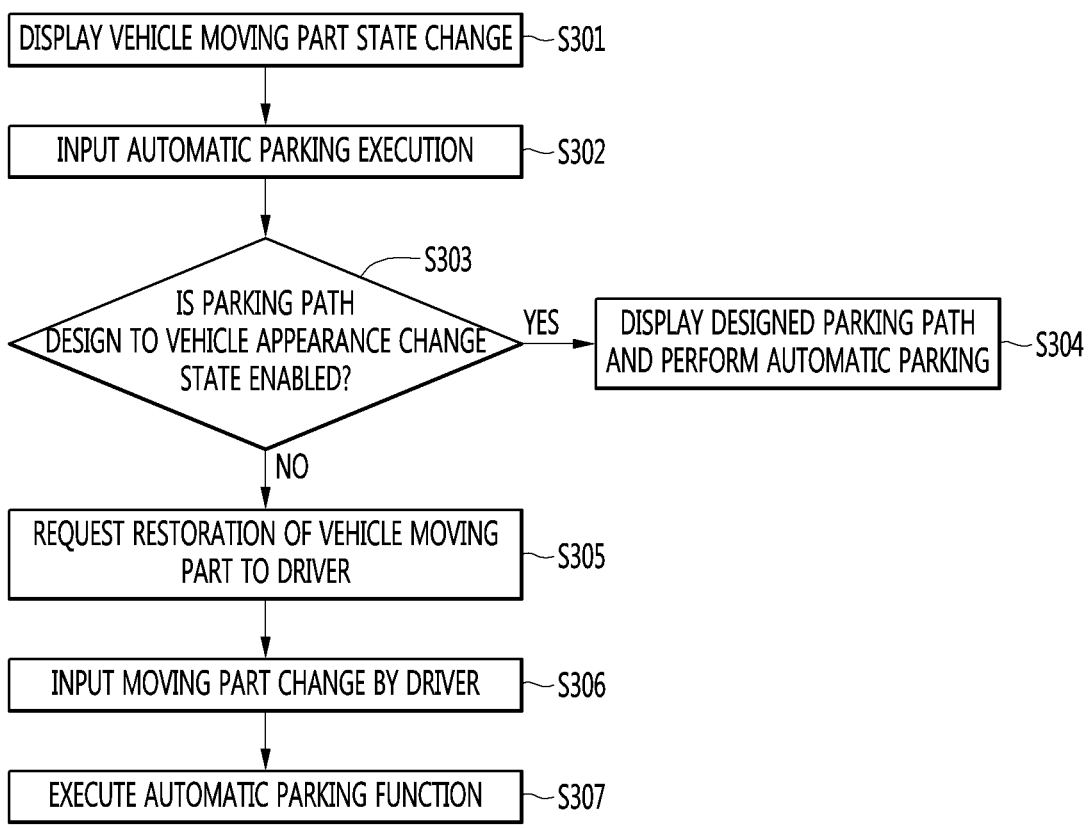
FIG. 17 is a flowchart illustrating an example method for executing an automatic parking function in a state vehicle moving parts are changed before the automatic parking function is performed.

FIG. 17 is a flowchart illustrating an example method for executing an automatic parking function in a state vehicle moving parts are changed before the automatic parking function is performed. Hereinafter, a process of providing the automatic parking function when the vehicle moving part change occurs before the automatic parking function is executed will be described in detail with reference to FIG. 17.

First, the vehicle display apparatus 100 may display the vehicle moving part state change as described above. (S301)

Also, in the state in which the vehicle moving part state change occurs, the vehicle display apparatus 100 may receive an automatic parking execution input. (S302)

The vehicle display apparatus 100 may determine whether the automatic parking is enabled in the state of the vehicle moving part state change. (S303)

In detail, the processor 170 may determine whether a design of the automatic parking path is enabled in the state in which the vehicle appearance is changed according to the vehicle moving part change.

When the design of the automatic parking path is enabled, the vehicle display apparatus 100 may display the designed parking path on the vehicle surrounding image, and thus, the vehicle may be automatically parked. (S304)

Here, the vehicle display apparatus 100 may perform the automatic parking function by reflecting the vehicle moving part state change. For example, the vehicle display apparatus 100 may expand the vehicle boundary range by the vehicle appearance change and stop the vehicle when a collision risk object approaches the expanded vehicle boundary range.

Also, in the vehicle display apparatus 100, the parking manner, the turning number, and the automatic parking performing time may be changed according to the vehicle moving part state change. For example, if the black area BA in which the sensing is unavailable exists due to the vehicle moving part state change, the vehicle display apparatus 100 may design a parking path along which the vehicle is not moved to the corresponding area.

Figure 18A:
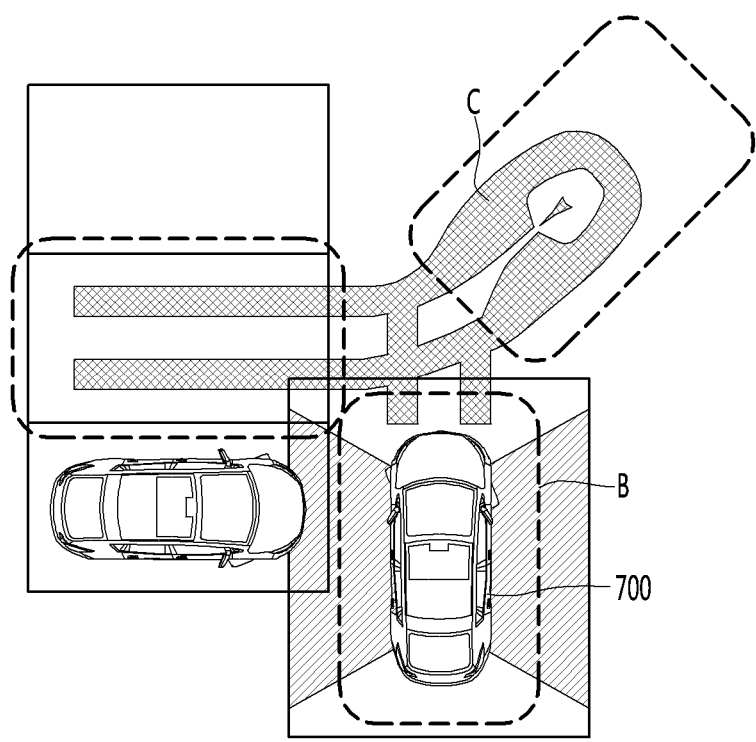
FIG. 18A is a diagram illustrating an example operation of the automatic parking function in a state in which vehicle moving parts are not changed.
Figure 18B:
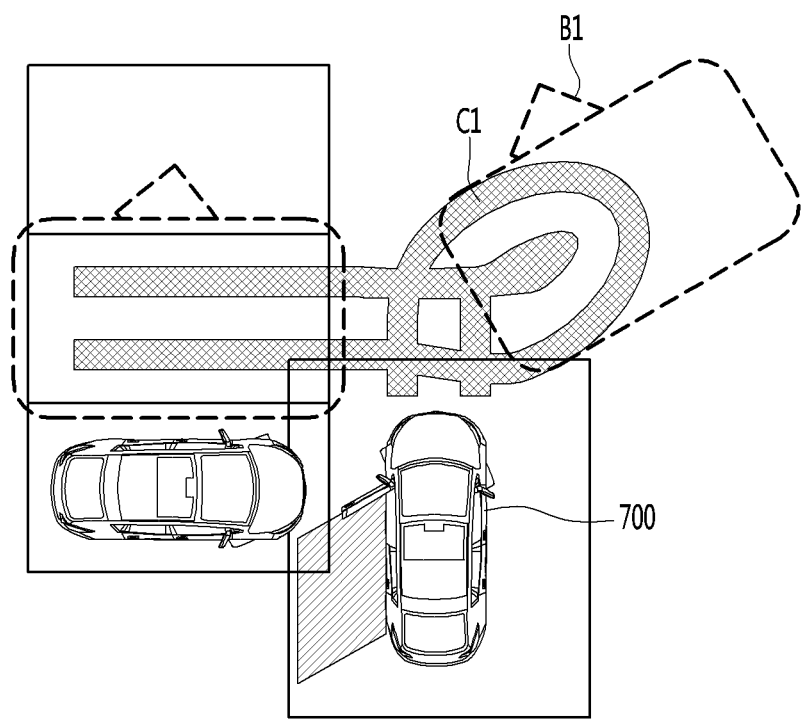
FIG. 18B is a diagram illustrating an example operation of the automatic parking function in a state in which the vehicle moving parts are changed.

FIG. 18A illustrates an example operation of the automatic parking function in a state in which vehicle moving parts are not changed. FIG. 18B illustrates an example operation of the automatic parking function in a state in which the vehicle moving parts are changed. In detail, referring to FIG. 18A, when the automatic parking function execution is inputted, the vehicle display apparatus 100 may design a parking path C to provide the automatic parking function by which the vehicle is driven along the parking path C to park the vehicle in a target parking space.

Referring to FIG. 18B, since the door of the vehicle is in the open state, the vehicle display apparatus 100 may set an area up to the vehicle door as a vehicle boundary range B1 and then design and display a parking path C1 for the automatic parking on the basis of the expanded vehicle boundary range B1. Also, since the vehicle boundary range B1 is expanded, the automatic parking time and the front and rear turning number may increase. The vehicle display apparatus 100 may display the increasing automatic parking time and turning number 20 so that the increasing automatic parking time and turning number 20 are compared together with each other.

When the driving is dangerous, or the design of the parking path is difficult due to the vehicle appearance change, the vehicle display apparatus 100 may request restoration of the vehicle moving part state to the user. (S305)

Thereafter, when the vehicle input part change or the automatic parking function execution is inputted again by the user, the vehicle display apparatus 100 may restore the vehicle moving part state to its original state and execute the automatic parking function. (S306, S307)

FIG. 19 is a flowchart illustrating an example method for executing an automatic parking function in a state in which vehicle moving parts are changed during the execution of the automatic parking function. Hereinafter, a process of providing the automatic parking function when the vehicle moving part change occurs during the vehicle automatic driving will be described in detail with reference to FIG. 19.

First, when the vehicle moving part state change occurs during the vehicle driving, the vehicle display apparatus 100 may display the vehicle moving part state change on the vehicle surrounding image. (S401)

Also, the vehicle display apparatus 100 may determine whether an emergency situation occurs during the vehicle driving on the basis of the changed vehicle surrounding image information. (S402)

In detail, the processor 170 may determine the emergency situation when the boundary range of the vehicle is expanded by the vehicle moving part state change, and a risk of collision between the vehicle boundary range and another object exists. Also, the processor 170 may determine a case in which the vehicle door is opened, and the user gets off as the emergency situation.

When determined as the emergency situation, the vehicle display apparatus 100 may stop the vehicle to provide a dangerous alarm to the user. (S403)

Figure 20A:
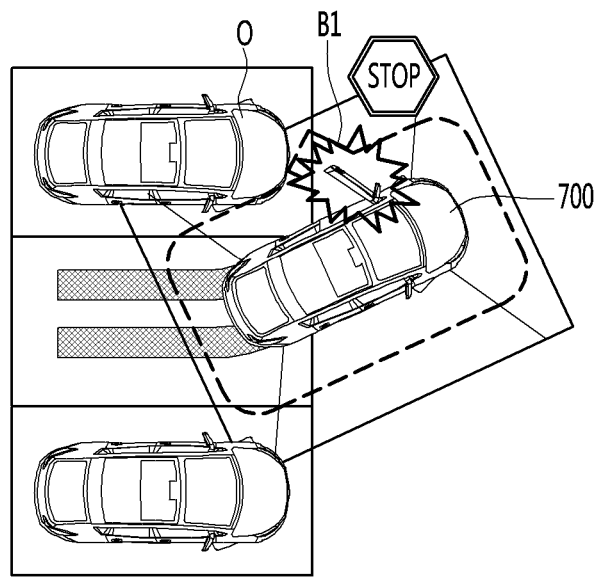
FIGS. 20A and 20B are diagram illustrating example emergency situations caused by a change of a vehicle moving part.
Figure 20B:
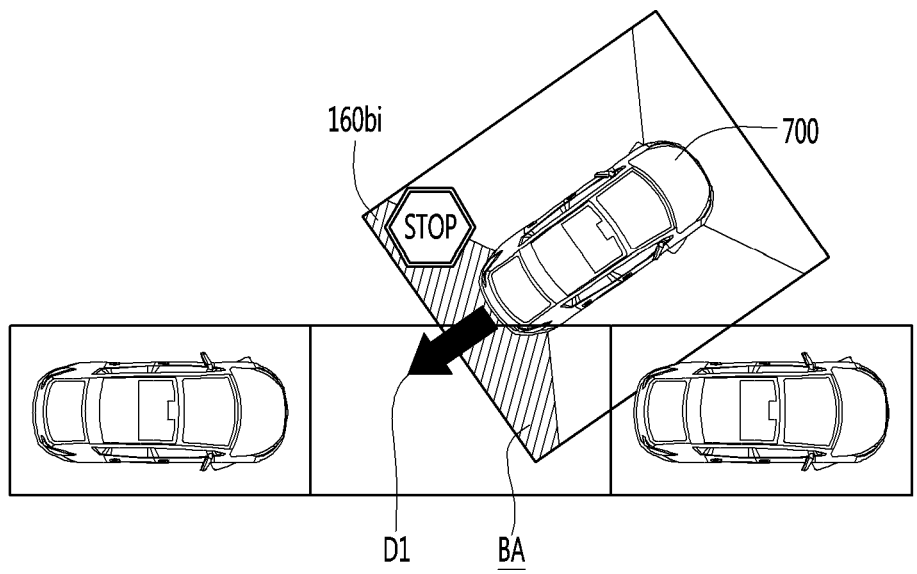

FIGS. 20A and 20B are diagram illustrating example emergency situations caused by a change of a vehicle moving part. Referring to FIG. 20A, when it is determined that the door of the vehicle is opened, and the risk of collision with an object O exists, the vehicle display apparatus 100 may provide a warning alarm to the user after stopping the vehicle.

Also, referring to FIG. 20B, when the trunk is opened during backward driving D1 of the vehicle, and the rear area of the vehicle becomes the black area BA, the vehicle display apparatus 100 may determine that the risk of the collision exists because the vehicle rear situation is not sensible, and thus, stop the vehicle to provide the warning alarm to the user.

When it is determined as the non-emergency situation, the vehicle display apparatus 100 may determine whether the automatic parking is possible to the preset parking path in the state in which the vehicle appearance is changed. (S404)

That is, when the parking is enabled to the existing parking path even though the vehicle appearance is changed, the vehicle display apparatus 100 may automatically drive the vehicle to the previously designed parking path without stopping the vehicle. (S405)

Figure 21A:
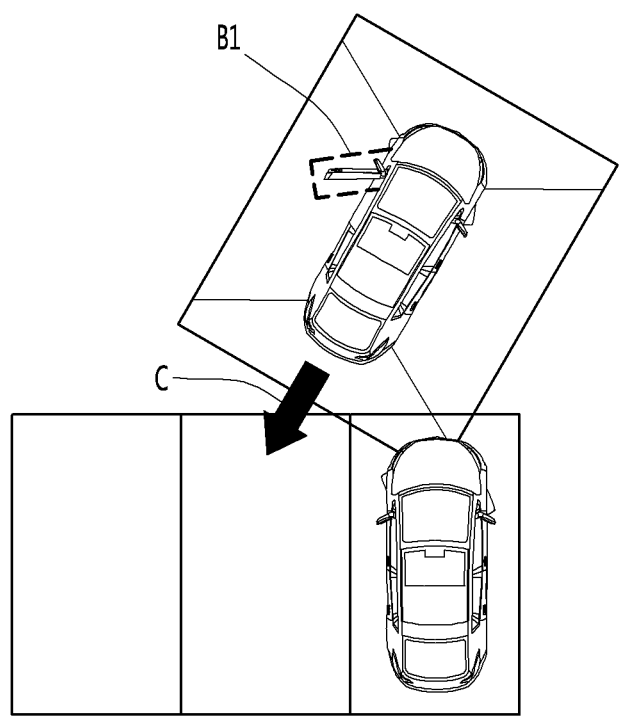
FIG. 21A is a diagram illustrating an example automatic parking of a vehicle using an existing parking path in a state in which vehicle moving parts are changed.

FIG. 21A illustrates an example automatic parking of a vehicle using an existing parking path in a state in which vehicle moving parts are changed. Referring to FIG. 21A, when it is determined that the risk of the collision does not exist even though the vehicle boundary range is expanded due to the open of the door of the vehicle, and the vehicle is driven to the expanded vehicle boundary range B1, the vehicle display apparatus 100 may automatically drive the vehicle to the existing parking path C.

If the automatic parking is unavailable to the existing parking path C, the vehicle display apparatus 100 may determine whether a design of a new parking path C1 is enabled. (S406)

Figure 21B:
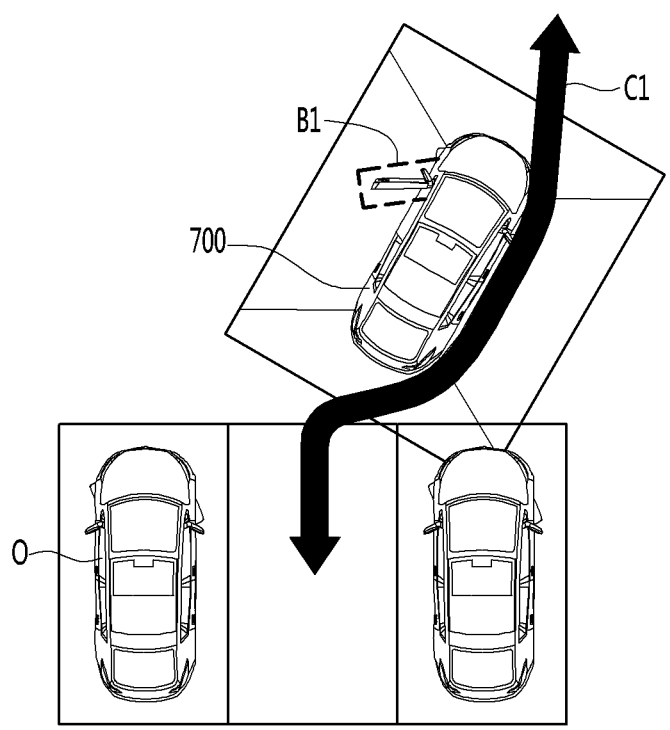
FIG. 21B is a diagram illustrating an example automatic parking of a vehicle using a new parking path in a state vehicle moving parts are changed.

FIG. 21B illustrates an example automatic parking of a vehicle using a new parking path in a state vehicle moving parts are changed. Referring to FIG. 21B, when the design of the new parking path C1 is enabled based on the changed vehicle boundary range B1, the vehicle display apparatus 100 may display a redesigned parking path C1 to drive the vehicle to the new parking path C1. (S407)

If the design of the new parking path C1 is unavailable, the vehicle display apparatus 100 may request restoration of the vehicle moving part state to the user. (S408)

Figure 21C:
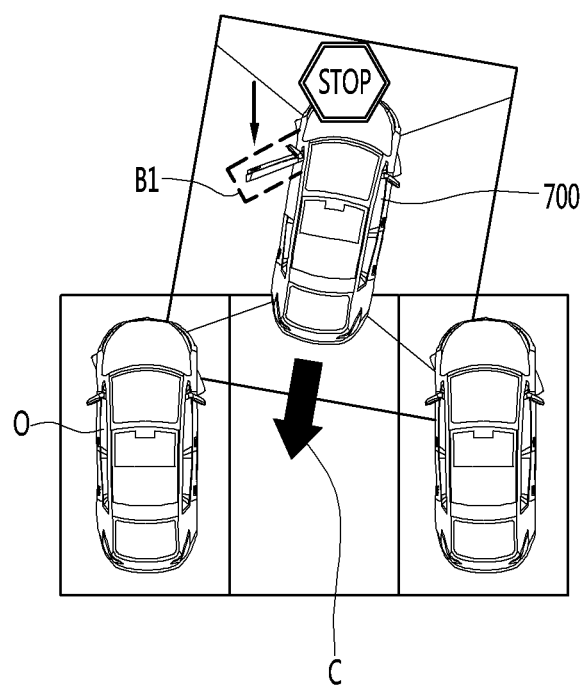
FIG. 21C is a diagram illustrating that an example automatic parking of a vehicle is not available in a state in which vehicle moving parts are changed.

FIG. 21C illustrates that an example automatic parking of a vehicle is not available in a state in which vehicle moving parts are changed. Referring to FIG. 21C, if a parking path for automatically parking the vehicle at a target parking position on the basis of the expanded vehicle boundary range B1 due to the open of the door is not generated, the vehicle display apparatus 100 may stop the vehicle to request the restoration of the vehicle moving part state to the user.

Figure 21D:
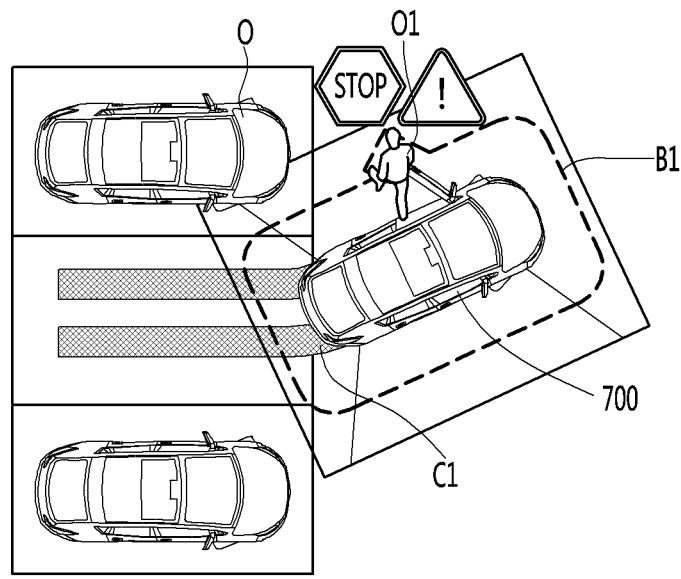
FIG. 21D is a diagram illustrating an example automatic parking of a vehicle using a changed vehicle boundary range in a state in which vehicle moving parts are changed.

FIG. 21D illustrates an example automatic parking of a vehicle using a changed vehicle boundary range in a state in which vehicle moving parts are changed. Here, the vehicle display apparatus 100 may control the vehicle automatic driving on the basis of the expanded vehicle boundary range B1. Referring to FIG. 21D, when a risk of collision between the opened door and an object O1 exists, the vehicle display apparatus 100 may stop the vehicle.

Next, when the user restores the vehicle moving part state, the vehicle display apparatus 100 may restart the automatic parking. (S409, S410)

Hereinafter, examples of a case in which the automatic parking is stopped by the vehicle moving part state change and a case in which the automatic parking is continuous without being stopped will be described.

When it is detected that the image sensing in a direction in which the vehicle moves, or the risk of the collision of the vehicle exists is interrupted by the vehicle moving part state change, the vehicle display apparatus 100 may stop the driving of the vehicle.

Figure 22A:
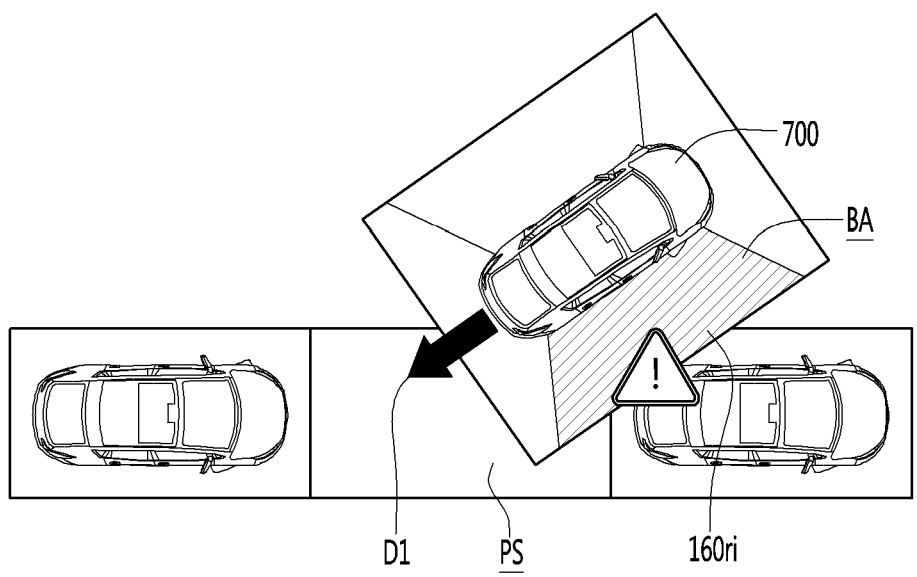
FIG. 22A is a diagram illustrating an example state in which automatic parking is stopped based on the changed state of vehicle moving parts.

FIG. 22A illustrates an example state in which automatic parking is stopped based on the changed state of vehicle moving parts. In detail, referring to FIG. 22A, when the image sensing in a right direction of the vehicle while the vehicle is reversed in the right direction, the vehicle display apparatus 100 may stop the vehicle.

Figure 22B:
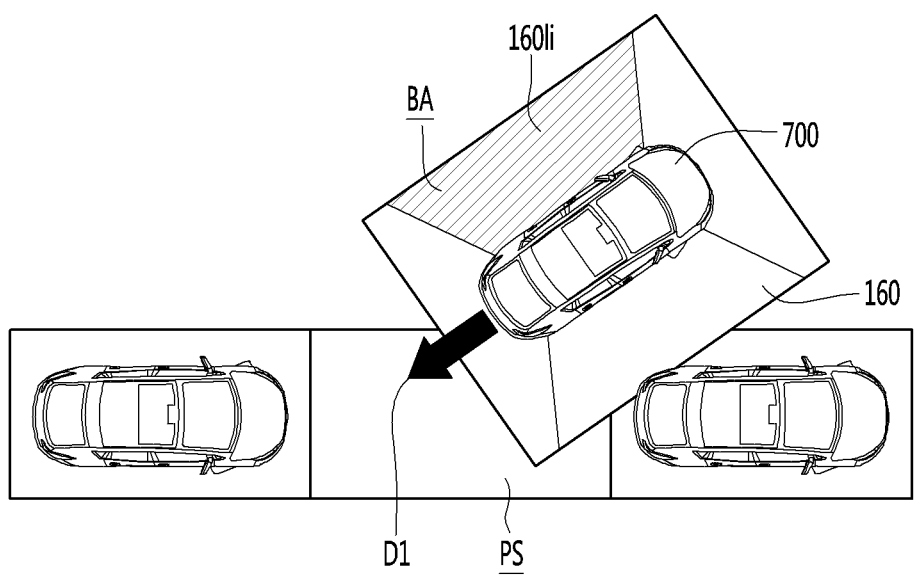
FIG. 22B is a diagram illustrating an example state in which automatic parking is performed based on the changed state of vehicle moving parts.

FIG. 22B illustrates an example state in which automatic parking is performed based on the changed state of vehicle moving parts. Referring to FIG. 22B, although the image sensing in a left direction of the vehicle is interrupted while the vehicle is reversed in the right direction, since the risk of the collision does not exist, the vehicle display apparatus 100 may move into the target parking space PS without being stopped.

Although the image sensing for a portion of the vehicle surrounding area is interrupted by the vehicle moving part state change, the vehicle display apparatus 100 may differently design the parking manner or the parking path and thus allow the vehicle to be automatically parked.

Figure 23A:
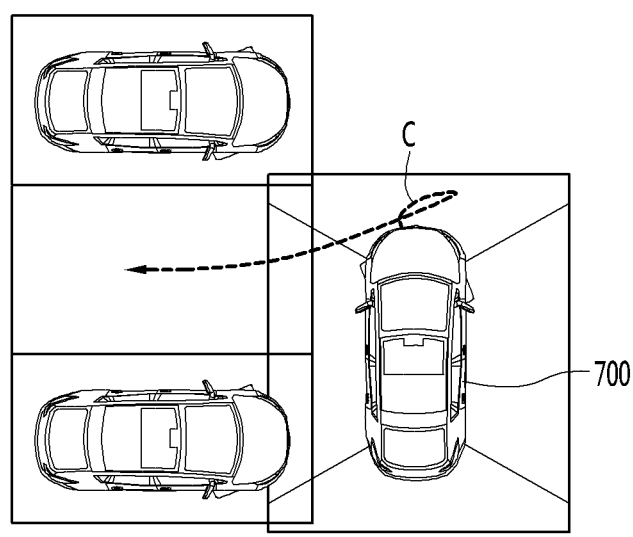
FIG. 23A is a diagram illustrating an example state in which automatic parking is performed when states of vehicle moving parts are not changed.

FIG. 23A illustrates an example state in which automatic parking is performed when states of vehicle moving parts are not changed. Referring to FIG. 23A, when vertical parking is performed by user's setting or default values, the vehicle display apparatus 100 may allow the vehicle to be automatically parked in a parking manner in which the vehicle is reversely parked.

Figure 23B:
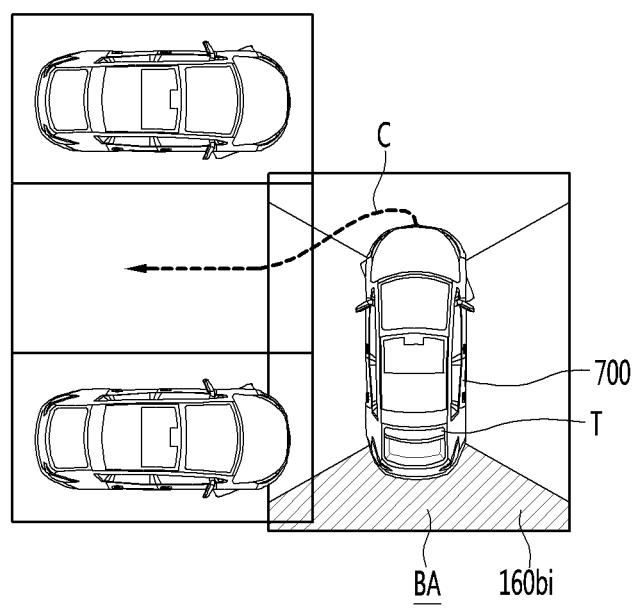
FIG. 23B is a diagram illustrating an example state in which automatic parking is performed using a new parking path based on changed states of vehicle moving parts.

FIG. 23B illustrates an example state in which automatic parking is performed using a new parking path based on changed states of vehicle moving parts. Referring to FIG. 23B, when the trunk is opened the rear area of the vehicle becomes the black area BA, since the reverse driving of the vehicle is unavailable, the vehicle display apparatus 100 may design a parking path C1, which is changed in parking manner in which the vehicle is parked in advance, to allow the vehicle to be automatically parked.

In summary, when the vehicle appearance change occurs by the vehicle moving part state change, the vehicle display apparatus 100 may display the changed state on the vehicle surrounding image. Furthermore, when the sensing of the vehicle surrounding image is interrupted by the vehicle moving part state change, the vehicle display apparatus 100 may display a vehicle surrounding image in which the interrupted area is collected to provide only the accurate vehicle surrounding information to the user.

Also, the vehicle display apparatus 100 may allow the vehicle to be automatically parked in consideration of the vehicle moving part state change and the vehicle surrounding image due to the state change, thereby improving user's convenience and performing safe driving of the vehicle.

Hereinafter, when an object is mounted on the outside of the vehicle, a process of providing the vehicle surrounding image display function and the automatic parking function by the vehicle display apparatus 100 will be described in detail.

Figure 24:
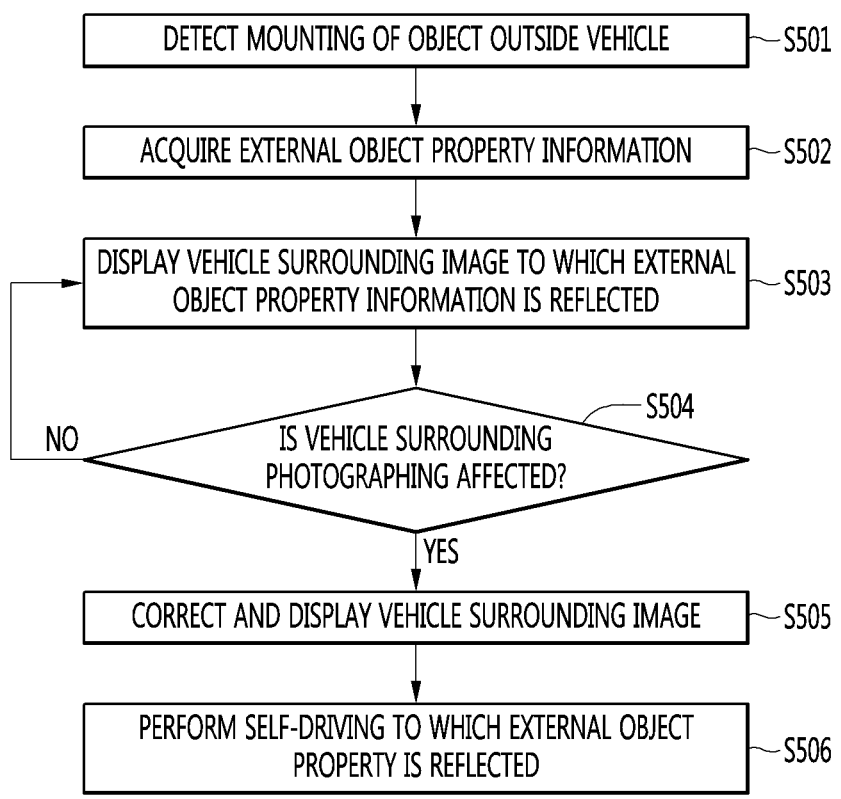
FIG. 24 is a flowchart illustrating an example method for providing a vehicle surrounding image display function in a state in which an object is mounted on an exterior of a vehicle.

FIG. 24 is a flowchart illustrating an example method for providing a vehicle surrounding image display function in a state in which an object is mounted on an exterior of a vehicle. Referring to FIG. 24, the vehicle display apparatus 100 may detect a change of the vehicle appearance due to mounting of the object outside the vehicle. (S501)

In detail, the processor 170 may acquire vehicle appearance change information including a position, size, kind, existence of hinge coupling, object surrounding image of a mounted object 30 through the communication unit 120, the interface 130, the memory 140, or the sensor unit 155.

For example, the processor 170 may acquire the vehicle appearance change information from the mounted object 30 or a structure for mounting the object through the communication unit 120 or the interface 130. Here, when the camera 160 exists on the mounted object 30, the processor 170 may receive the object surrounding image from the camera 160 of the mounted object 30.

Also, the processor 170 may acquire the vehicle appearance change information by directly measuring the position and size of the mounted object 30 through the sensor unit 155.

Also, the processor 170 may detect information about the mounted object 30, which is stored in the memory 140, on the basis of the mounted position and the kind of mounted object 30 to acquire the vehicle appearance change information.

When the vehicle appearance change information is received, the vehicle display apparatus 100 may display the vehicle surrounding image that shows the vehicle appearance change. (S502)

In detail, the vehicle display apparatus 100 may display the vehicle surrounding image. The vehicle surrounding image may be an image including the vehicle image 700*i* and the vehicle surrounding image.

Figure 25A:
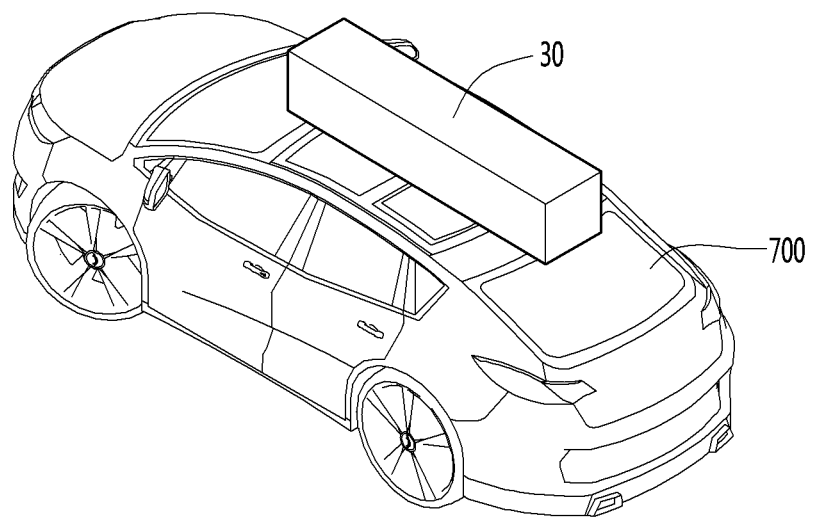
FIG. 25A is a diagram illustrating an example in a state in which an object is mounted on a ceiling of a vehicle.

FIG. 25A illustrates an example in a state in which an object is mounted on a ceiling of a vehicle. Referring to FIG. 25A, when the object is mounted on a ceiling of the vehicle, the vehicle display apparatus 100 may acquire vehicle appearance change information including a position, size, and kind of the mounted object 30.

Also, the vehicle display apparatus 100 may generate and display the vehicle surrounding image on the basis of the acquired vehicle appearance change information.

Figure 25B:
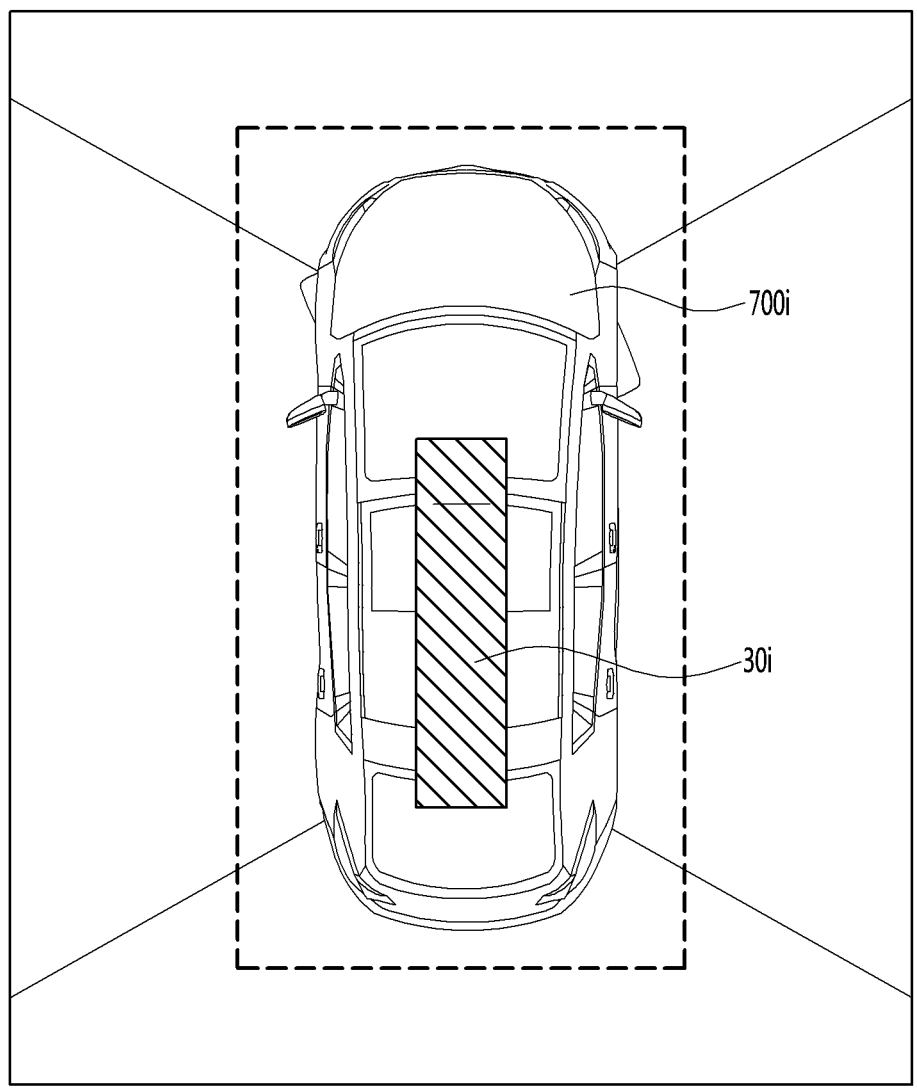
FIGS. 25B and 25C are diagrams illustrating example vehicle surrounding images that display objects mounted on a ceiling of a vehicle.
Figure 25C:
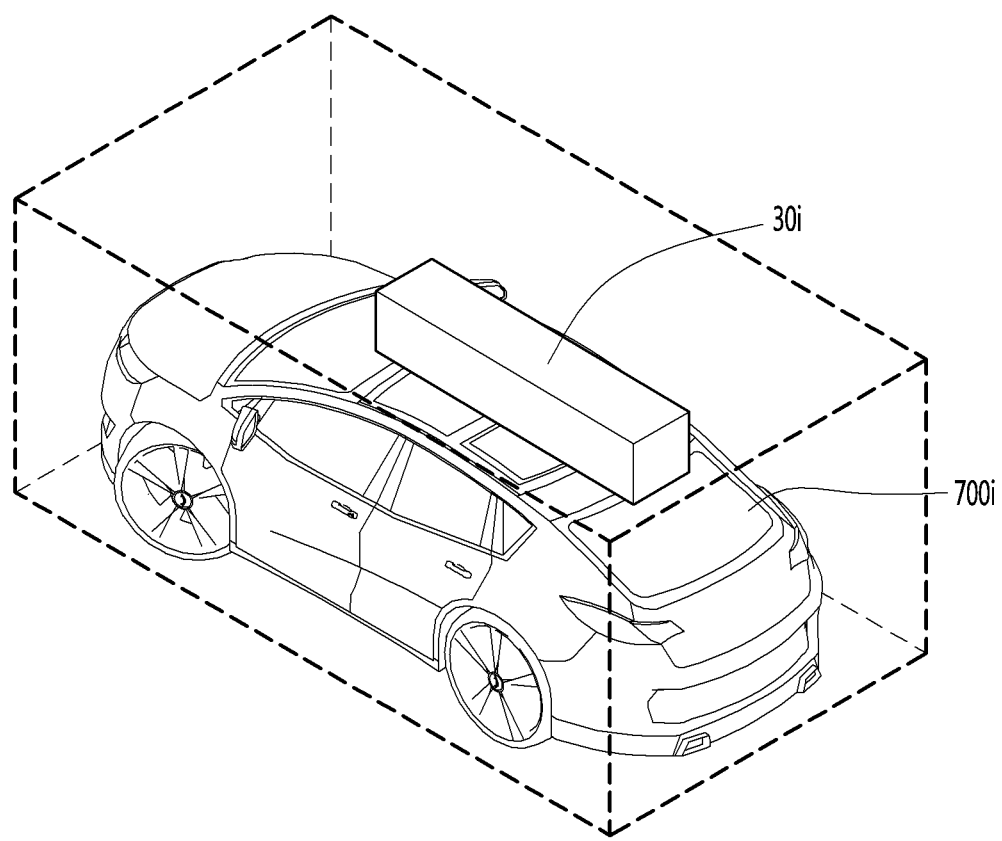

FIGS. 25B and 25C illustrate example vehicle surrounding images that display objects mounted on a ceiling of a vehicle. In some implementations, the vehicle surrounding image may be an around view image. Referring to FIG. 25B, the vehicle surrounding image may be an around view image generated by matching left and right images of the vehicle with the vehicle image 700i. Here, the vehicle image 700i may be a virtual vehicle graphic image stored in the memory 140, but is not limited thereto.

The processor 170 may correct the vehicle surrounding image so that the vehicle surrounding image shows the mounted object 30.

For example, the processor 170 may additionally generate an object image 30i showing the mounted object 30 on the virtual vehicle image 700i to match the virtual vehicle image 700i with a vehicle surrounding image, thereby generating the vehicle surrounding image. Here, the processor 170 may generate the object image 30i by reflecting the size, kind, and position of the actually mounted object 30 to provide accurate information about the mounted object 30 to the user.

Also, the vehicle display apparatus 100 may generate and display a 3D around view image at a view point looking at the mounted object 30 so that the mounted object 30 is more observed in three dimensions.

Referring to FIG. 25C, the vehicle display apparatus 100 may overlappingly display the object image 30i showing the mounted object 30 on the 3D around view image at the view point looking at the vehicle ceiling so that the user more instinctively recognizes the mounted object 30.

Figure 26A:
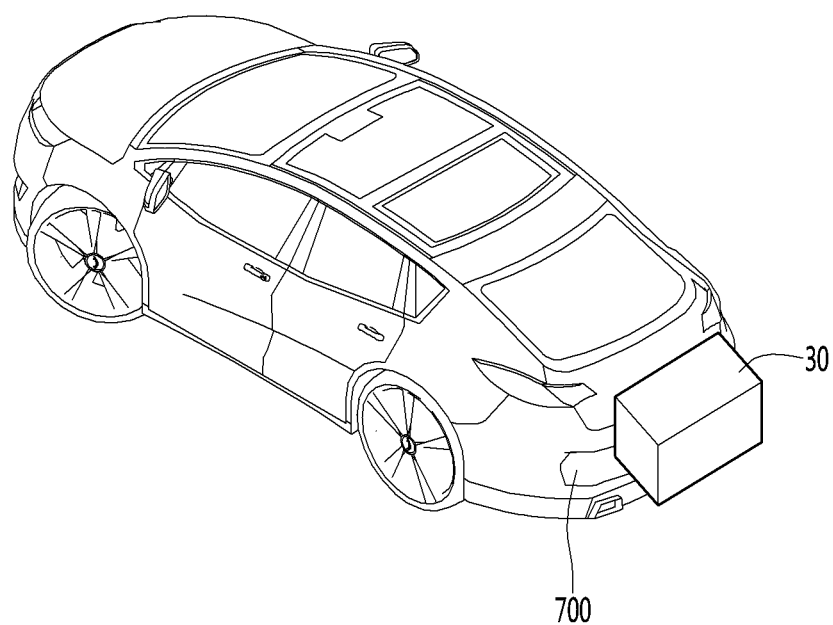
FIG. 26A is a diagram illustrating an example state in which an object is mounted on a rear side of a vehicle.

FIG. 26A illustrates an example state in which an object is mounted on a rear side of a vehicle. Referring to FIG. 26A, when the object is mounted on the trunk of the vehicle, the vehicle display apparatus 100 may acquire vehicle appearance change information including a position, size, and kind of the mounted object 30.

Also, the vehicle display apparatus 100 may generate and display the vehicle surrounding image on the basis of the acquired vehicle appearance change information.

Figure 26B:
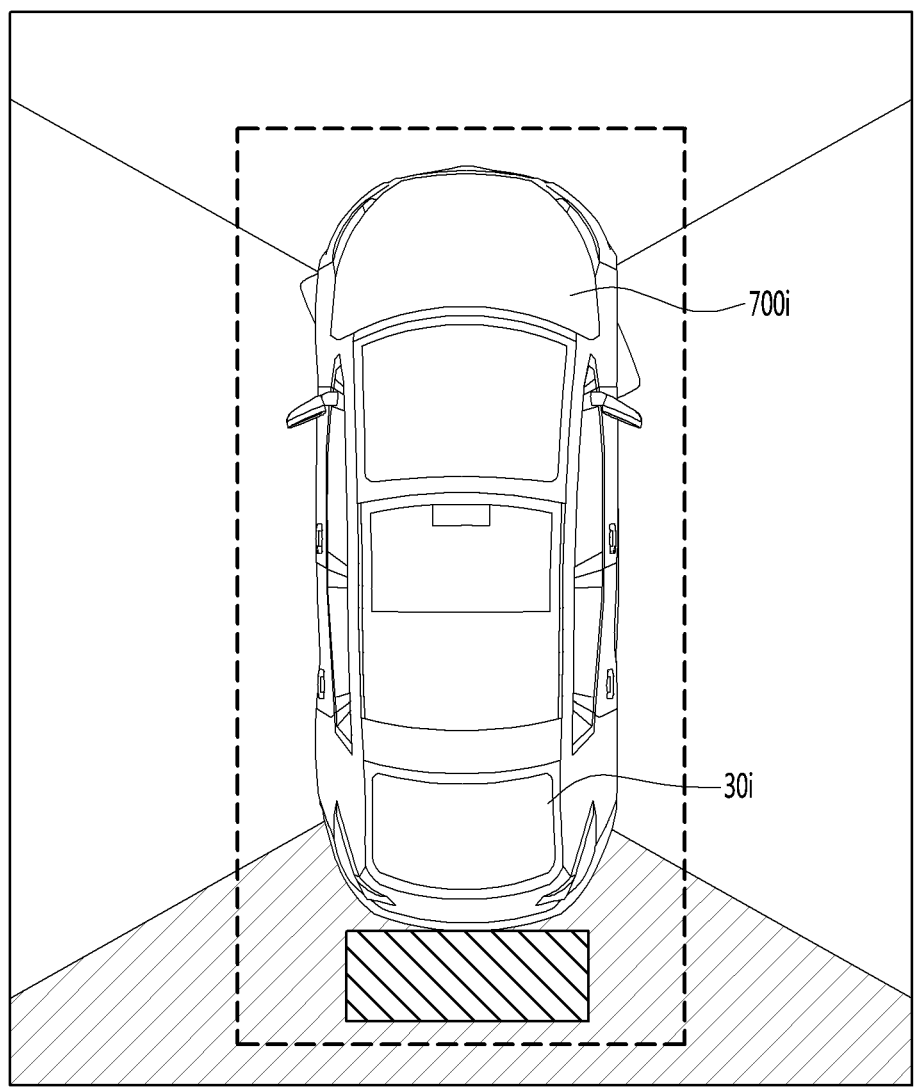
FIGS. 26B and 26C are diagrams illustrating example vehicle surrounding images that display objects mounted on a rear side of a vehicle.
Figure 26C:
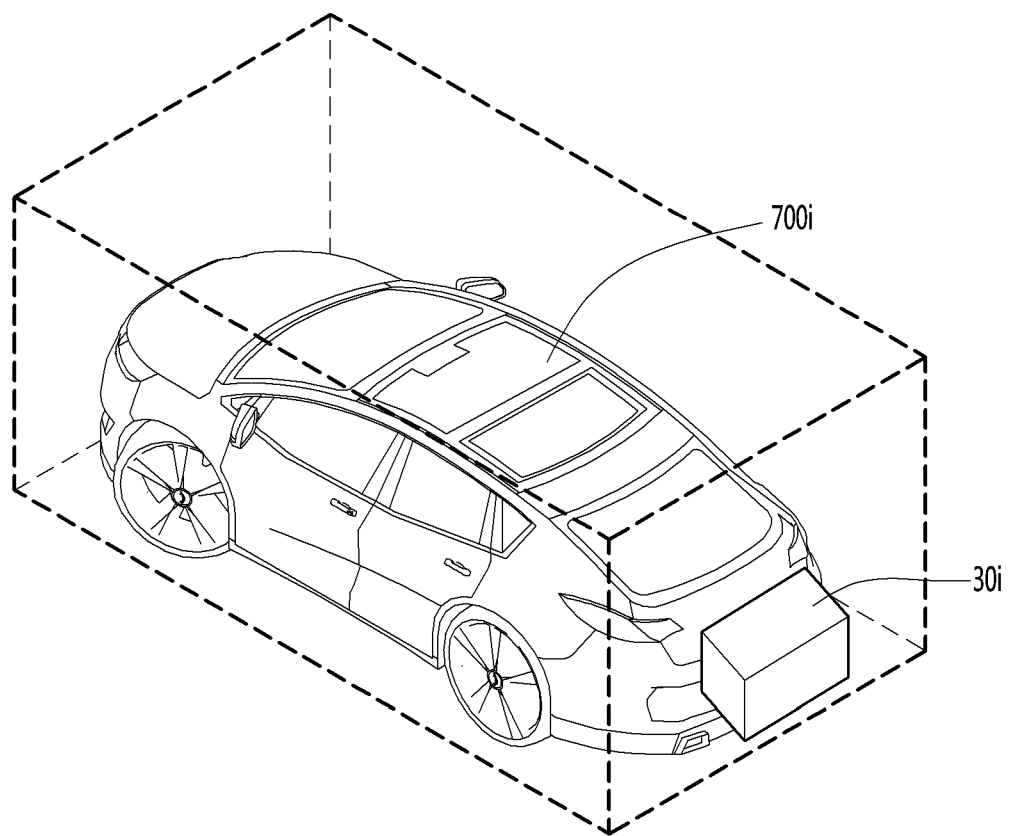

FIGS. 26B and 26C illustrate example vehicle surrounding images that display objects mounted on a rear side of a vehicle. Referring to FIG. 26B, the vehicle surrounding image may be an around view image generated by matching front/rear and left/right images of the vehicle with the vehicle image 700i. Here, the vehicle image 700i may be a virtual vehicle graphic image stored in the memory 140, but is not limited thereto.

The processor 170 may correct the vehicle surrounding image so that the vehicle surrounding image shows the mounted object 30.

For example, the processor 170 may add an object image 30i showing the mounted object 30 on the virtual vehicle image 700i to match the virtual vehicle image 700i with a vehicle surrounding image, thereby generating the vehicle surrounding image. Here, the processor 170 may generate the object image 30i by reflecting the size, kind, and position of the actually mounted object 30 to provide accurate information about the mounted object 30 to the user.

Also, the vehicle display apparatus 100 may generate and display a 3D around view image at a view point looking at the mounted object 30 so that the mounted object 30 is more observed in three dimensions.

Referring to FIG. 26C, the vehicle display apparatus 100 may overlappingly display the object image 30i showing the mounted object 30 on the 3D around view image at the view point looking at the rear side of the vehicle so that the user more instinctively recognizes the mounted object 30.

Figure 27A:
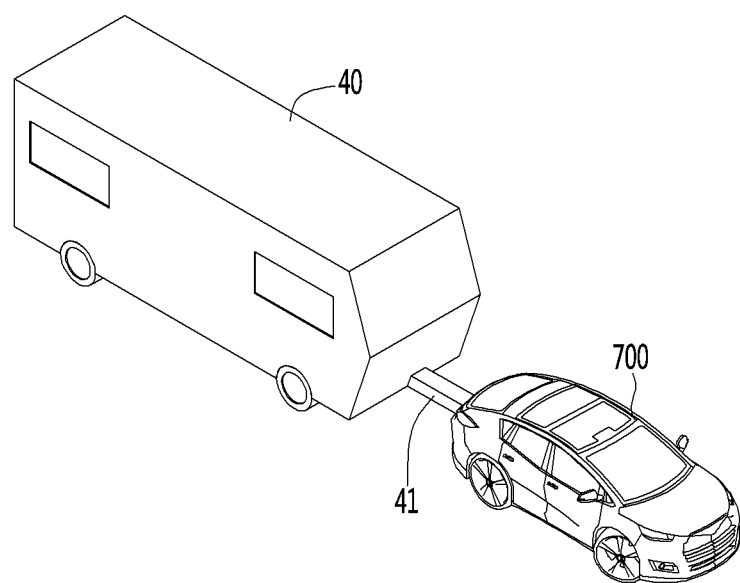
FIG. 27A is a diagram illustrating an example state in which an object is mounted on a vehicle through a hinge.

FIG. 27A illustrates an example state in which an object is mounted on a vehicle through a hinge. Referring to FIG. 27A, when the object is mounted on the rear side of the vehicle through a hinge, the vehicle display apparatus 100 may acquire vehicle appearance change information including a position, size, and kind of the mounted object 40.

Also, the vehicle display apparatus 100 may generate and display the vehicle surrounding image on the basis of the acquired vehicle appearance change information.

Figure 27B:
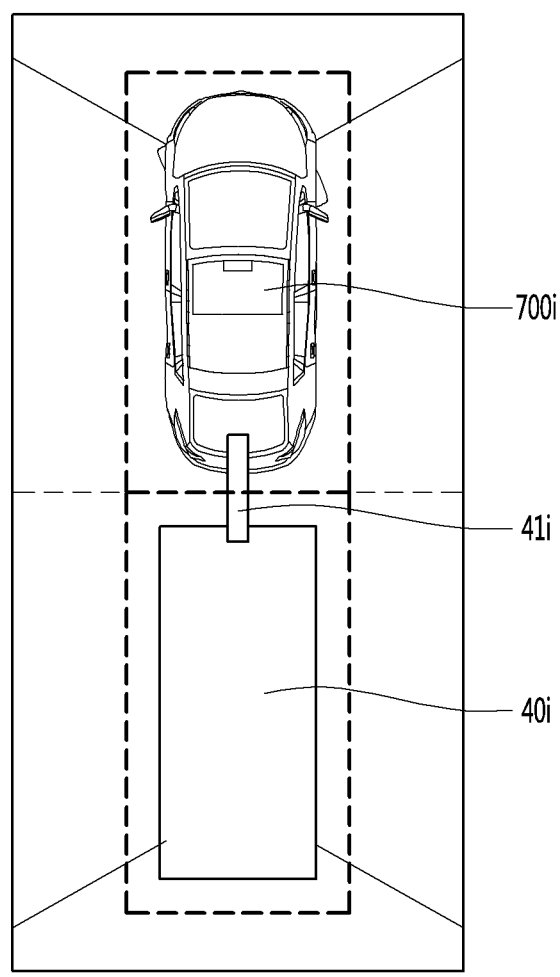
FIGS. 27B and 27C are diagrams illustrating example vehicle surrounding images that display objects mounted on a vehicle through a hinge.
Figure 27C:
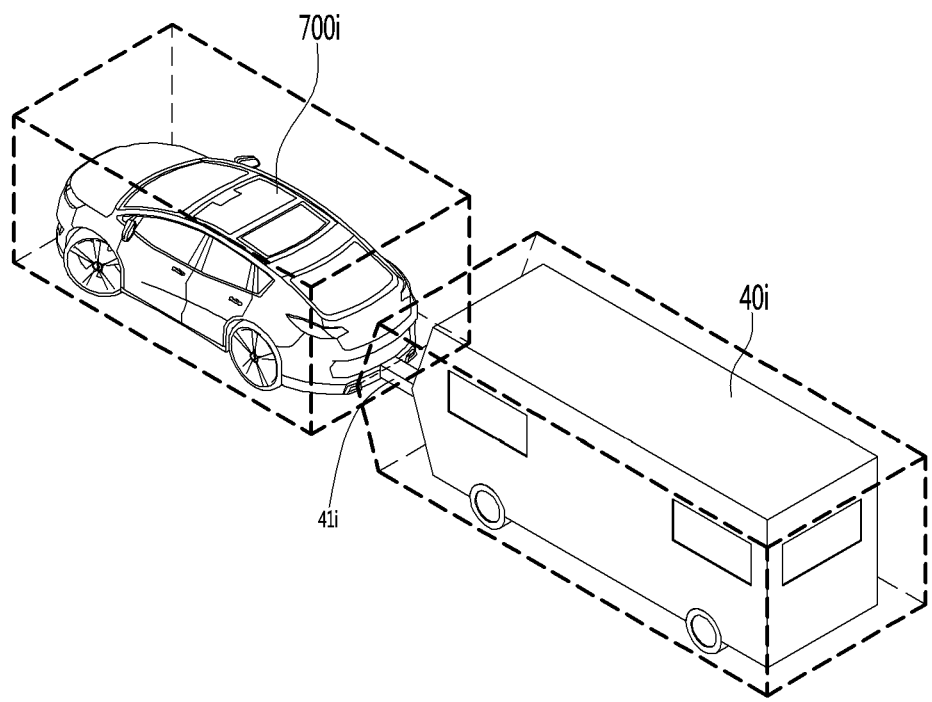

FIGS. 27B and 27C illustrate example vehicle surrounding images that display objects mounted on a vehicle through a hinge. Referring to FIG. 27B, the vehicle surrounding image may be an around view image generated by matching front/rear and left/right images of the vehicle with the vehicle image 700i. Here, the vehicle image 700i may be a virtual vehicle graphic image stored in the memory 140, but is not limited thereto.

The processor 170 may correct the vehicle surrounding image so that the vehicle surrounding image shows the mounted object 40. Particularly, when the object is mounted through the hinge, the processor 170 may correct the vehicle surrounding image so that the coupling through the hinge is shown. When the hinge-coupled and mounted object 40 exists, since reverse steering manipulation of the vehicle is affected, the vehicle display apparatus 100 may display the vehicle surrounding image showing the coupling of the hinge 41i to effectively assist the user's driving.

For example, the processor 170 may correct the virtual vehicle image 700i in a shape in which the virtual vehicle image 700i and the object image showing the mounted object 40 are coupled to each other through the hinge 41i to match the virtual vehicle image 700i with the vehicle surrounding image, thereby generating the vehicle surrounding image. Here, the processor 170 may generate the object image 30i by reflecting the size, kind, and position of the actually mounted object 40 to provide accurate information about the mounted object 40 to the user.

Also, the vehicle display apparatus 100 may generate and display a 4D around view image at a view point looking at the mounted object 40 so that the mounted object 40 is more observed in three dimensions.

Referring to FIG. 27C, the vehicle display apparatus 100 may overlappingly display the object image 30i showing the mounted object 40 on the 4D around view image at the view point looking at the rear side of the vehicle so that the user more instinctively recognizes the mounted object 40.

The vehicle display apparatus 100 may display the vehicle surrounding image by accurately reflecting the information about the mounted object 40 and also display a sensing state of the vehicle surrounding image due to the mounted object 30. (S504)

In detail, when the photographing of the camera 160 is covered or interrupted by the mounting of the object on the vehicle, the vehicle display apparatus 100 may correct and display the vehicle surrounding image to show a vehicle surrounding sensing state. (S505)

Also, the vehicle display apparatus 100 may allow the vehicle to be automatically parked in consideration of the vehicle appearance change due to the mounted object 40 and the surrounding image sensing state. (S506)

Figure 28:
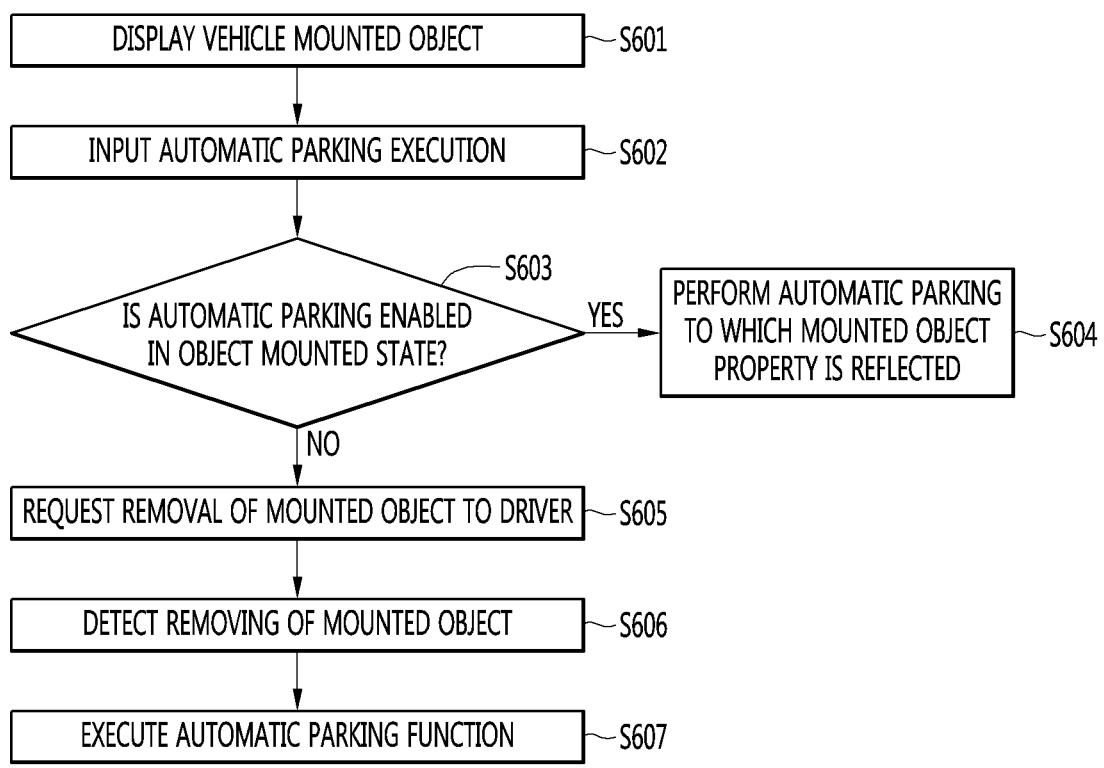
FIG. 28 is a flowchart illustrating an example method for providing an automatic parking function in a state in which an object is mounted on an exterior of a vehicle.

FIG. 28 is a flowchart illustrating an example method for providing an automatic parking function in a state in which an object is mounted on an exterior of a vehicle. Hereinafter, a process of providing the automatic parking function by the vehicle display apparatus 100 when an object is mounted outside the vehicle will be described in detail with reference to FIG. 28.

First, the vehicle display apparatus 100 may display the object mounted state as described above. (S601)

Also, in the state in which the object exists outside the vehicle, the vehicle display apparatus 100 may receive an automatic parking execution input. (S602)

The vehicle display apparatus 100 may determine whether the automatic parking is enabled in the state in which the object is mounted. (S603)

In detail, the processor 170 may determine whether the automatic parking path is designed in the state in which the vehicle appearance is changed by mounting the object on the vehicle.

Also, the processor 170 may determine whether the automatic parking is enabled when the object is mounted on the vehicle to interrupt the image sensing.

When the design of the automatic parking path is enabled, the vehicle display apparatus 100 may display the designed parking path on the vehicle surrounding image, and thus, the vehicle may be automatically parked. (S604)

Here, the vehicle display apparatus 100 may perform the automatic parking function by reflecting the vehicle appearance change state. For example, the vehicle display apparatus 100 may expand the vehicle boundary range according to the vehicle appearance change and stop the vehicle when a collision risk object O approaches an expanded vehicle boundary range B1.

Also, in the vehicle display apparatus 100, the parking manner, the turning number, and the automatic parking performing time may be changed according to the vehicle appearance change. For example, if an area in which the sensing is unavailable exists due to the vehicle appearance change, the vehicle display apparatus 100 may design a parking path along which the vehicle is not moved to the corresponding area.

Figure 29:
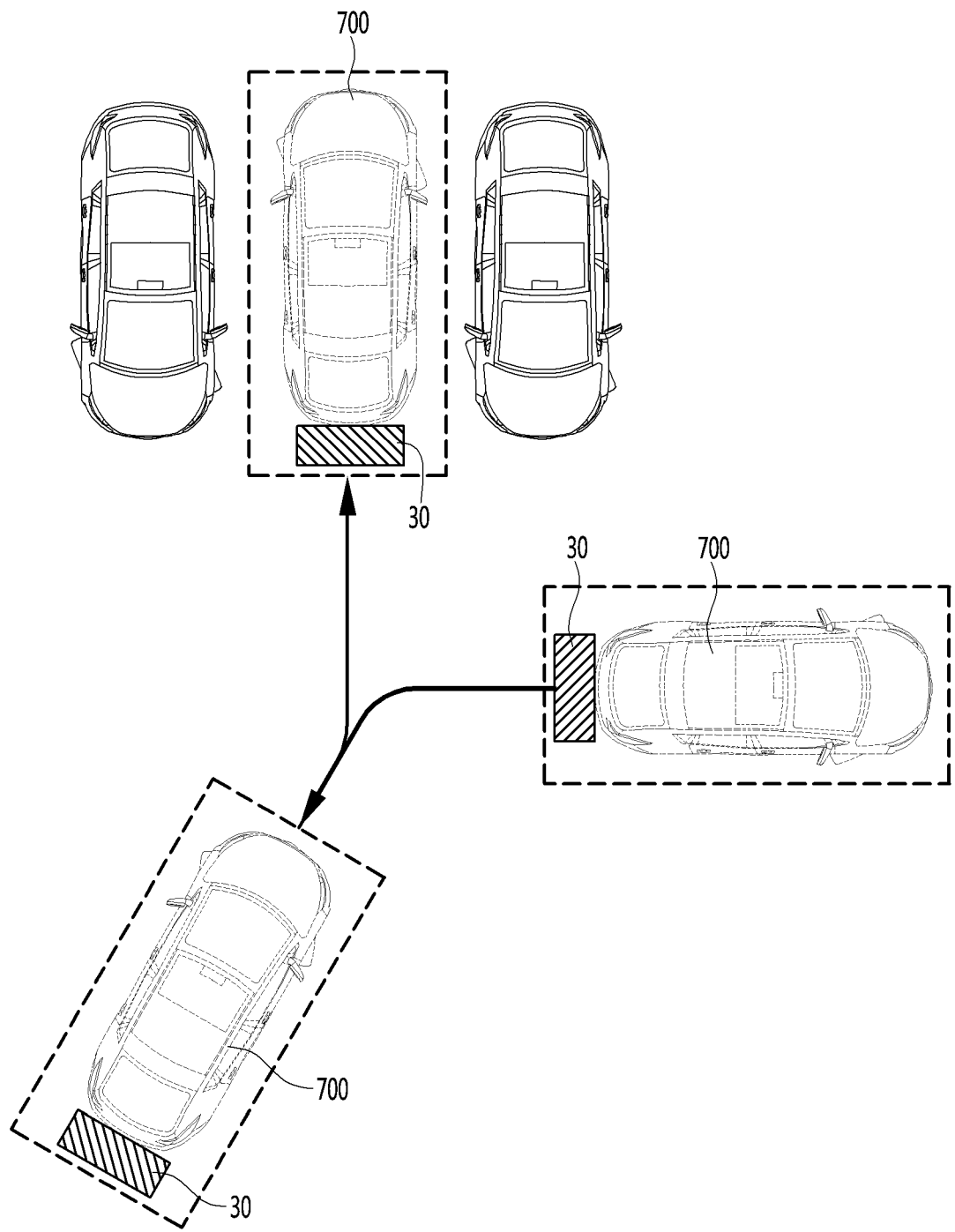
FIG. 29 is a diagram illustrating an example operation of an automatic parking function in a state in which an object is mounted on a front portion of a vehicle.

FIG. 29 illustrates an example operation of an automatic parking function in a state in which an object is mounted on a front portion of a vehicle. In detail, referring to FIG. 29, when the automatic parking function execution is inputted, the vehicle display apparatus 100 may design a parking path to provide the automatic parking function by which the vehicle is driven along the parking path to park the vehicle in a target parking space. In detail, when an object is mounted on a front surface of the vehicle, since it is difficult to perform vehicle front image sensing, the vehicle display apparatus 100 may design a parking path along the vehicle is reversely parked to perform the automatic parking. Here, the vehicle display apparatus 100 may expand the boundary range of the vehicle up to the mounted object 30 and design the parking path in which a risk of collision does not exist in the expanded boundary range of the vehicle.

Figure 30:
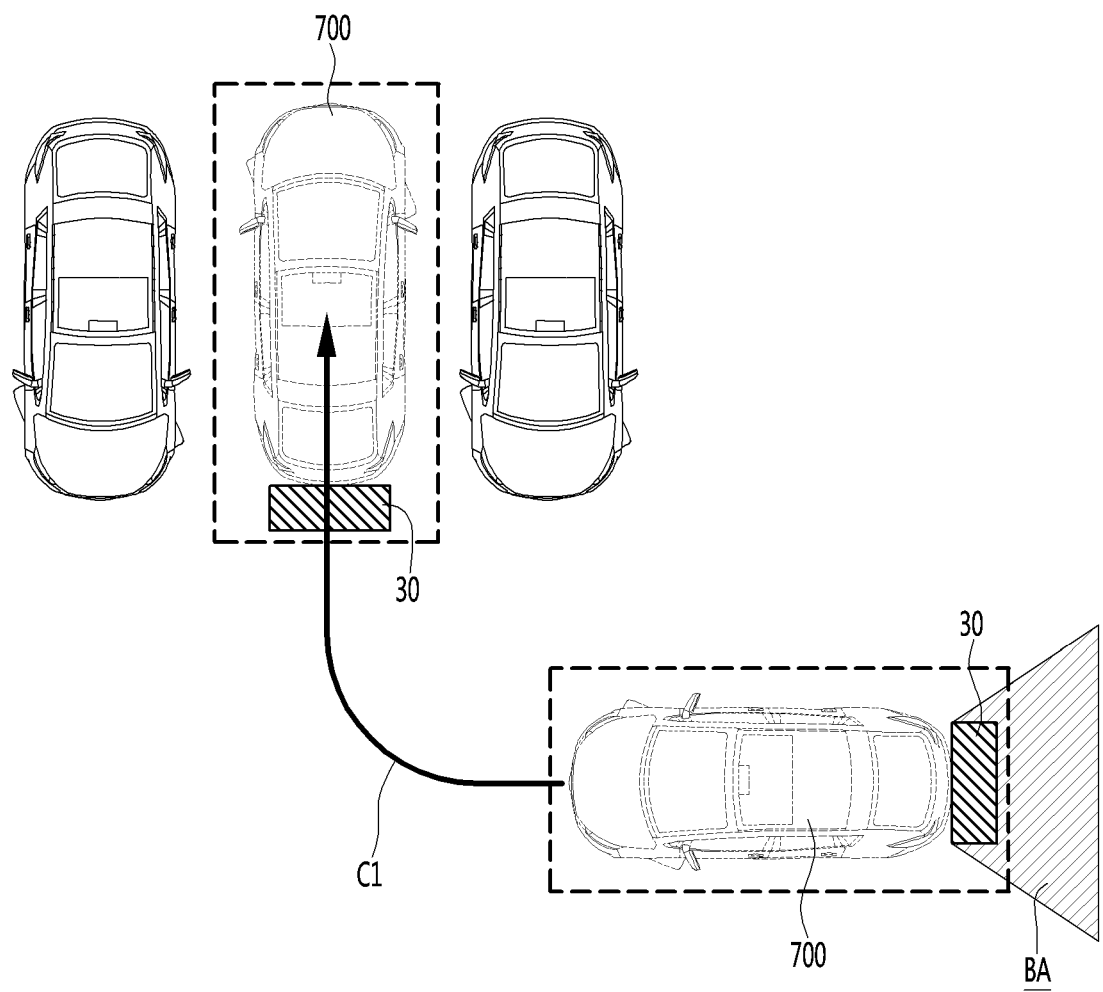
FIG. 30 is a diagram illustrating an example operation of an automatic parking function in a state in which an object is mounted on a rear portion of a vehicle.

FIG. 30 illustrates an example operation of an automatic parking function in a state in which an object is mounted on a rear portion of a vehicle. Referring to FIG. 30, since the rear image sensing is difficult when the object is mounted on a rear side of the vehicle, the vehicle display apparatus 100 may design a parking path along which the vehicle is parked in advance to control the vehicle driving so that the vehicle is parked in advance. Here, the vehicle display apparatus 100 may expand the boundary range of the vehicle up to the mounted object 30 and design the parking path in which a risk of collision does not exist in the expanded boundary range of the vehicle.

Figure 31:
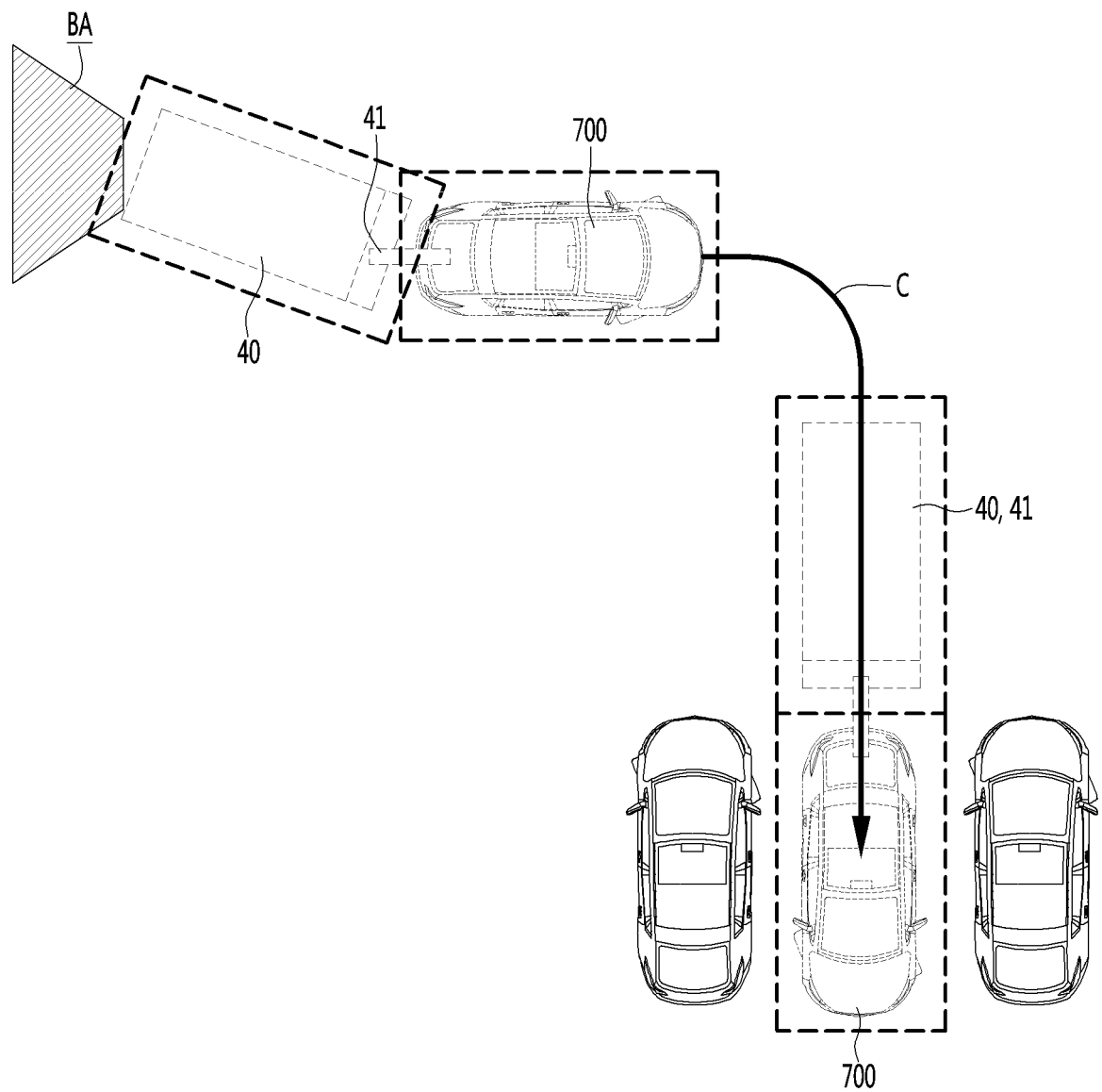
FIG. 31 is a diagram illustrating an example operation of an automatic parking function in a state in which an object is mounted on a vehicle through a hinge.

FIG. 31 illustrates an example operation of an automatic parking function in a state in which an object is mounted on a vehicle through a hinge. Referring to FIG. 31, since the rear image sensing is difficult when the hinge-coupled object exists in the rear side of the vehicle, the vehicle display apparatus 100 may design a parking path along which the vehicle is parked in advance to control the vehicle so that the vehicle is parked in advance. Here, the vehicle display apparatus 100 may expand the boundary range of the vehicle up to the mounted object 40 and design the parking path in which a risk of collision does not exist in the expanded boundary range of the vehicle. Also, the vehicle display apparatus 100 may predict movement of the mounted object 40 due to the hinge coupling and design the parking path without the collision of the mounted object 40. Particularly, when the hinge-coupled object 40 exists, the vehicle display apparatus 100 may reflect a state in which the reverse steering of the vehicle is reversed with respect to the existing steering of the vehicle to control the vehicle driving.

Figure 32:
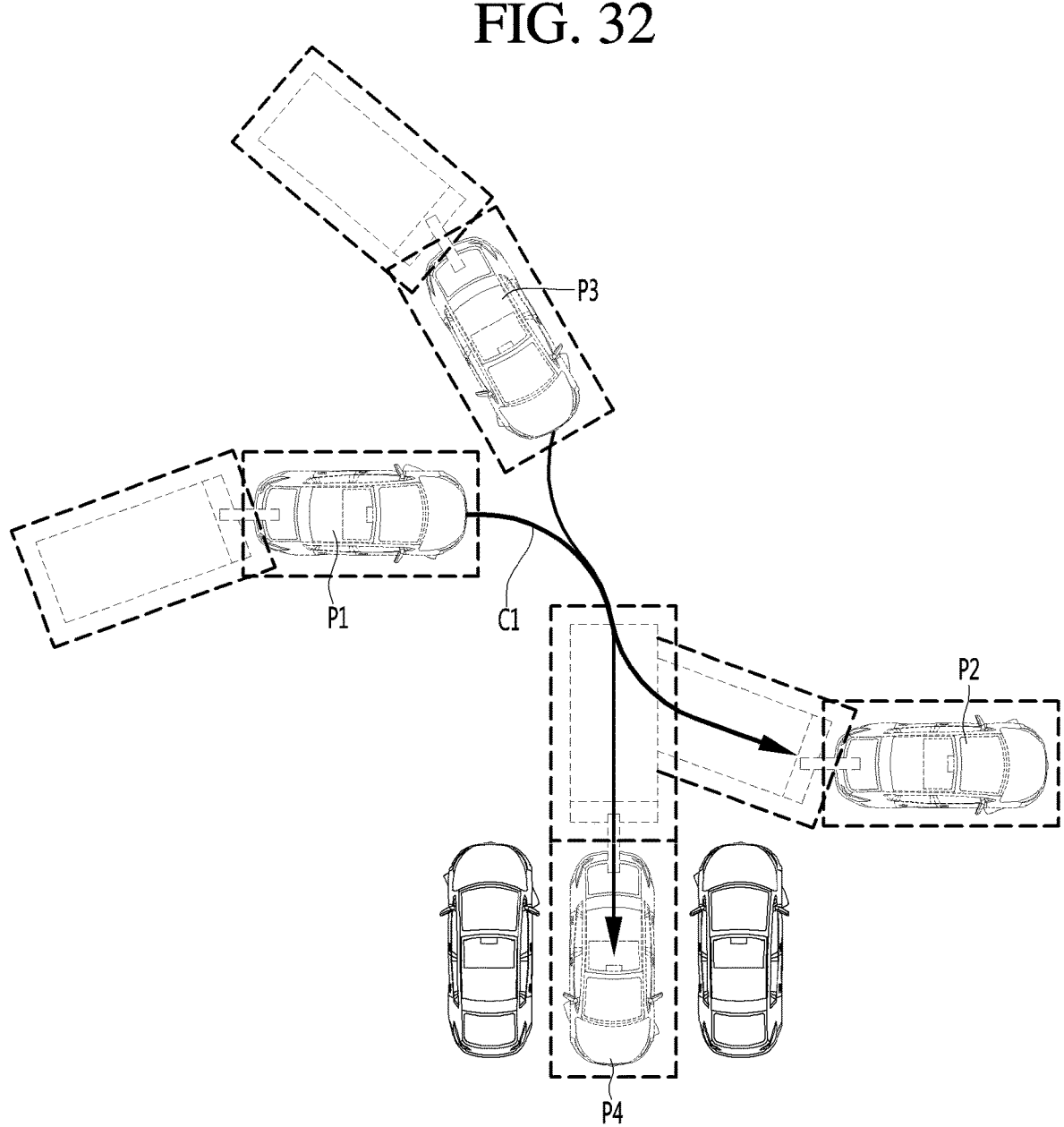
FIG. 32 is a diagram illustrating an example operation of front parking in a state in which an object is mounted on a vehicle through a hinge.

FIG. 32 illustrates an example operation of front parking in a state in which an object is mounted on a vehicle through a hinge. Referring to FIG. 32, since the hinge-coupled object exists in the rear side of the vehicle, the vehicle display apparatus 100 may set the vehicle boundary range up to the mounted object 30 and design and display the parking path for automatically parking the vehicle on the basis of the expanded vehicle boundary range B1. Also, since the vehicle boundary range is expanded, the automatic parking time and the front and rear turning number may increase. The vehicle display apparatus 100 may display the increasing automatic parking time and turning number so that the increasing automatic parking time and turning number 20 are displayed together with each other.

Figure 33:
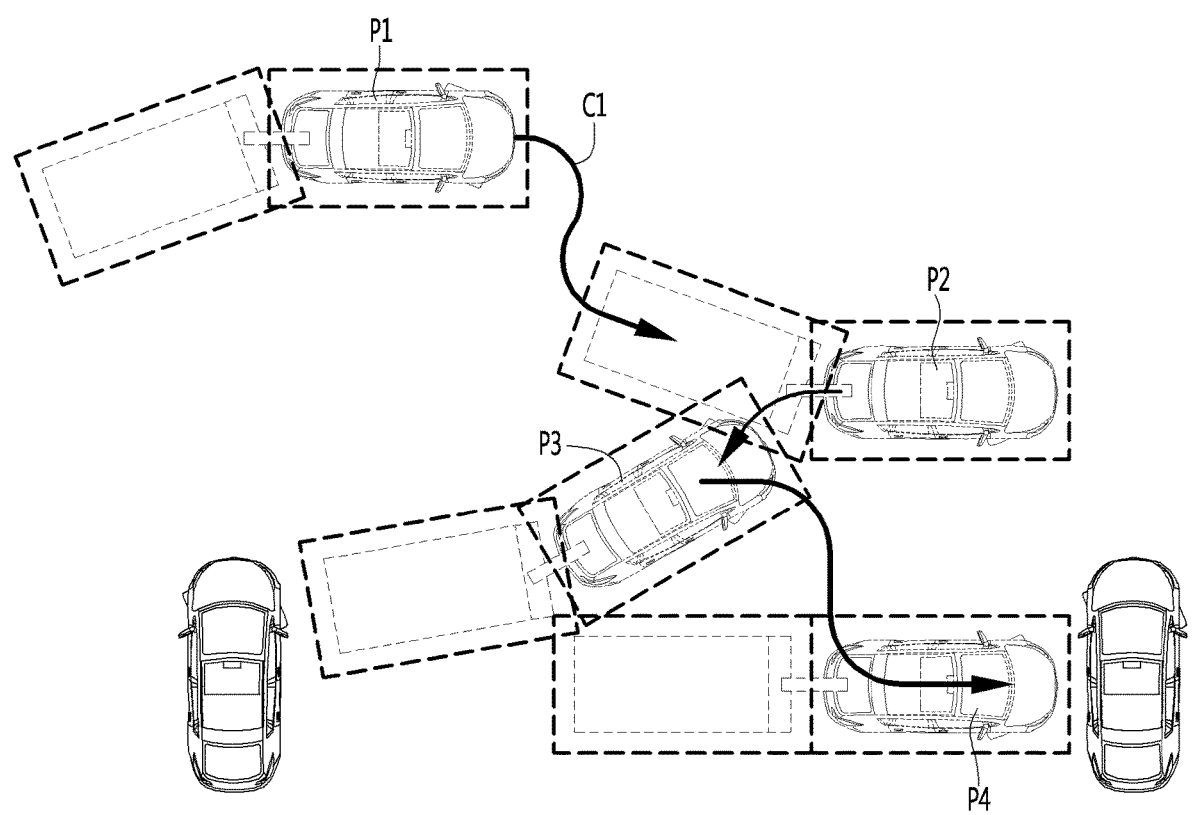
FIG. 33 is a diagram illustrating an example operation of parallel parking in a state in which an object is mounted on a vehicle through a hinge.

FIG. 33 illustrates an example operation of parallel parking in a state in which an object is mounted on a vehicle through a hinge. Referring to FIG. 33, since the hinge-coupled object exists in the rear side of the vehicle, the vehicle display apparatus 100 may set the vehicle boundary range up to the mounted object 30 and design and display the parking path for automatically parking the vehicle on the basis of the expanded vehicle boundary range B1. Also, since the vehicle boundary range is expanded, the automatic parking time and the front and rear turning number may increase and be changed in parking manner. Here, the vehicle display apparatus 100 may allow the vehicle to be automatically parked in a parallel parking manner so that the vehicle is safely parked between surrounding vehicles that are vertically parked.

The vehicle display apparatus 100 may acquire additional vehicle surrounding information from the mounted object 30 and provide the additionally acquired vehicle surrounding information to the vehicle surrounding image to perform the automatic parking function on the basis of the addition vehicle surrounding information.

Figure 34:
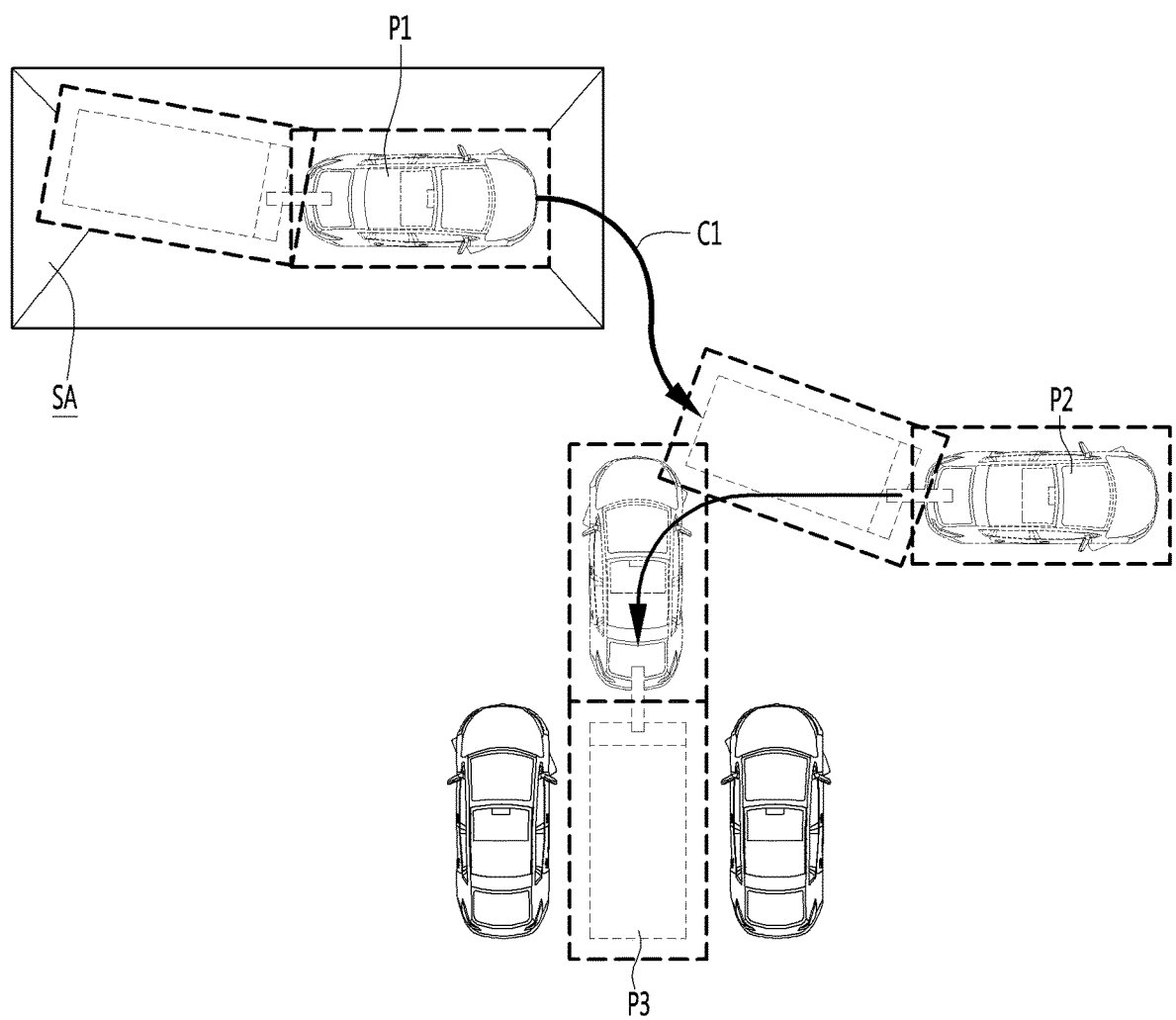
FIG. 34 is a diagram illustrating an example operation of rear parking in a state in which vehicle surrounding information is acquired from an object mounted on a vehicle.

FIG. 34 illustrates an example operation of rear parking in a state in which vehicle surrounding information is acquired from an object mounted on a vehicle. In detail, referring to FIG. 34, the vehicle may receiver an image about an additional sensing area from the mounted object 30 to display a vehicle surrounding image including the additional sensing area image. In detail, the vehicle display apparatus 100 may receive an image about a rear area of the mounted object 30 to display a vehicle surrounding image including the rear area image. Also, the vehicle display apparatus 100 may perform the automatic parking function on the basis of the vehicle surrounding image. In detail, since the vehicle surrounding information about the vehicle rear area is acquired from the information received into the object 30, the vehicle display apparatus 100 may allow the vehicle to be automatically parked in a reverse parking manner.

When it is determined that the automatic parking of the vehicle is unavailable in the state of the vehicle appearance change state due to the mounted object 30, the vehicle display apparatus 100 may request removal of the mounted object 30 to the user. (S605)

Thereafter, when the mounted object 30 is removed by the user, the vehicle display apparatus 100 may execute the automatic parking function. (S606, S607)

Hereinafter, when an object protrudes outward from the inside of the vehicle, a process of providing the vehicle surrounding image display function and the automatic parking function by the vehicle display apparatus 100 will be described in detail.

Figure 35:
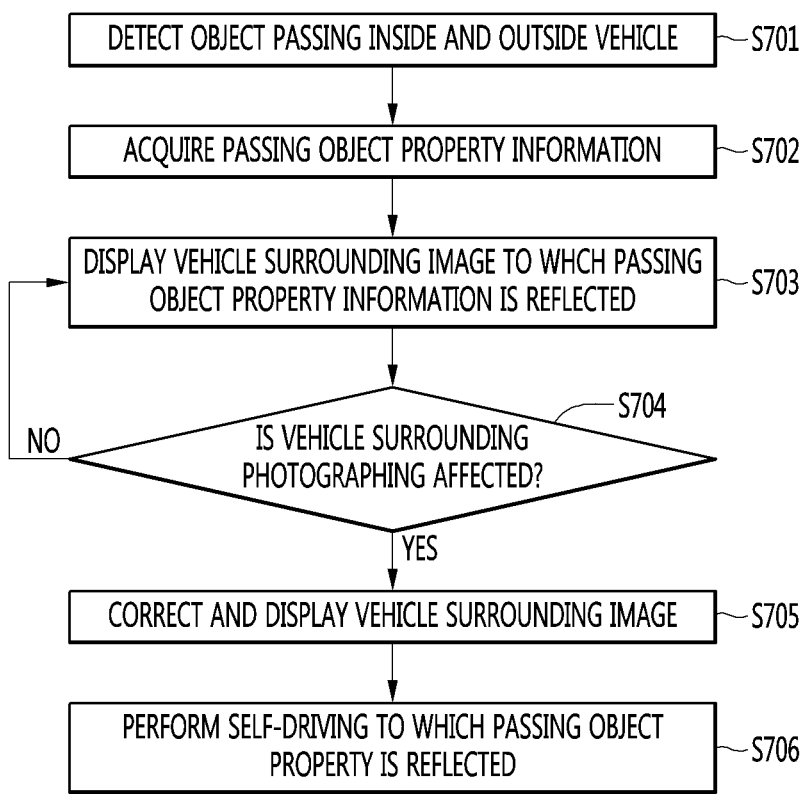
FIG. 35 is a flowchart illustrating an example method for providing a vehicle surrounding image display function in a state in which a vehicle passing object is detected.

FIG. 35 is a flowchart illustrating an example method for providing a vehicle surrounding image display function in a state in which a vehicle passing object is detected. Referring to FIG. 35, the vehicle display apparatus 100 may detect a change of the vehicle appearance due to the protrusion of the object from the inside to the outside of the vehicle. (S701) That is, the vehicle display apparatus 100 may detect a vehicle passing object 50 passing through the vehicle and acquire information about the passing object 50. (S702)

Figure 36:
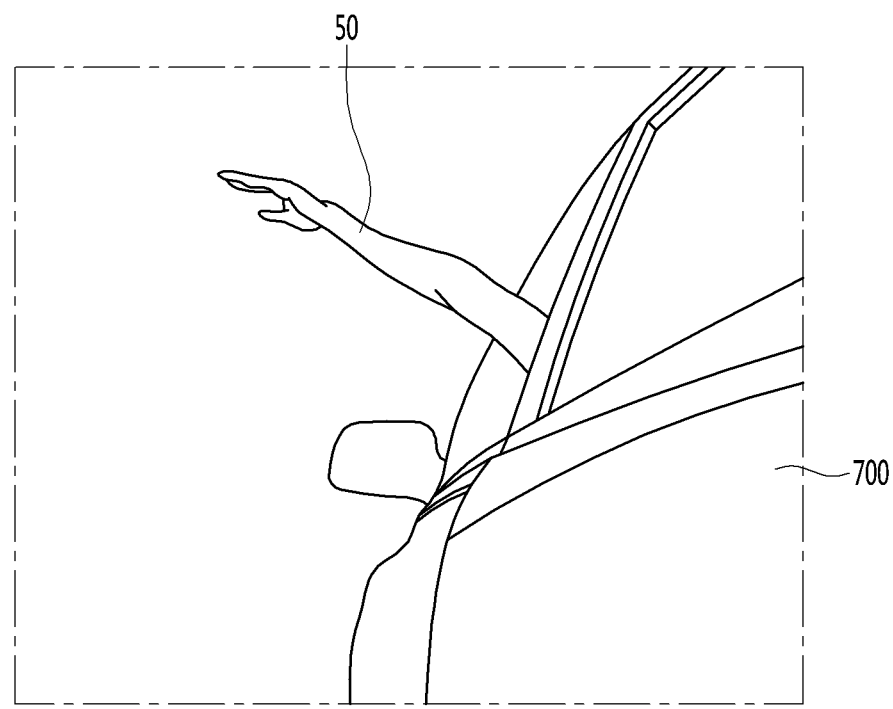
FIG. 36 is a diagram illustrating an example state in which a person's arm is out of a vehicle through a window.

FIG. 36 illustrates an example state in which a person's arm is out of a vehicle through a window. Here, the vehicle appearance may be defined as an outer appearance obtained by mixing the object passing through the vehicle window with the existing vehicle appearance. Thus, if a passing object 50 exists, the vehicle appearance may be changed.

For example, referring to FIG. 36, a human body such as a person's arm or other objects may protrude to pass through the window of the vehicle.

The sensor unit 155 may sense the passing object 50 to acquire vehicle appearance change information including a position, size, and kind of the passing object 50. For example, the sensor unit 155 may sense a protruding degree of the person's arm in a left direction through a driver's seat-side window of the vehicle.

Particularly, the vehicle display apparatus 100 may more accurately acquire information about the passing object 50 through the monitoring unit 165.

Figure 37:
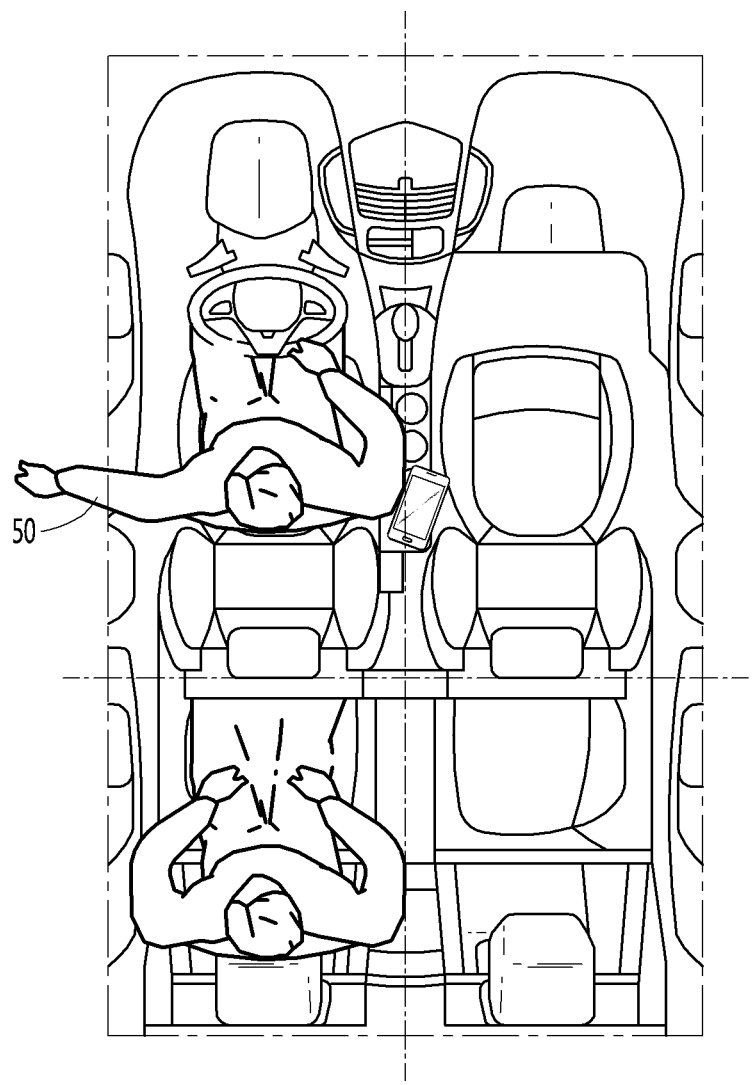
FIG. 37 is a diagram illustrating an example vehicle interior image acquired by a monitoring unit.

FIG. 37 illustrates an example vehicle interior image acquired by a monitoring unit. Referring to FIG. 37, the monitoring unit 165 may photograph the inside of the vehicle to sense movement of objects O. The processor 170 may acquire accurate information about the passing object 50 by mixing the information obtained from the sensor unit 15 sensing the inside of the vehicle with the information obtained from the monitoring unit 165 sensing the inside of the vehicle.

The processor 170 may analyze the images of FIGS. 36 and 37 to accurately acquire information about a protruding degree of the person's arm in a left direction of the driver's seat.

When the information about the passing object 50 is acquired, the vehicle display apparatus 100 may display the vehicle surrounding image by reflecting the information of the passing object 50. (S703)

In detail, the vehicle display apparatus 100 may display the vehicle surrounding image. The vehicle surrounding image may be an image including the vehicle image 700i and the vehicle surrounding image.

When the person's arm protrudes outside the vehicle as illustrated in FIGS. 36 and 37, the vehicle display apparatus 100 may acquire the vehicle appearance change information including a position, size, and kind of the passing object 50.

Also, the vehicle display apparatus 100 may generate and display the vehicle surrounding image on the basis of the acquired vehicle appearance change information.

Figure 38:
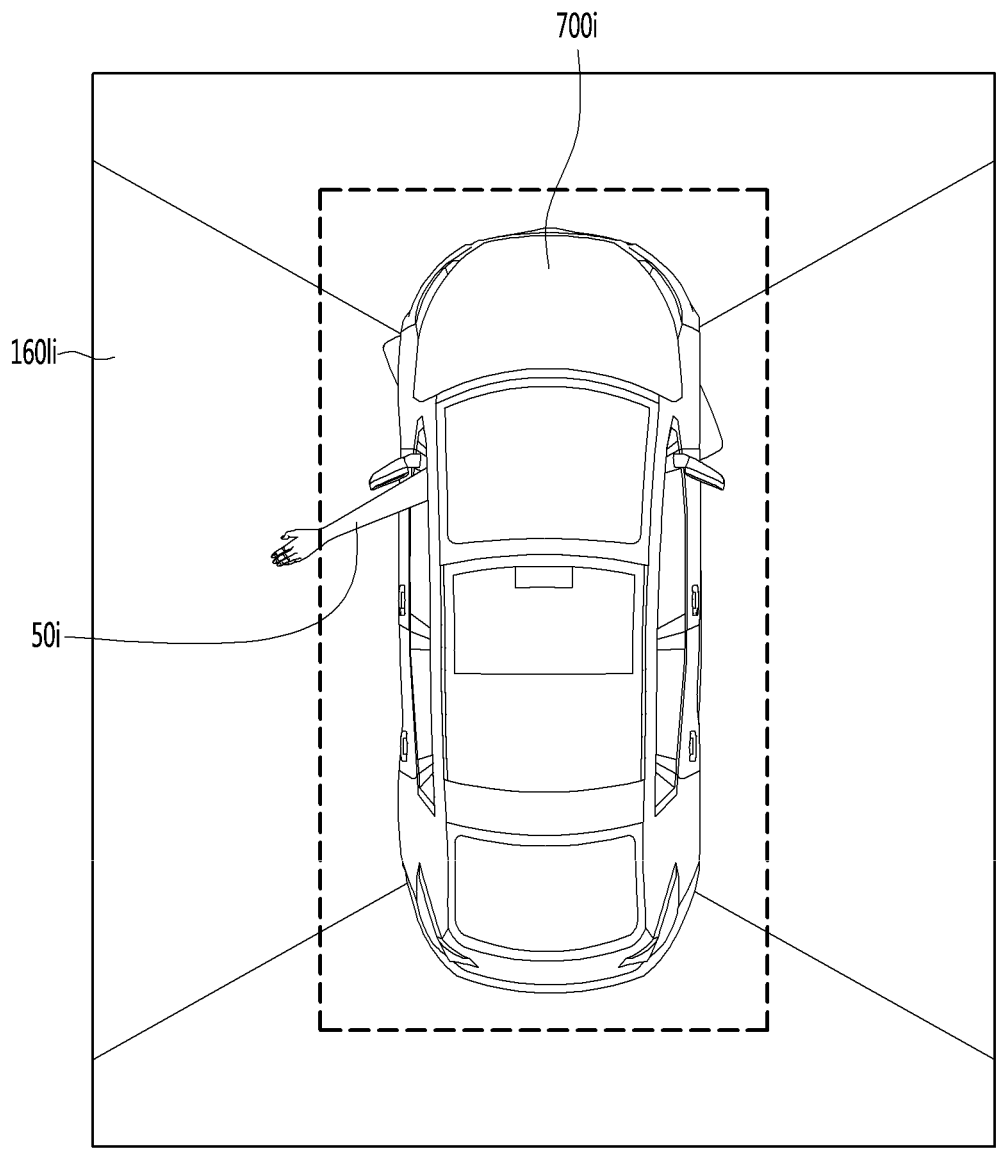
FIGS. 38 and 39 are diagrams illustrating example vehicle surrounding images displaying vehicle passing objects.
Figure 39:
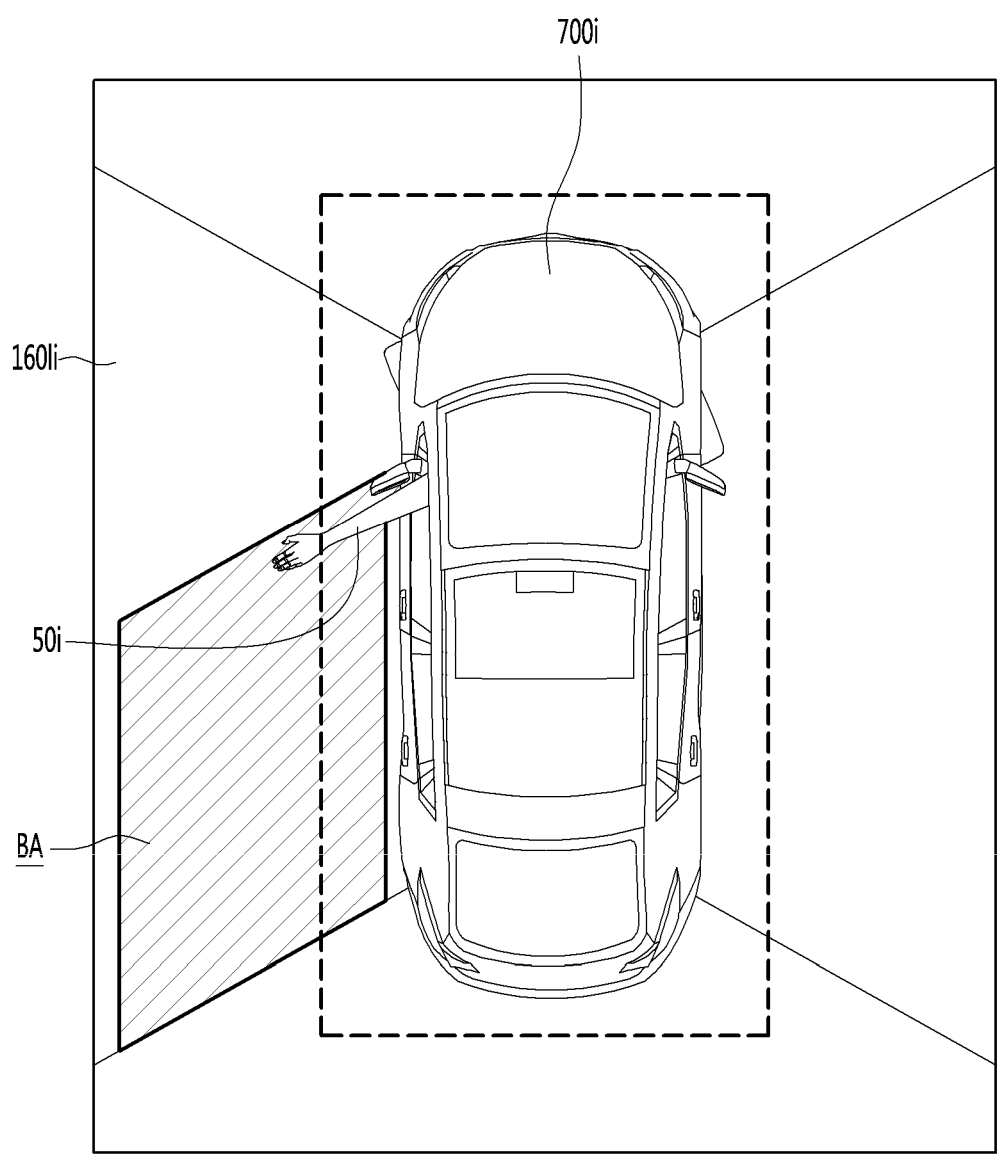

FIGS. 38 and 39 illustrate example vehicle surrounding images displaying vehicle passing objects. In some implementations, the vehicle surrounding image may be the around view image. In detail, referring to FIG. 38, the vehicle surrounding image may be an around view image generated by matching front/rear and left/right images of the vehicle with the vehicle image 700i. Here, the vehicle image 700i may be a virtual vehicle graphic image stored in the memory 140, but is not limited thereto.

The processor 170 may correct the vehicle surrounding image so that the vehicle surrounding image includes a passing object image 50i showing the passing object 50.

For example, the processor 170 may additionally generate the passing object image 50i showing the passing object on the virtual vehicle image 700i to match the virtual vehicle image 700i with a vehicle surrounding image, thereby generating the vehicle surrounding image. Here, the processor 170 may generate the object image 30i by reflecting the size, kind, and position of the actually passing object 50 to provide accurate information about the passing object 50 to the user. Also, the processor 170 may image-process the image photographing the passing object 50 to display the obtained image on the vehicle surrounding image.

Also, the vehicle display apparatus 100 may generate and display a 3D around view image at a view point looking at the passing object 50 so that the passing object 50 is more observed in three dimensions.

The vehicle display apparatus 100 may display the vehicle surrounding image by accurately reflecting the information about the passing object 50 and also display a sensing state of the vehicle surrounding image due to the passing object 50. (S704)

The vehicle display apparatus 100 may determine whether the photographing around the vehicle is interrupted by the passing object 50. (S704)

In detail, when the passing object 50 protruding through the vehicle window is present at a front side in the photographing direction of the camera 160, sensing of the vehicle surrounding image may be interrupted by the passing object 50.

If the around view image is generated by using the vehicle surrounding image, the passing object 50 may be displayed in the distorted state, and thus, the user may recognize the vehicle surrounding situation in the distorted shape.

To prevent this problem from occurring, if the passing object 50 affects the vehicle surrounding photographing, the vehicle display apparatus 100 may correct and display the vehicle surrounding image.

In detail, when the photographing of the camera 160 is covered or interrupted by the passing object 50, the vehicle display apparatus 100 may display the vehicle surrounding image to show a vehicle surrounding sensing state.

In detail, referring to FIG. 39, when a black area BA occurs in a portion of the vehicle left image by the person's arm, the vehicle surrounding image in which the black area BA that is unavailable in photographing is removed.

That is, when the black area BA in which the sensing is unavailable occurs by the passing object 50, the vehicle display apparatus 100 may display the vehicle surrounding image to show the black area BA, thereby providing accurate information about the vehicle surrounding sensing situation to the user.

Also, the vehicle display apparatus 100 may allow the vehicle to be automatically parked in consideration of the vehicle appearance change due to the passing object 50 and the surrounding image sensing state. (S706)

Figure 40:
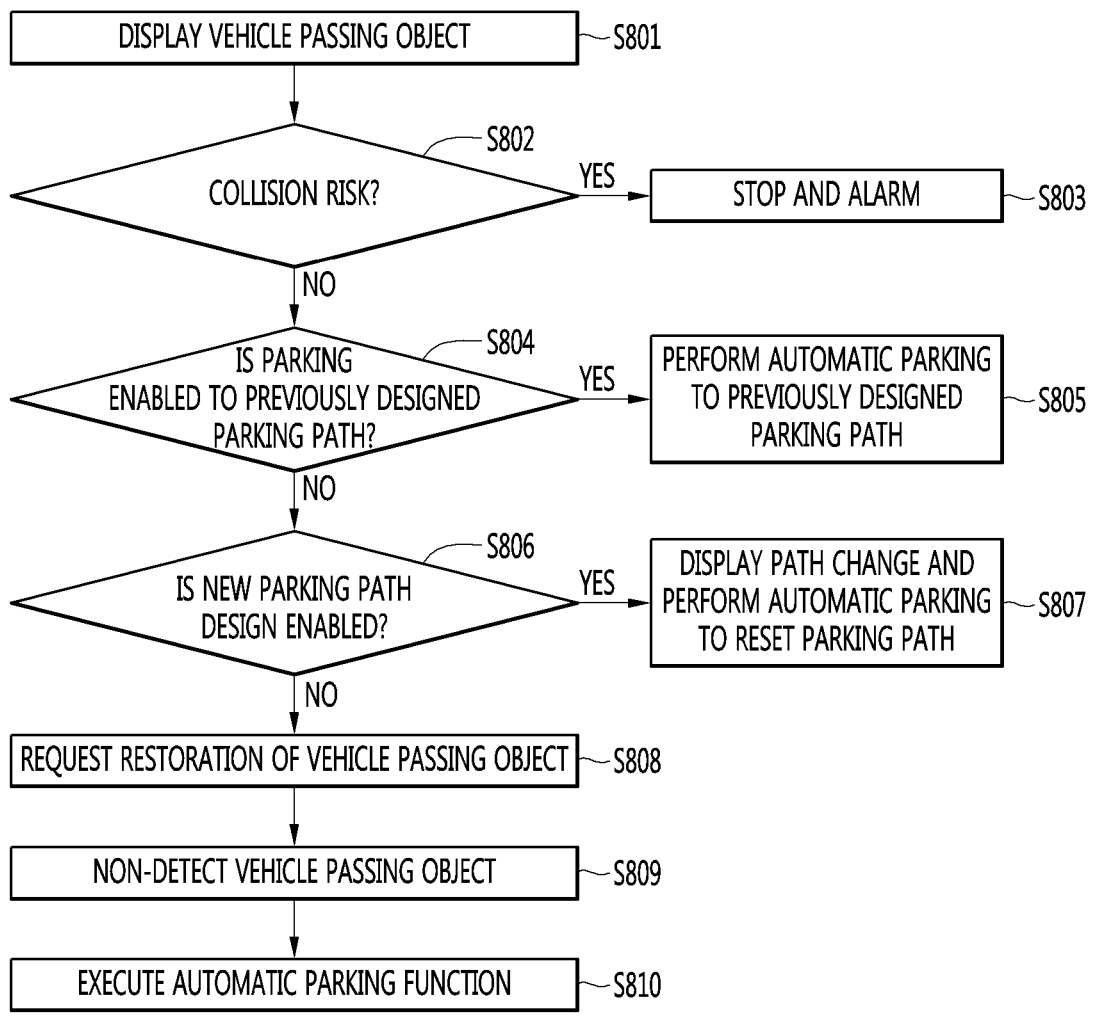
FIG. 40 is a flowchart illustrating an example method for providing an automatic parking function in a state in which a vehicle passing object is detected.

FIG. 40 is a flowchart illustrating an example method for providing an automatic parking function in a state in which a vehicle passing object is detected. Hereinafter, a process of providing the automatic parking function when the passing object is detected during the vehicle automatic driving will be described in detail with reference to FIG. 40.

First, when the passing object 50 exists during the vehicle driving, the vehicle display apparatus 100 may display the passing object 50 on the vehicle surrounding image. (S801)

Also, the vehicle display apparatus 100 may determine whether an emergency situation occurs during the vehicle driving on the basis of the changed vehicle surrounding image information. (S802)

In detail, the processor 170 may determine the emergency situation when the boundary range of the vehicle is expanded by the passing object 50, and a risk of collision between the vehicle boundary range and another object O exists. Also, the processor 170 may determine a case, in which a portion of the human body protrudes by a predetermined degree through the vehicle window, as the emergency situation.

When determined as the emergency situation, the vehicle display apparatus 100 may stop the vehicle to provide a dangerous alarm to the user. (S803)

Figure 41A:
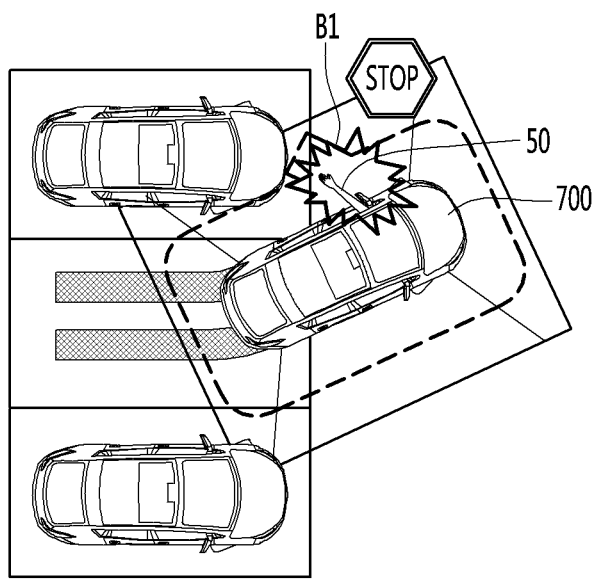
FIG. 41A is a diagram illustrating an example state in which automatic parking is stopped based on a vehicle passing object.

FIG. 41A illustrates an example state in which automatic parking is stopped based on a vehicle passing object. Referring to FIG. 41A, when it is determined that the door of the vehicle is opened, and the risk of collision between the object passing through the window and the object O exists, the vehicle display apparatus 100 may provide a warning alarm to the user after stopping the vehicle.

Also, when the vehicle left area becomes the black area by the passing object 50 during the left backward driving of the vehicle, the vehicle display apparatus 100 may determine that the risk of the collision does not exist because the vehicle left situation is not sensed, and thus, stop the vehicle to provide the warning alarm to the user.

When it is determined as the non-emergency situation, the vehicle display apparatus 100 may determine whether the automatic parking is possible to the preset parking path in the state in which the vehicle appearance is changed. (S804)

That is, when the parking is enabled to the existing parking path C even though the vehicle appearance is changed, the vehicle display apparatus 100 may perform the automatic parking of the vehicle to the previously designed parking path without stopping the vehicle to improve the user's convenience. (S805)

Figure 41B:
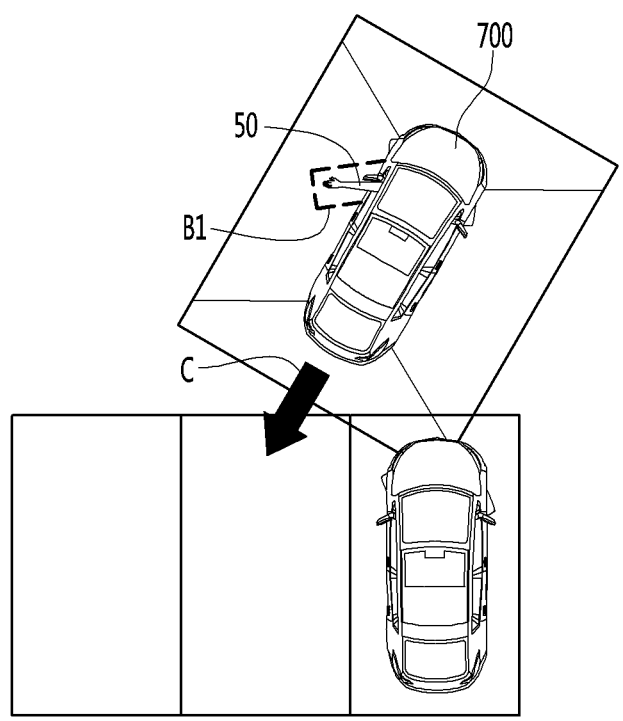
FIG. 41B is a diagram illustrating an example operation of automatic parking using an existing parking path in a state in which a vehicle passing object is detected.

FIG. 41B illustrates an example operation of automatic parking using an existing parking path in a state in which a vehicle passing object is detected. Referring to FIG. 41B, when it is determined that the risk of the collision does not exist even though the vehicle boundary range is expanded by the passing object 50 of the vehicle, and the vehicle is driven to the expanded vehicle boundary range B1, the vehicle display apparatus 100 may automatically drive the vehicle to the existing parking path C.

If the automatic parking is unavailable to the existing parking path C, the vehicle display apparatus 100 may determine whether a design of a new parking path C1 is enabled. (S806)

Figure 41C:
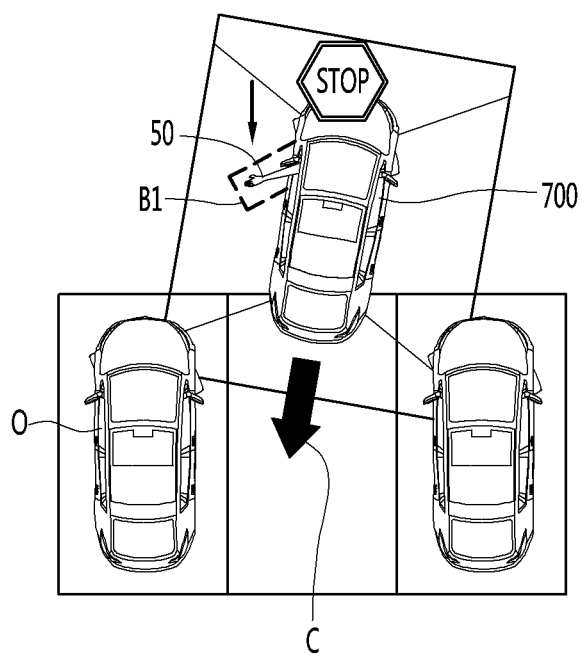
FIG. 41C is a diagram illustrating an example operation of automatic parking using a new parking path in a state in which a vehicle passing object is detected.

FIG. 41C illustrates an example operation of automatic parking using a new parking path in a state in which a vehicle passing object is detected. Referring to FIG. 41C, when the design of the new parking path C1 is enabled based on the changed vehicle boundary range B1, the vehicle display apparatus 100 may display a redesigned parking path C1 to drive the vehicle to the new parking path C1. (S807)

If the design of the new parking path C1 is unavailable, the vehicle display apparatus 100 may request removal of the passing object 50 to the user. (S808)

Figure 41D:
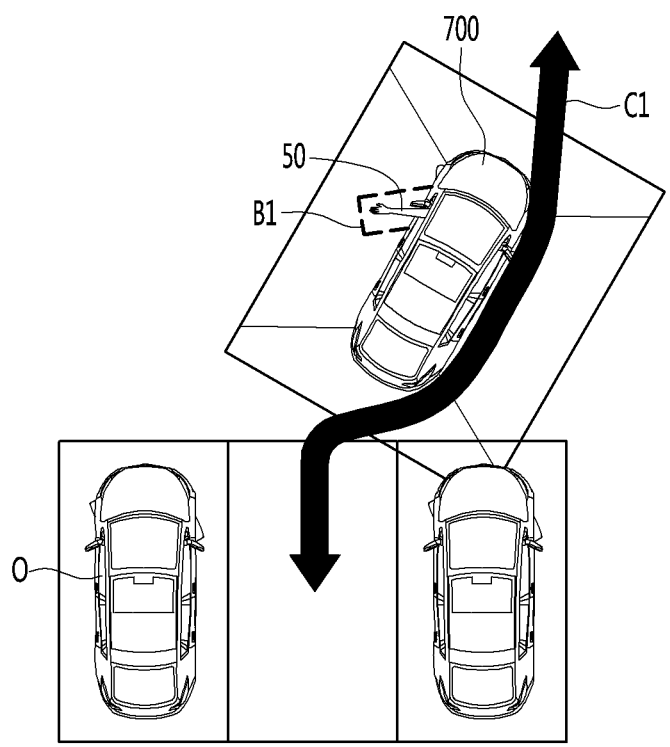
FIG. 41D is a diagram illustrating an example state in which a vehicle boundary range is changed by a vehicle passing object.

FIG. 41D illustrates an example state in which a vehicle boundary range is changed by a vehicle passing object. Referring to FIG. 41D, if a parking path for automatically parking the vehicle at a target parking position on the basis of the expanded vehicle boundary range B1 that is expanded by including the passing object 50 is not generated, the vehicle display apparatus 100 may stop the vehicle to request the removal of the passing object 50 to the user.

Next, when the user removes the passing object 50, the vehicle display apparatus 100 may restart the automatic parking. (S809, S810)

Figure 42:
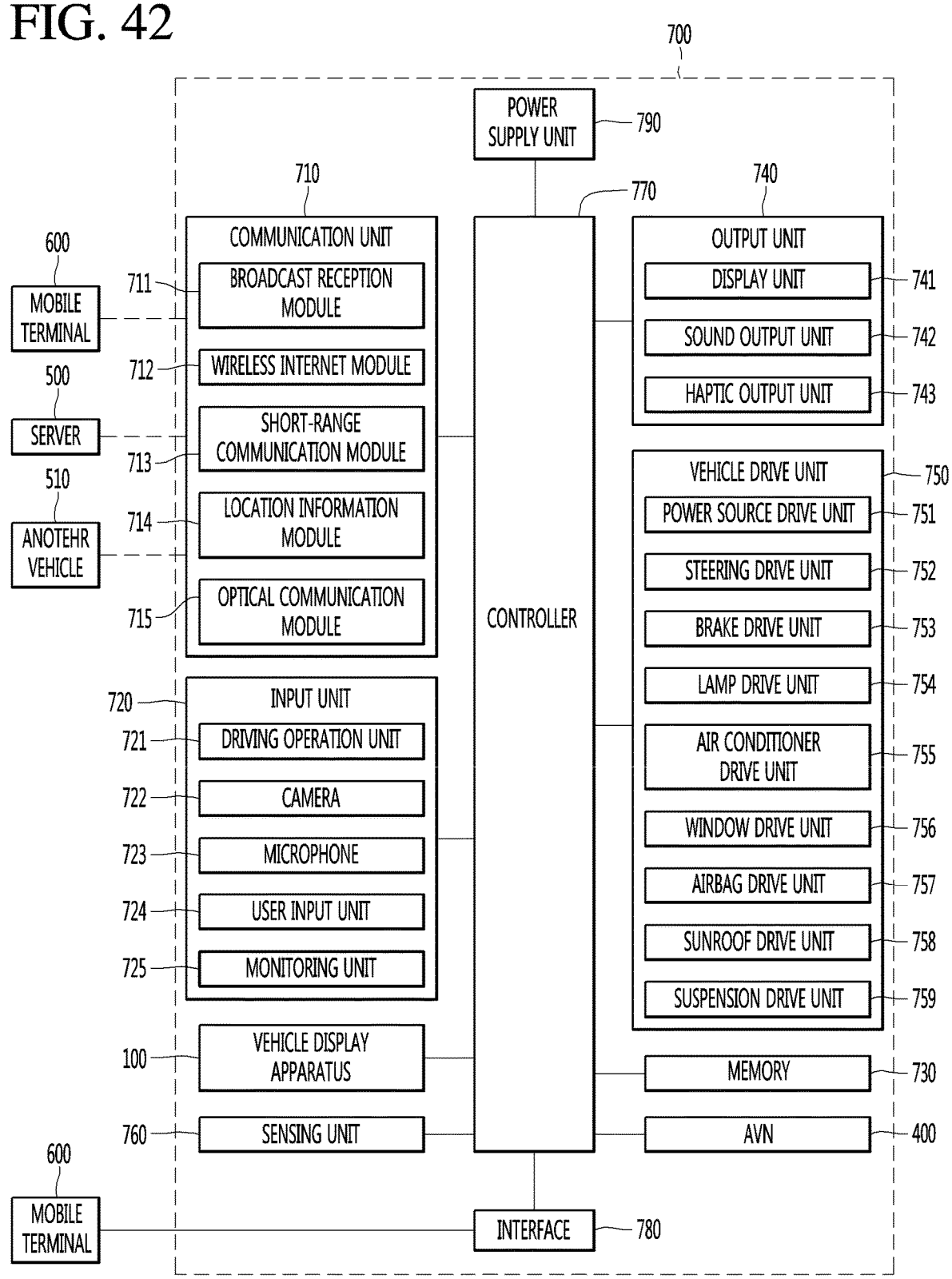
FIG. 42 is a diagram illustrating an example configuration of a vehicle of FIG. 1 including a vehicle display apparatus.

FIG. 42 illustrates an example configuration of a vehicle of FIG. 1 including a vehicle display apparatus. Referring to FIG. 42, the above-described vehicle display apparatus 100 may be included in the vehicle 700.

The vehicle 700 may include a communication unit 710, an input unit 720, a sensing unit 760, an output unit 740, a vehicle drive unit 750, a memory 730, an interface 780, a controller 770, a power supply unit 790, a vehicle display apparatus 100 and AVN apparatus 400. Here, among the units included in the vehicle display apparatus 100 and the units of the vehicle 700, the units having the same names are described as being included in the vehicle 700.

The communication unit 710 may include one or more modules which permit communication such as wireless communication between the vehicle and the mobile terminal 600, between the vehicle and the external server 500 or between the vehicle and the other vehicle 510. Further, the communication unit 710 may include one or more modules which connect the vehicle to one or more networks.

The communication unit 710 includes a broadcast receiving module 711, a wireless Internet module 712, a short-range communication module 713, and an optical communication module 715.

The broadcast receiving module 711 receives a broadcast signal or broadcast related information from an external broadcast management server through a broadcast channel. Here, the broadcast includes a radio broadcast or a TV broadcast.

The wireless Internet module 712 refers to a wireless Internet access module and may be provided inside or outside the vehicle. The wireless Internet module 712 transmits and receives a wireless signal through a communication network according to wireless Internet access technologies.

Examples of such wireless Internet access technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 712 may transmit/receive data according to one or more of such wireless Internet technologies, and other Internet technologies as well. For example, the wireless Internet module 712 may wirelessly exchange data with the external server 500. The wireless Internet module 712 may receive weather information and road traffic state information (e.g., transport protocol experts group (TPEG) information) from the external server 500.

The short-range communication module 713 is configured to facilitate short-range communication. Such short-range communication may be supported using at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

The short-range communication module 713 may form a wireless local area network to perform short-range communication between the vehicle and at least one external device. For example, the short-range communication module 713 may wirelessly exchange data with the mobile terminal 600. The short-range communication module 713 may receive weather information and road traffic state information (e.g., transport protocol experts group (TPEG) information) from the mobile terminal 600. When a user rides in the vehicle, the mobile terminal 600 of the user and the vehicle may pair with each other automatically or by executing the application of the user.

A location information module 714 acquires the location of the vehicle and a representative example thereof includes a global positioning system (GPS) module. For example, the vehicle may acquire the location of the vehicle using a signal received from a GPS satellite upon utilizing the GPS module.

The optical communication module 715 may include a light emitting unit and a light reception unit.

The light reception unit may convert a light signal into an electric signal and receive information. The light reception unit may include a photodiode (PD) for receiving light. The photodiode may covert light into an electric signal. For example, the light reception unit may receive information on a preceding vehicle through light emitted from a light source included in the preceding vehicle.

The light emitting unit may include at least one light emitting element for converting electrical signals into a light signal. Here, the light emitting element may be a Light Emitting Diode (LED). The light emitting unit converts electrical signals into light signals to emit the light. For example, the light emitting unit may externally emit light via flickering of the light emitting element corresponding to a prescribed frequency. In some implementations, the light emitting unit may include an array of a plurality of light emitting elements. In some implementations, the light emitting unit may be integrated with a lamp provided in the vehicle. For example, the light emitting unit may be at least one selected from among a headlight, a taillight, a brake light, a turn signal, and a sidelight. For example, the optical communication module 715 may exchange data with the other vehicle 510 via optical communication.

The input unit 720 may include a driving operation unit 721, a camera 195, a microphone 723 and a user input unit 724.

Figure 7:
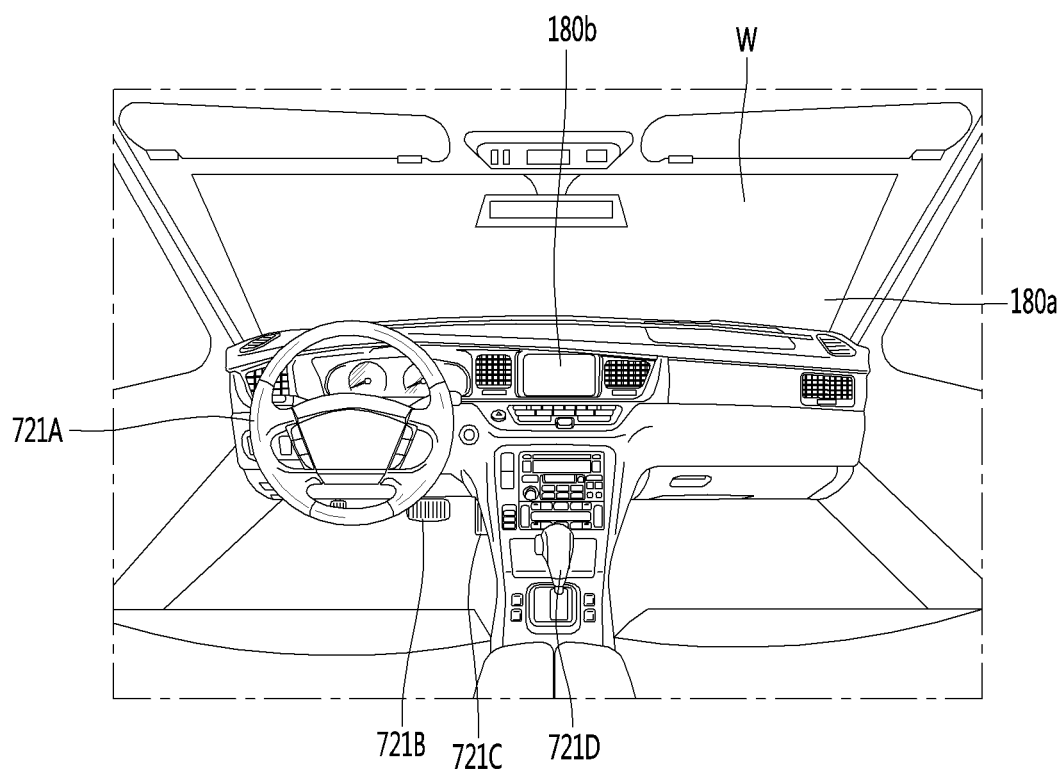
FIG. 7 is a diagram illustrating an example interior of a vehicle including an example vehicle display apparatus.
Figure 10:
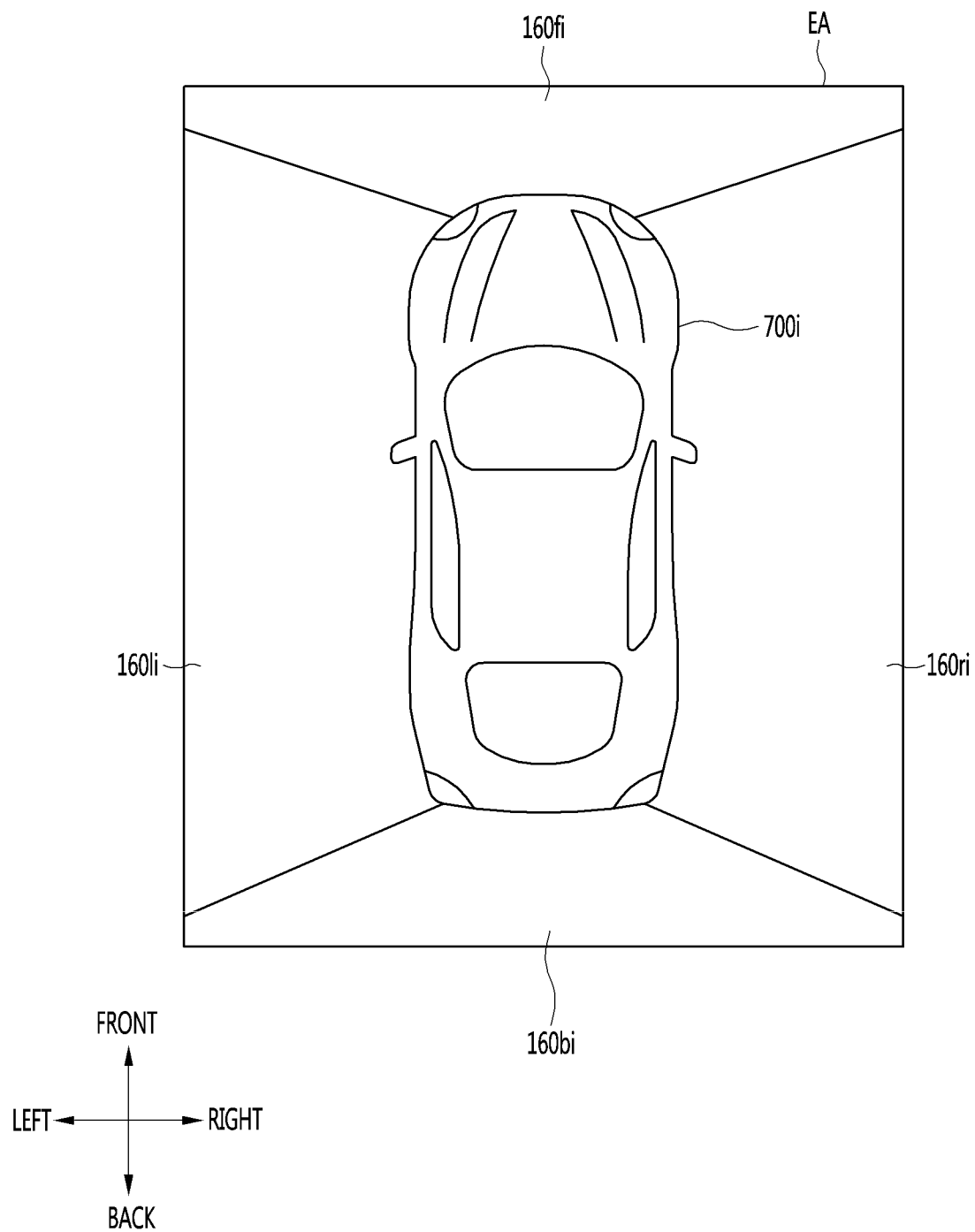
FIG. 10 is a diagram illustrating an example around view image for a vehicle.

FIG. 7 illustrates an example interior of a vehicle including an example vehicle display apparatus. Referring to FIG. 7, the driving operation unit 721 receives user input for driving of the vehicle. The driving operation unit 721 may include a steering input unit 721A, a shift input unit 721D, an acceleration input unit 721C and a brake input unit 721B.

The steering input unit 721A is configured to receive user input with regard to the direction of travel of the vehicle. The steering input unit 721A may include a steering wheel using rotation. In some implementations, the steering input unit 721A may be configured as a touch screen, a touch pad, or a button.

The shift input unit 721D is configured to receive input for selecting one of Park (P), Drive (D), Neutral (N), and Reverse (R) gears of the vehicle from the user. The shift input unit 721D may have a lever form. In some implementations, the shift input unit 721D may be configured as a touch screen, a touch pad, or a button.

The acceleration input unit 721C is configured to receive input for acceleration of the vehicle from the user. The brake input unit 721B is configured to receive input for speed reduction of the vehicle from the user. Each of the acceleration input unit 721C and the brake input unit 721B may have a pedal form. In some implementations, the acceleration input unit 721C or the brake input unit 721B may be configured as a touch screen, a touch pad, or a button.

The camera 722 may include an image sensor and an image processing module. The camera 722 may process a still image or a moving image obtained by the image sensor (e.g., CMOS or CCD). In addition, the image processing module processes the still image or the moving image acquired through the image sensor, extracts necessary information, and delivers the extracted information to the controller 770. The vehicle may include the camera 722 for capturing the front image of the vehicle or the image of the vicinity of the vehicle and the monitoring unit 725 for capturing the image of the space inside the vehicle.

The monitoring unit 725 may acquire an image of a passenger. The monitoring unit 725 may acquire an image for biometric information of the passenger.

Although the monitoring unit 725 and the camera 722 are included in the input unit 720 in FIG. 42, the camera 722 may be included in the vehicle display apparatus 100 as described above.

The microphone 723 may process external sound signals into electrical data. The processed data may be utilized in various ways according to a function that the vehicle is performing. The microphone 723 may convert a user voice command into electrical data. The converted electrical data may be transmitted to the controller 770.

In some implementations, a camera 722 or the microphone 723 may not be included in the input unit 720 but may be included in the sensing unit 760.

The user input unit 724 is configured to receive information from the user. When information is input via the user input unit 724, the controller 770 may control the operation of the vehicle to correspond to the input information. The user input unit 724 may include a touch input unit or a mechanical input unit. In some implementations, the user input unit 724 may be located in a region of the steering wheel. In this case, the driver may operate the user input unit 724 with the fingers while gripping the steering wheel.

The sensing unit 760 is configured to sense signals associated with, for example, signals related to driving of the vehicle. To this end, the sensing unit 760 may include a collision sensor, a wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, a radar, a Lidar, etc.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, etc.

In some implementations, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric sensor. The biometric sensor senses and acquires biometric information of the passenger. The biometric information may include fingerprint information, iris-scan information, retina-scan information, hand geometry information, facial recognition information, and voice recognition information. The biometric sensor may include a sensor for sensing biometric information of the passenger. Here, the monitoring unit 725 and the microphone 723 may operate as a sensor. The biometric sensor may acquire hand geometry information and facial recognition information through the monitoring unit 725.

The output unit 740 is configured to output information processed by the controller 770. The output unit 740 may include a display unit 741, a sound output unit 742, and a haptic output unit 743.

The display unit 741 may display information processed by the controller 770. For example, the display unit 741 may display vehicle associated information. Here, the vehicle associated information may include vehicle control information for direct control of the vehicle or driver assistance information for aiding in driving of the vehicle. In addition, the vehicle associated information may include vehicle state information that indicates the current state of the vehicle or vehicle traveling information regarding traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touch screen. The touch screen may function as the user input unit 724 which provides an input interface between the vehicle and the user and also function to provide an output interface between the vehicle and the user. In this case, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

In some implementations, the display unit 741 may include a cluster to allow the driver to check vehicle state information or vehicle traveling information while driving the vehicle. The cluster may be located on a dashboard. In this case, the driver may check information displayed on the cluster while looking forward.

In some implementations, the display unit 741 may be implemented as a head up display (HUD). When the display unit 741 is implemented as a HUD, information may be output via a transparent display provided at the windshield. Alternatively, the display unit 741 may include a projector module to output information via an image projected onto the windshield.

The sound output unit 742 is configured to convert electrical signals from the controller 770 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control of a power source inside the vehicle.

For example, in the case where a fossil fuel based engine (not illustrated) is a power source, the power source drive unit 751 may perform electronic control of the engine. As such, the power source drive unit 751 may control, for example, an output torque of the engine. In the case where the power source drive unit 751 is an engine, the power source drive unit 751 may control the speed of the vehicle by controlling the output torque of the engine under the control of the controller 770.

In another example, in the case where an electric motor (not illustrated) is a power source, the power source drive unit 751 may perform control of the motor. As such, the power source drive unit 751 may control, for example, the RPM and torque of the motor.

The steering drive unit 752 may perform electronic control of a steering apparatus inside the vehicle. The steering drive unit 752 may change the direction of travel of the vehicle.

The brake drive unit 753 may perform electronic control of a brake apparatus (not illustrated) inside the vehicle. For example, the brake drive unit 753 may reduce the speed of the vehicle by controlling the operation of brakes located at wheels. In another example, the brake drive unit 753 may adjust the direction of travel of the vehicle leftward or rightward by differentiating the operation of respective brakes located at left and right wheels.

The lamp drive unit 754 may turn at least one lamp arranged inside and outside the vehicle on or off. In addition, the lamp drive unit 754 may control, for example, the intensity and direction of light of each lamp. For example, the lamp drive unit 754 may perform control of a turn signal lamp or a brake lamp.

The air conditioner drive unit 755 may perform electronic control of an air conditioner (not illustrated) inside the vehicle. For example, when the interior temperature of the vehicle is high, the air conditioner drive unit 755 may operate the air conditioner to supply cold air to the interior of the vehicle.

The window drive unit 756 may perform electronic control of a window apparatus inside the vehicle. For example, the window drive unit 756 may control opening or closing of left and right windows of the vehicle.

The airbag drive unit 757 may perform the electronic control of an airbag apparatus inside the vehicle. For example, the airbag drive unit 757 may control an airbag to be deployed in a dangerous situation.

The sunroof drive unit 758 may perform electronic control of a sunroof apparatus (not illustrated) inside the vehicle. For example, the sunroof drive unit 758 may control opening or closing of a sunroof.

The suspension drive unit 759 may perform electronic control of a suspension apparatus inside the vehicle. For example, when a road surface is uneven, the suspension drive unit 759 may control the suspension apparatus to reduce vibrations of the vehicle.

The memory 730 is electrically connected to the controller 770. The memory 730 may store basic data of the unit, control data for operation control of the unit and input/output data. The memory 730 may be various storage apparatuses, which are implemented in a hardware manner, such as a ROM, RAM, EPROM, flash drive and hard drive. The memory 730 may store a variety of data for overall operation of the vehicle, such as a program for processing or control of the controller 770.

The interface 780 may serve as a passage for various kinds of external devices that are connected to the vehicle. For example, the interface 780 may have a port that is connectable to the mobile terminal 600 and may be connected to the mobile terminal 600 via the port. In this case, the interface 780 may exchange data with the mobile terminal 600.

The interface 780 may serve as a passage for providing electric energy to the connected mobile terminal 600. When the mobile terminal 600 is electrically connected to the interface 780, the interface 780 may provide electric energy supplied from the power supply unit 790 to the mobile terminal 600 under control of the controller 770.

The controller 770 may control the overall operation of each unit inside the vehicle. The controller 770 may be referred to as an Electronic Control Unit (ECU).

The controller 770 may perform a function corresponding to the delivered signal according to delivery of a signal for executing the vehicle display apparatus 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 may perform the role of the above-described processor 170. That is, the processor 170 of the vehicle display apparatus 100 may be directly set in the controller 770 of the vehicle. In these implementations, the vehicle display apparatus 100 may be understood as a combination of some components of the vehicle.

Alternatively, the controller 770 may control the components to transmit information requested by the processor 170.

The power supply unit 790 may supply power required to operate the respective components under the control of the controller 770. In particular, the power supply unit 790 may receive power from, for example, a battery (not illustrated) inside the vehicle.

The AVN apparatus 400 may exchange data with the controller 770. The controller 770 may receive navigation information from the AVN apparatus or a separate navigation apparatus. Here, the navigation information may include destination information, information on a route to the destination, map information related to vehicle traveling and current position information of the vehicle.

The vehicle display apparatus may acquire the information about the change in outer appearance of the vehicle and change and display the vehicle images or the vehicle surrounding images so that the change in outer appearance of the vehicle are displayed to provide the information about the vehicle surrounding states to the user.

Also, the vehicle display apparatus may additionally display the image sensing state when the non-sensing region occurs due to the interruption in vehicle surrounding photographing by the change in outer appearance of the vehicle.

Also, the vehicle display apparatus may perform the advanced driver assistance system (ADAS) function or the self-driving function in consideration of the change in outer appearance of the vehicle, and particularly, may provide the vehicle parking function during the self-driving function. Here, the vehicle display apparatus may perform the self-driving function in consideration of the distortion of the vehicle surrounding images due to the change in outer appearance of the vehicle, and thus, the vehicle may be more safely self-driven.

The above described features, configurations, effects, and the like are included in at least one of the implementations of the present disclosure, and should not be limited to only one implementation. In addition, the features, configurations, effects, and the like as illustrated in each implementation may be implemented with regard to other implementations as they are combined with one another or modified by those skilled in the art. Thus, content related to these combinations and modifications should be construed as being included in the scope of the accompanying claims.

Further, although the implementations have been mainly described until now, they are just exemplary and do not limit the present disclosure. Thus, those skilled in the art will understand that various modifications and applications which have not been exemplified may be carried out within a range which does not deviate from the essential characteristics of the implementations. For instance, the constituent elements described in detail in the exemplary implementations can be modified to be carried out. Further, the differences related to such modifications and applications shall be construed to be included in the scope of the present disclosure specified in the attached claims.

What is claimed is:

1. A vehicle display apparatus comprising:
  a sensor comprising at least one camera that is configured to capture one or more images to obtain a vehicle surrounding image of a vehicle, the sensor being configured to sense an appearance change of the vehicle;
  a display that is configured to display the vehicle surrounding image that includes a vehicle image showing at least a portion of a vehicle appearance; and
  a processor that is configured to:
    obtain, from the sensor, information on the appearance change of the vehicle,
    based on the information on the appearance change of the vehicle, generate the vehicle surrounding image to show the appearance change of the vehicle,
    control the display to display the vehicle surrounding image, detect a first area that is blocked based on the appearance change of the vehicle,
change the vehicle surrounding image to represent the first area as a blocked area where obtaining an image is unavailable, or change the vehicle surrounding image to include an auxiliary image of at least a portion of the first area based on an auxiliary camera being available to obtain the auxiliary image, and
control the display to display the changed vehicle surrounding image,
wherein the at least one camera is unavailable to photograph the blocked area based on being covered by a portion of the vehicle as a result of the appearance change of the vehicle.

2. The vehicle display apparatus of claim 1, wherein the vehicle surrounding image includes:
an around view image, and
a virtual vehicle graphic image representing the vehicle.

3. The vehicle display apparatus of claim 2, wherein the processor is configured to:
based on the appearance change of the vehicle, change the virtual vehicle graphic image, and
control the display to display the around view image comprising the changed virtual vehicle graphic image.

4. The vehicle display apparatus of claim 1, wherein the vehicle surrounding image includes:
a 3D around view image that displays the vehicle from a view point to show the appearance change of the vehicle.

5. The vehicle display apparatus of claim 1, wherein
the at least one camera is configured to capture the one or more images in one or more directions to obtain the vehicle surrounding image, the one or more directions including at least one of a front direction, a rear direction, a left direction, or a right direction of the vehicle.

6. The vehicle display apparatus of claim 1, wherein the processor is configured to, based on the information on the appearance change of the vehicle, execute a self-driving task that includes an automatic parking task.

7. The vehicle display apparatus of claim 6, wherein the processor is configured to:
based on the information on the appearance change of the vehicle, change a boundary range of the vehicle, and
based on the changed boundary range of the vehicle, execute the self-driving task.

8. The vehicle display apparatus of claim 6, wherein the processor is configured to:
in a state in which the appearance change of the vehicle occurs, execute the automatic parking task by changing at least one of a parking manner, a parking path, or a parking necessary time for automatic parking.

9. The vehicle display apparatus of claim 1, further comprising:
an interface that is configured to receive information on a state change of a moving part of the vehicle,
wherein the appearance change of the vehicle includes a state change of the moving part of the vehicle.

10. The vehicle display apparatus of claim 9, wherein the state change of the moving part includes:
at least one of a state change of a side view mirror of the vehicle between a folded state and an unfolded state, a state change of a door of the vehicle between an open state and a closed state, a state change of a sunroof of the vehicle between an open state and a closed state, or a state change of a trunk of the vehicle between an open state and a closed state.

11. The vehicle display apparatus of claim 10, wherein the state change of the moving part includes:
a state change of the moving part between a locked state and an unlocked state.

12. The vehicle display apparatus of claim 9, wherein the processor is configured to:
in a state in which the state change of the moving part occurs, perform an automatic parking task for the vehicle,
based on the state change of the moving part, expand a boundary range of the vehicle, and
in a state in which risk of collision between the expanded boundary range and an object is detected, stop the vehicle.

13. The vehicle display apparatus of claim 1, wherein the appearance change of the vehicle includes:
an object being mounted on an exterior of the vehicle.

14. The vehicle display apparatus of claim 13, further comprising:
at least one of (i) an interface that is configured to receive the information on the appearance change of the vehicle, the information representing information on the object mounted on the exterior of the vehicle or information on a structure to mount the object on the exterior of the vehicle or (ii) a memory that is configured to store the information about the object,
wherein the information on the object mounted on the exterior of the vehicle includes:
at least one of (i) information on a position, a size, a type, or an existence of a hinge coupling or (ii) information on a surrounding image of the object.

15. The vehicle display apparatus of claim 13, wherein the processor is configured to:
in a state in which the object is mounted on the vehicle, perform an automatic parking task for the vehicle,
expand a boundary range of the vehicle to the object, and
in a state in which risk of collision between the expanded boundary range and an object is detected, stop the vehicle.

16. The vehicle display apparatus of claim 1, wherein the appearance change of the vehicle represents an object moving from an inside of the vehicle to an outside of the vehicle.

17. The vehicle display apparatus of claim 16,
wherein the at least one camera includes a first camera that is configured to obtain an image of the inside of the vehicle,
wherein the processor is configured to:
based on the vehicle surrounding image obtained by the sensor and the image of the inside of the vehicle obtained by the first camera, obtain information on the object moving from the inside of the vehicle to the outside of the vehicle,
wherein the information on the object moving from the inside of the vehicle to the outside of the vehicle includes:
information on a position, a size, and a type of the object, and wherein the processor is configured to:
generate the vehicle surrounding image to show the information on the appearance change of the vehicle, and
control the display to display the vehicle surrounding image.

18. A vehicle comprising a vehicle display apparatus that includes:
a sensor comprising at least one camera that is configured to capture one or more images to obtain a vehicle surrounding image of a vehicle, the sensor being configured to sense an appearance change of the vehicle;
a display that is configured to display the vehicle surrounding image that includes a vehicle image showing at least a portion of a vehicle appearance; and
a processor that is configured to:
  obtain, from the sensor, information on the appearance change of the vehicle,
  based on the information on the appearance change of the vehicle, generate the vehicle surrounding image to show the appearance change of the vehicle,
  control the display to display the vehicle surrounding image,
  detect a first area that is blocked based on the appearance change of the vehicle,
  change the vehicle surrounding image to represent the first area as a blocked area where obtaining an image is unavailable, or change the vehicle surrounding image to include an auxiliary image of at least a portion of the first area based on an auxiliary camera being available to obtain the auxiliary image, and
  control the display to display the changed vehicle surrounding image,
  wherein the at least one camera is unavailable to photograph the blocked area based on being covered by a portion of the vehicle as a result of the appearance change of the vehicle.

19. The vehicle display apparatus of claim 1, wherein the sensor is further configured to acquire vehicle state change information including an opened angle of a door of the vehicle, and
  wherein the processor is further configured to change the vehicle surrounding image to include a door image in an open state corresponding to the opened angle of the door.

20. The vehicle display apparatus of claim 19, wherein the processor is further configured to, based on the first area corresponding to an area that is blocked by the door, determine the blocked area based on the opened angle of the door of the vehicle.

* * * * *